United States Patent
Olbers et al.

(10) Patent No.: US 8,351,961 B2
(45) Date of Patent: Jan. 8, 2013

(54) SYSTEM AND RELATED CIRCUITS AND METHODS FOR DETECTING AND LOCATING CELLULAR TELEPHONE USE WITHIN A GEOGRAPHICAL AREA OR FACILITY

(75) Inventors: Robert L. Olbers, Ellicott City, MD (US); Yuan-Min Liu, Rockville, MD (US); Mark S. Nesky, Pikesville, MD (US); Craig A. Plecas, Elkridge, MD (US); Joseph L. Reyes, Columbia, MD (US); John Keimig, Ellicott City, MD (US); Kenji C. Horvath, Columbia, MD (US)

(73) Assignee: Exelis Inc., McLean, VA (US)

( * ) Notice: Subject to any disclaimer, the term of this patent is extended or adjusted under 35 U.S.C. 154(b) by 0 days.

(21) Appl. No.: 13/330,231

(22) Filed: Dec. 19, 2011

(65) Prior Publication Data
US 2012/0088490 A1    Apr. 12, 2012

Related U.S. Application Data

(63) Continuation of application No. 11/974,797, filed on Oct. 16, 2007, now Pat. No. 8,103,293.

(60) Provisional application No. 60/852,385, filed on Oct. 17, 2006, provisional application No. 60/852,444, filed on Oct. 17, 2006, provisional application No. 60/852,324, filed on Oct. 17, 2006, provisional application No. 60/852,440, filed on Oct. 17, 2006, provisional application No. 60/852,441, filed on Oct. 17, 2006, provisional application No. 60/852,323, filed on Oct. 17, 2006, provisional application No. 60/852,322, filed on Oct. 17, 2006, provisional application No. 60/852,321, filed on Oct. 17, 2006, provisional application No. 60/852,442, filed on Oct. 17, 2006, provisional application No. 60/852,384, filed on Oct. 17, 2006.

(51) Int. Cl.
*H04W 24/00* (2009.01)
(52) U.S. Cl. .......... 455/456.6; 455/456.5; 455/434; 455/67.11; 455/26.1
(58) Field of Classification Search .......... 455/456.5, 455/456, 456.6, 434, 67.11, 161.1, 161.2, 455/26.1, 185.1, 435
See application file for complete search history.

(56) References Cited

U.S. PATENT DOCUMENTS 6,091,362 A   7/2000   Stilp et al.
(Continued)

OTHER PUBLICATIONS

Notification of Transmittal of the International Search Report and the Written Opinion of the International Searching Authority, or the Declaration; International Search Report; and Written Opinion of the International Searching Authority, dated Apr. 21, 2008.

(Continued)

*Primary Examiner* — Kamran Afshar
*Assistant Examiner* — Manpreet Matharu
(74) *Attorney, Agent, or Firm* — Edell, Shapiro & Finnan, LLC

(57) ABSTRACT

A system for detecting and locating illicit cellular telephone use within a facility includes an array of radio frequency (RF) receivers, each receiver being placed in a predetermined location in the facility, and a central server, the receivers being in electrical communication with the central server. The server commands a group or groups of receivers to tune to a frequency of interest and to perform detailed sample rate measurements of the RF signal level received at the receivers. The array of receivers is organized into a plurality of measurement areas covering widely separated areas of the facility or different buildings of the facility, and the plurality of receivers of a measurement area is organized into a plurality of measurement groups covering areas of approximately uniform RF propagation conditions. Each receiver scans a frequency band of interest non-synchronously and independently of the other receivers in the array. Also, each receiver is preferably a direct-conversion receiver.

17 Claims, 58 Drawing Sheets

U.S. PATENT DOCUMENTS

| | | | |
|---|---|---|---|
| 6,097,336 A | 8/2000 | Stilp | |
| 6,115,599 A | 9/2000 | Stilp | |
| 6,172,644 B1 | 1/2001 | Stilp | |
| 6,184,829 B1 | 2/2001 | Stilp | |
| 6,266,013 B1 | 7/2001 | Stilp et al. | |
| 6,281,834 B1 | 8/2001 | Stilp | |
| 6,285,321 B1 | 9/2001 | Stilp et al. | |
| 6,317,081 B1 | 11/2001 | Stilp | |
| 6,317,604 B1 | 11/2001 | Kovach, Jr. et al. | |
| 6,334,059 B1 | 12/2001 | Stilp et al. | |
| 6,351,235 B1 | 2/2002 | Stilp | |
| 6,366,241 B2 | 4/2002 | Pack et al. | |
| 6,388,618 B1 | 5/2002 | Stilp et al. | |
| 6,400,320 B1 | 6/2002 | Stilp et al. | |
| 6,463,290 B1 | 10/2002 | Stilp et al. | |
| 6,483,460 B2 | 11/2002 | Stilp et al. | |
| 6,492,944 B1 | 12/2002 | Stilp | |
| 6,519,465 B2 | 2/2003 | Stilp et al. | |
| 6,563,460 B2 | 5/2003 | Stilp et al. | |
| 6,603,428 B2 | 8/2003 | Stilp | |
| 6,646,604 B2 | 11/2003 | Anderson | |
| 6,661,379 B2 | 12/2003 | Stilp et al. | |
| 6,765,531 B2 | 7/2004 | Anderson | |
| 6,782,264 B2 | 8/2004 | Anderson | |
| 6,812,824 B1 * | 11/2004 | Goldinger et al. | 340/10.1 |
| 6,873,290 B2 | 3/2005 | Anderson et al. | |
| 6,876,859 B2 | 4/2005 | Anderson et al. | |
| 6,996,392 B2 | 2/2006 | Anderson et al. | |
| 7,023,383 B2 | 4/2006 | Stilp et al. | |
| 7,167,713 B2 | 1/2007 | Anderson | |
| 7,271,765 B2 | 9/2007 | Stilp et al. | |
| 7,427,952 B2 | 9/2008 | Bull et al. | |
| 7,440,762 B2 | 10/2008 | Maloney et al. | |
| 7,593,738 B2 | 9/2009 | Anderson | |
| 7,646,312 B2 | 1/2010 | Rosen | |
| 7,667,649 B2 | 2/2010 | LeFever et al. | |
| 7,689,240 B2 | 3/2010 | Anderson | |
| 7,783,299 B2 | 8/2010 | Anderson et al. | |
| 7,797,000 B2 | 9/2010 | Anderson | |
| 7,804,448 B2 | 9/2010 | Bull et al. | |
| 7,844,280 B2 | 11/2010 | Anderson et al. | |
| 7,848,733 B2 | 12/2010 | Bull et al. | |
| RE42,285 E | 4/2011 | Anderson et al. | |
| 7,920,875 B2 | 4/2011 | Anderson | |
| 7,924,224 B2 | 4/2011 | LeFever et al. | |
| 7,925,274 B2 | 4/2011 | Anderson et al. | |
| 7,956,808 B2 | 6/2011 | Boyer et al. | |
| 7,974,627 B2 | 7/2011 | Mia et al. | |
| 7,974,640 B2 | 7/2011 | Anderson | |
| 8,010,079 B2 | 8/2011 | Mia et al. | |
| 8,041,367 B2 | 10/2011 | Anderson et al. | |
| 8,041,505 B2 | 10/2011 | Pierce et al. | |
| 8,045,506 B2 | 10/2011 | Mia et al. | |
| 8,059,028 B2 | 11/2011 | Boyer et al. | |
| 8,102,317 B2 | 1/2012 | Lee et al. | |
| 8,106,828 B1 | 1/2012 | Do et al. | |
| 8,116,784 B2 | 2/2012 | Mia | |
| 8,125,389 B1 | 2/2012 | Opshaug et al. | |
| 8,138,975 B2 | 3/2012 | Bull et al. | |
| 8,138,976 B2 | 3/2012 | Boyer et al. | |
| 8,140,092 B2 | 3/2012 | Mia et al. | |
| 8,145,238 B2 | 3/2012 | Anderson et al. | |
| 8,149,168 B1 | 4/2012 | Rabinowitz et al. | |
| 8,150,421 B2 | 4/2012 | Ward et al. | |
| 2001/0022558 A1 * | 9/2001 | Karr et al. | 342/450 |
| 2003/0048221 A1 | 3/2003 | Tseng et al. | |
| 2003/0144011 A1 * | 7/2003 | Richards et al. | 455/456 |
| 2005/0053241 A1 | 3/2005 | Fan et al. | |
| 2005/0181809 A1 * | 8/2005 | Hild et al. | 455/456.5 |
| 2006/0223519 A1 | 10/2006 | Yahagi | |
| 2007/0250910 A1 | 10/2007 | Miller et al. | |
| 2010/0130182 A1 | 5/2010 | Rosen | |
| 2011/0183685 A1 | 7/2011 | Burton et al. | |

OTHER PUBLICATIONS

Notification Concerning Transmittal of International Preliminary Report on Patentability; International Preliminary Report on Patentability, dated Apr. 21, 2008.

AirPatrol Corp., AirPatrol ZoneDefense, WiFi and Cellular Intelligence for Cognitive Mobility and Wireless Situational Awareness, product information web page, Copyright 2012.

Extended Search Report in counterpart European Application No. 07861418.7, mailed Jun. 5, 2012.

* cited by examiner

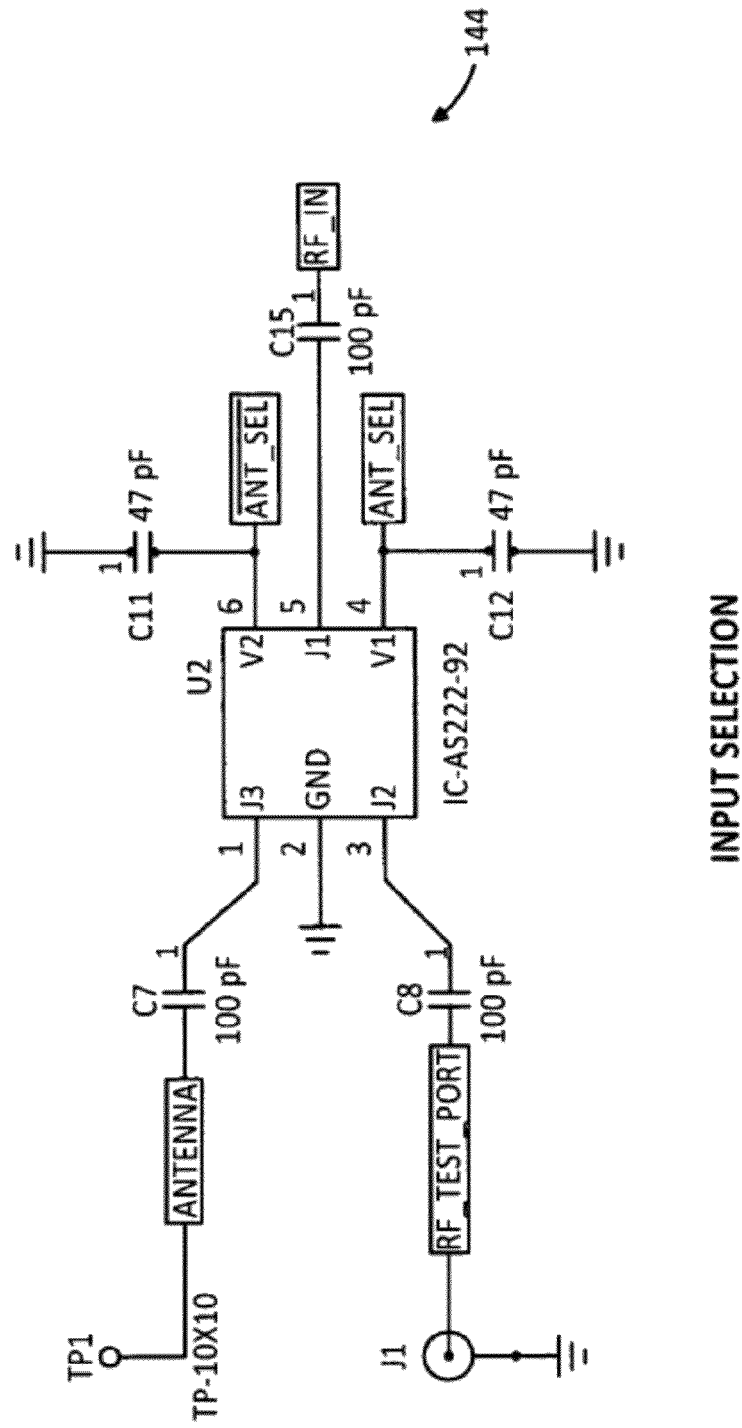
Fig. 3a(1)

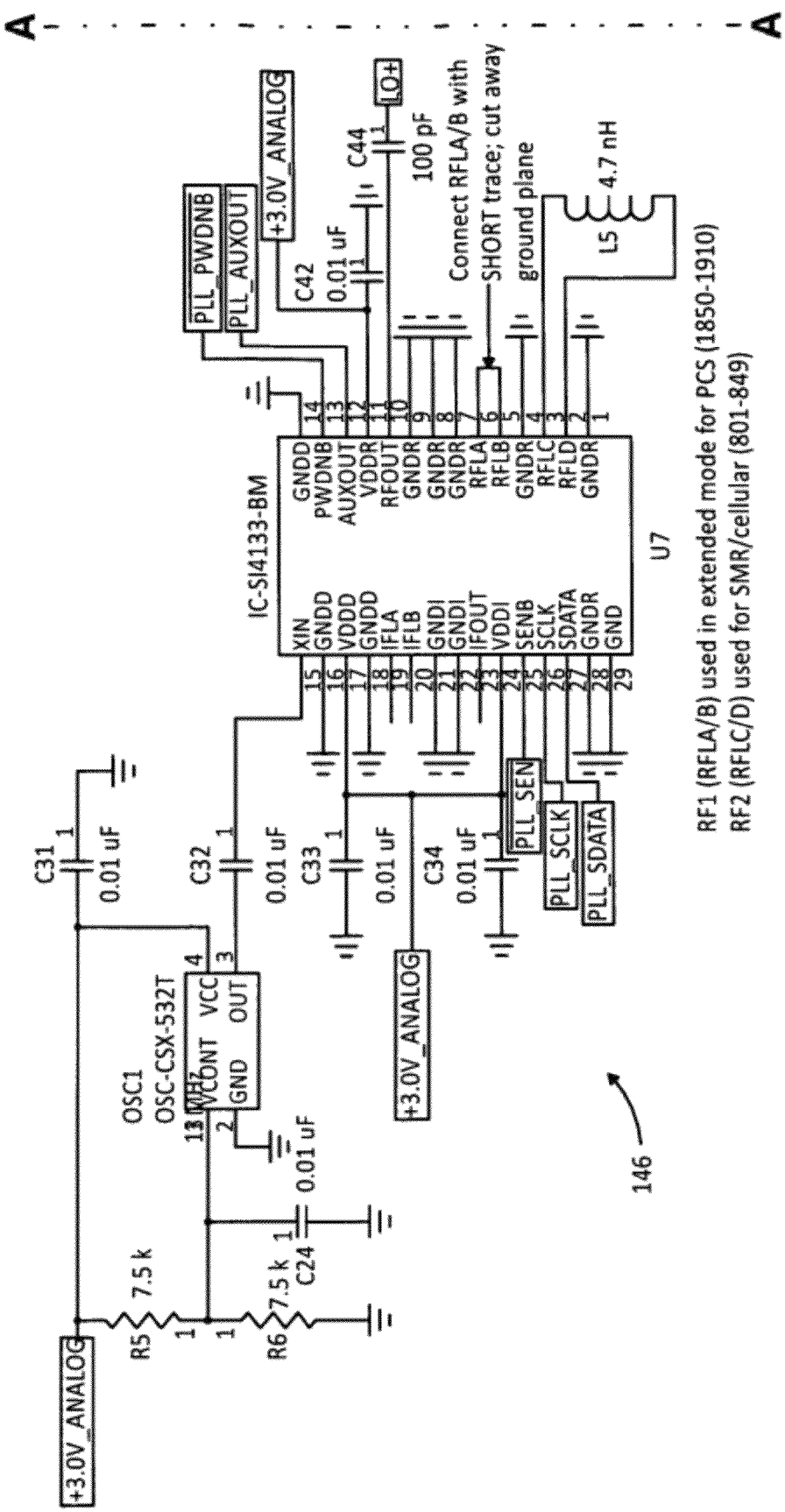
Fig. 3a(2)
PLL SYNTHESIZER

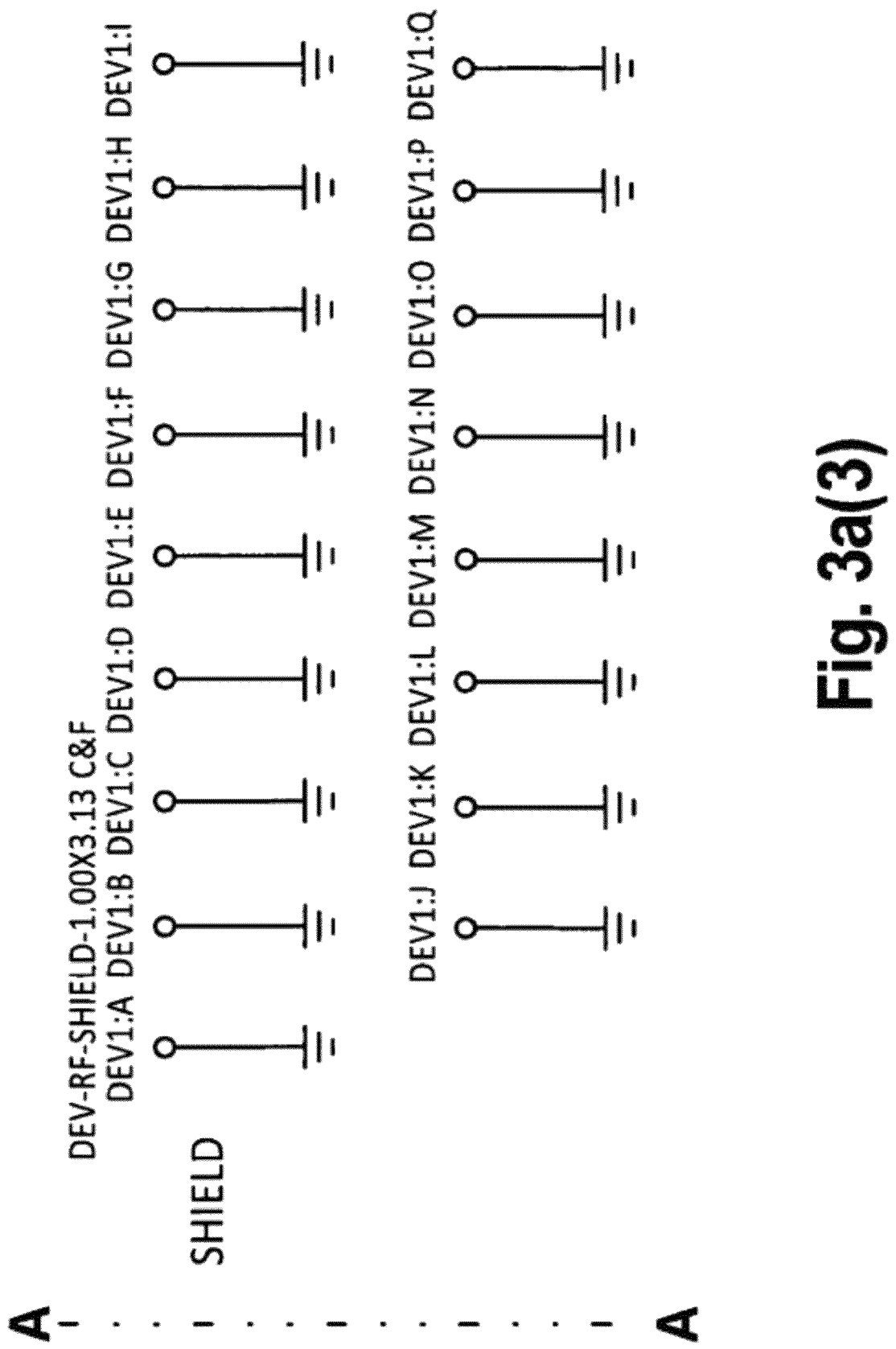
Fig. 3a(3)

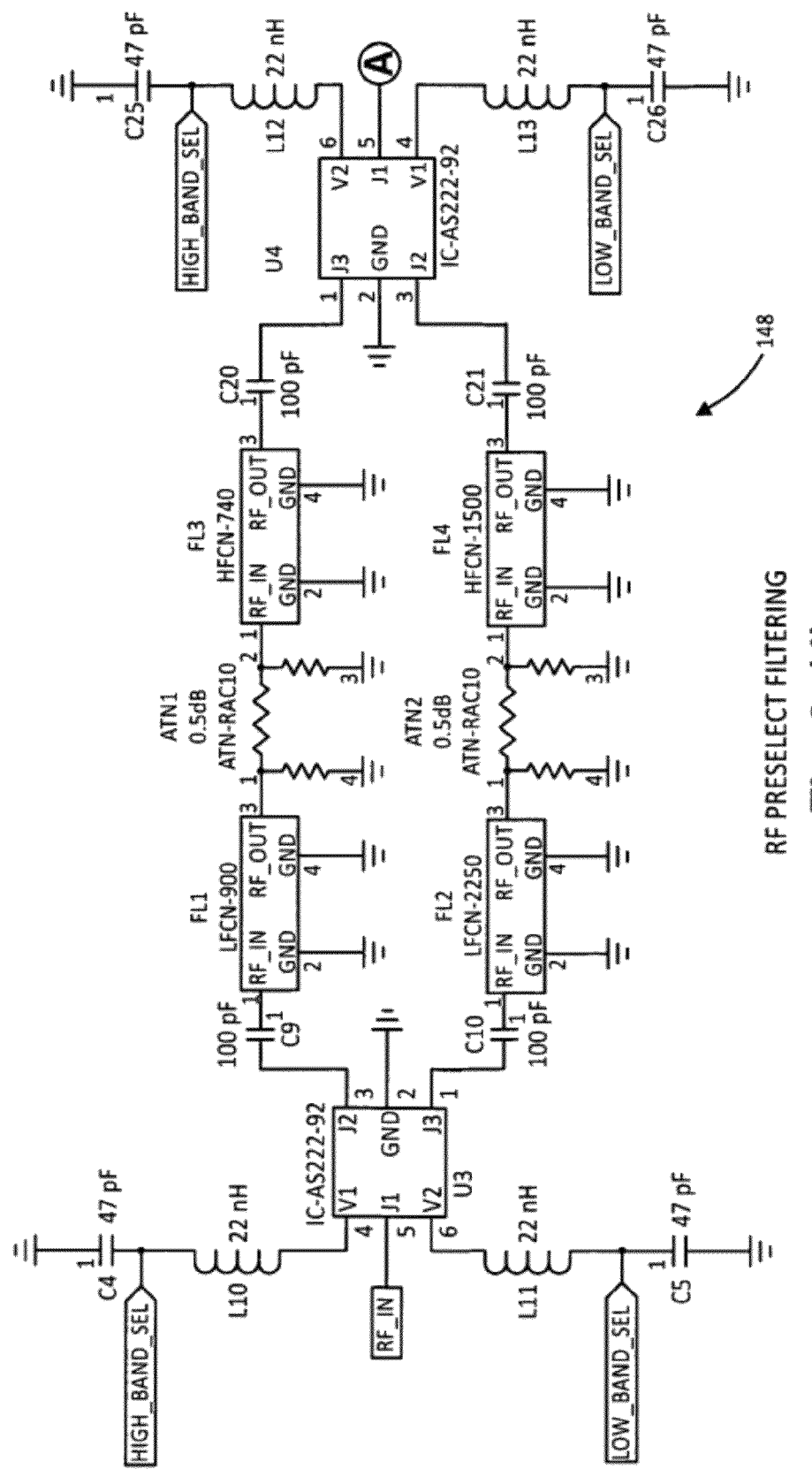
Fig. 3a(4)
RF PRESELECT FILTERING

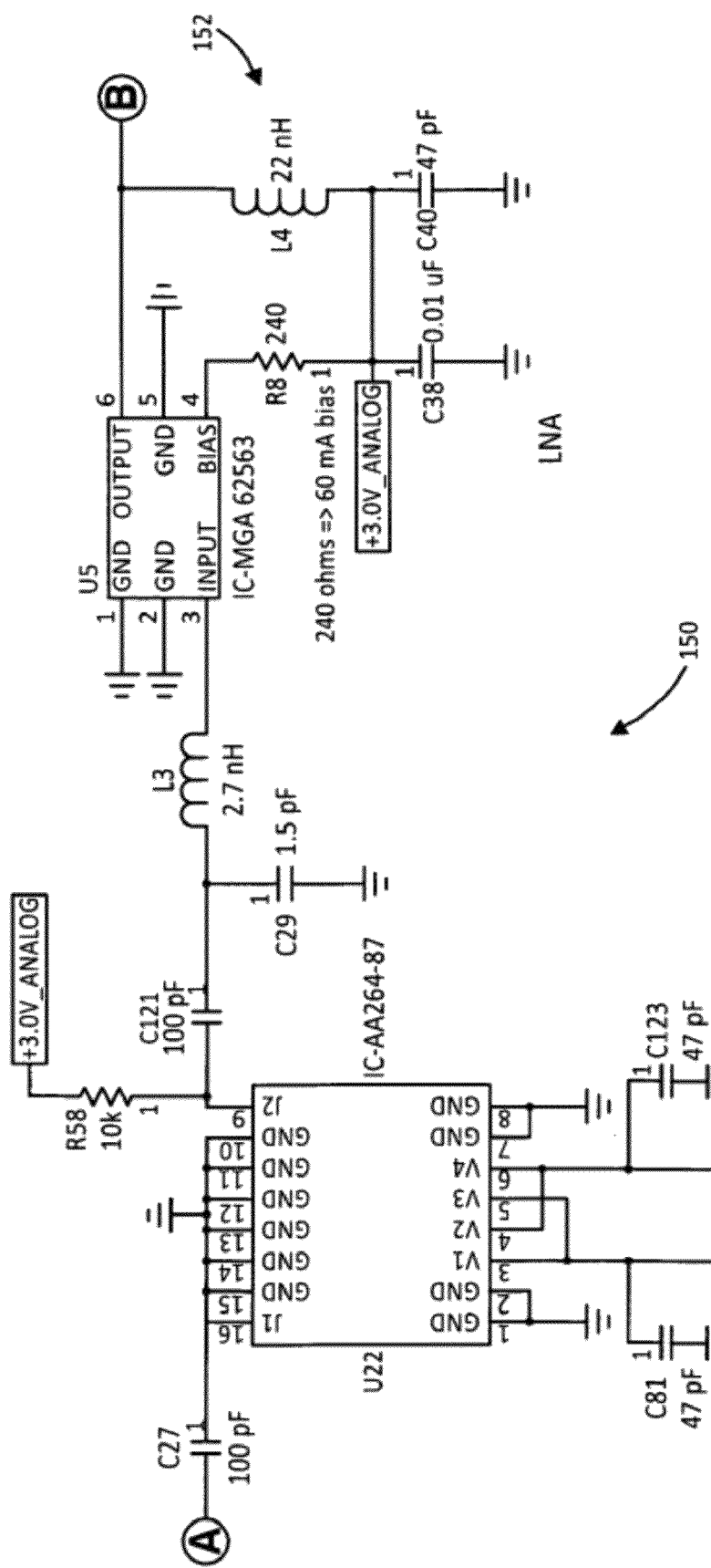
Fig. 3a(5)

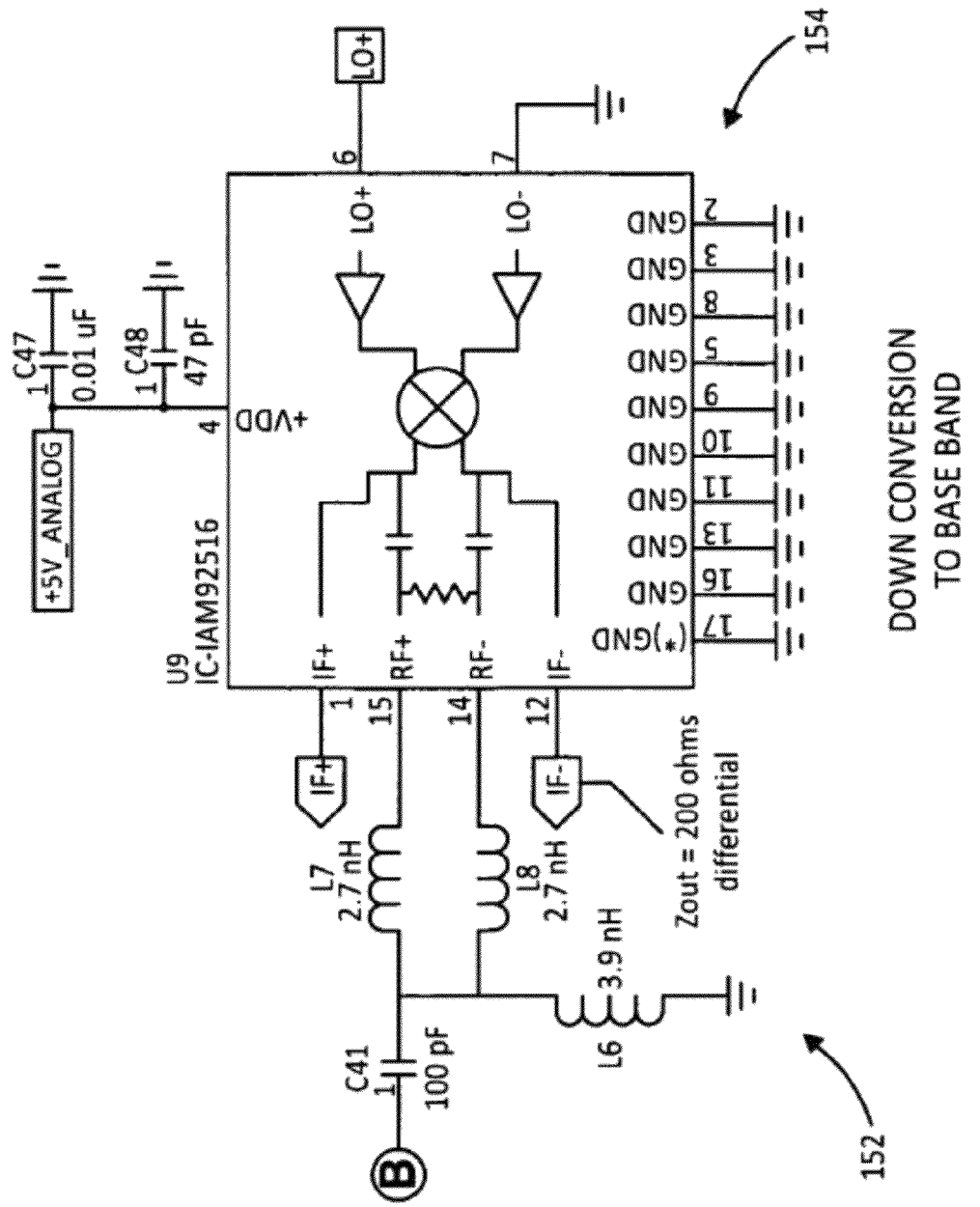
Fig. 3a(6)

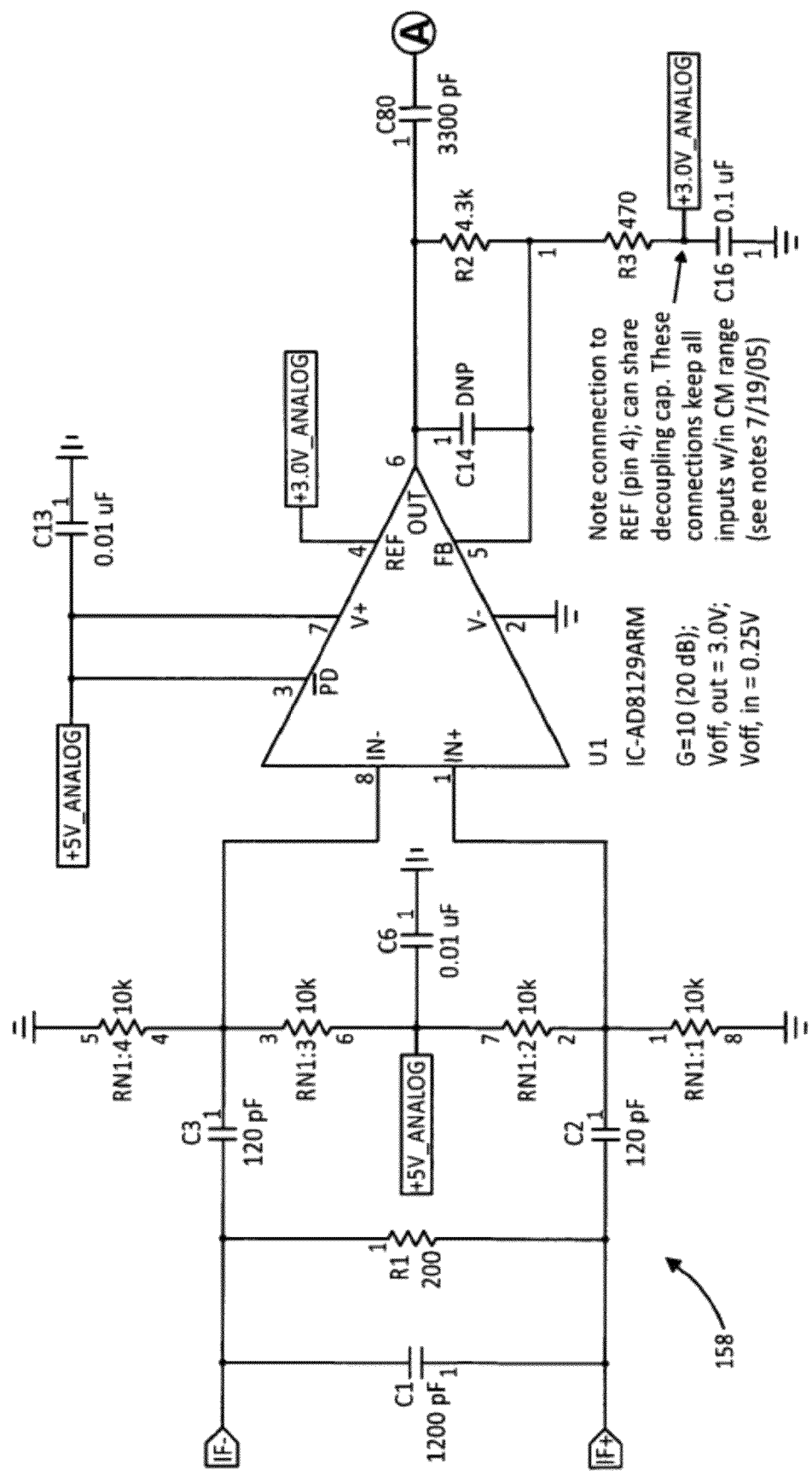
Fig. 3a(7)

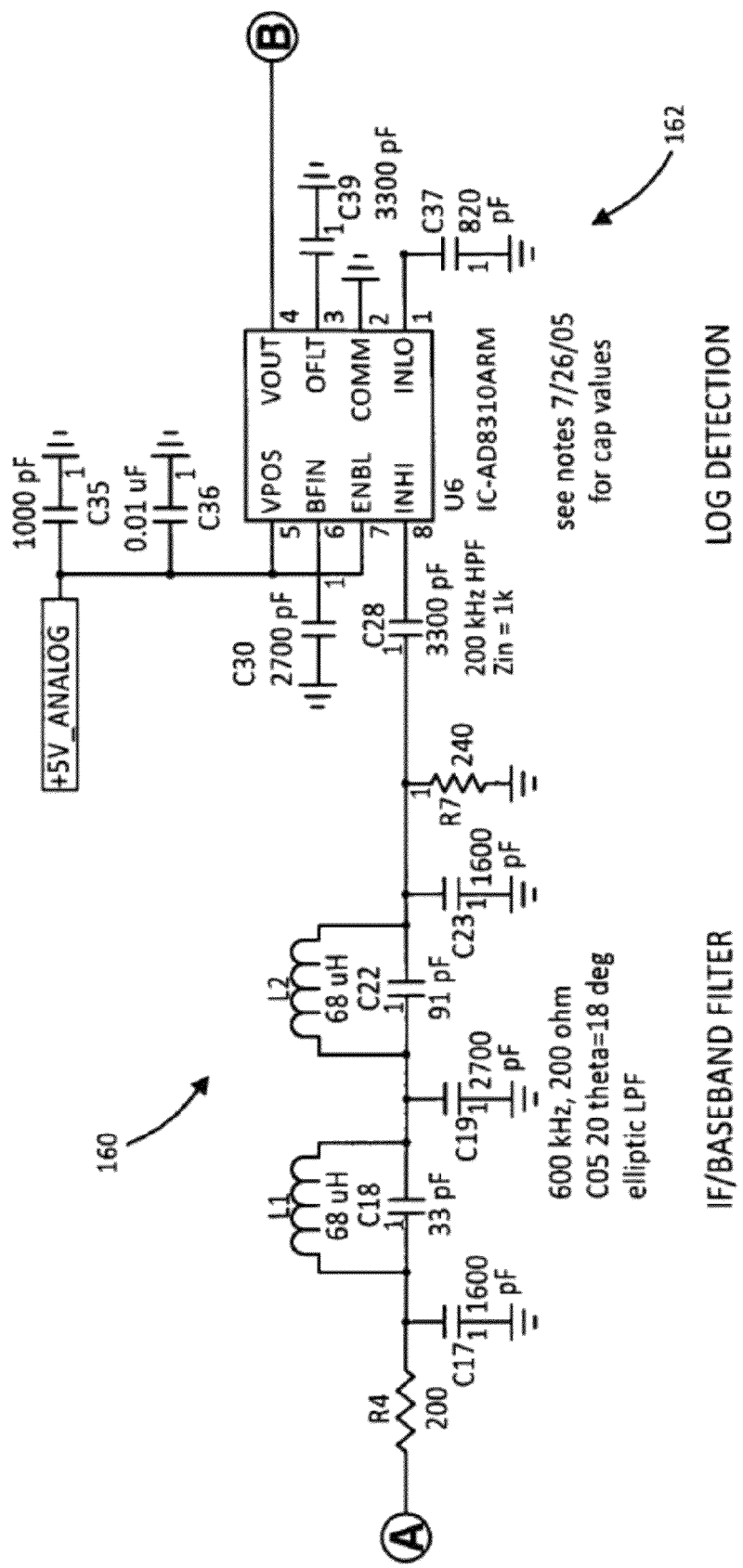
Fig. 3a(8)

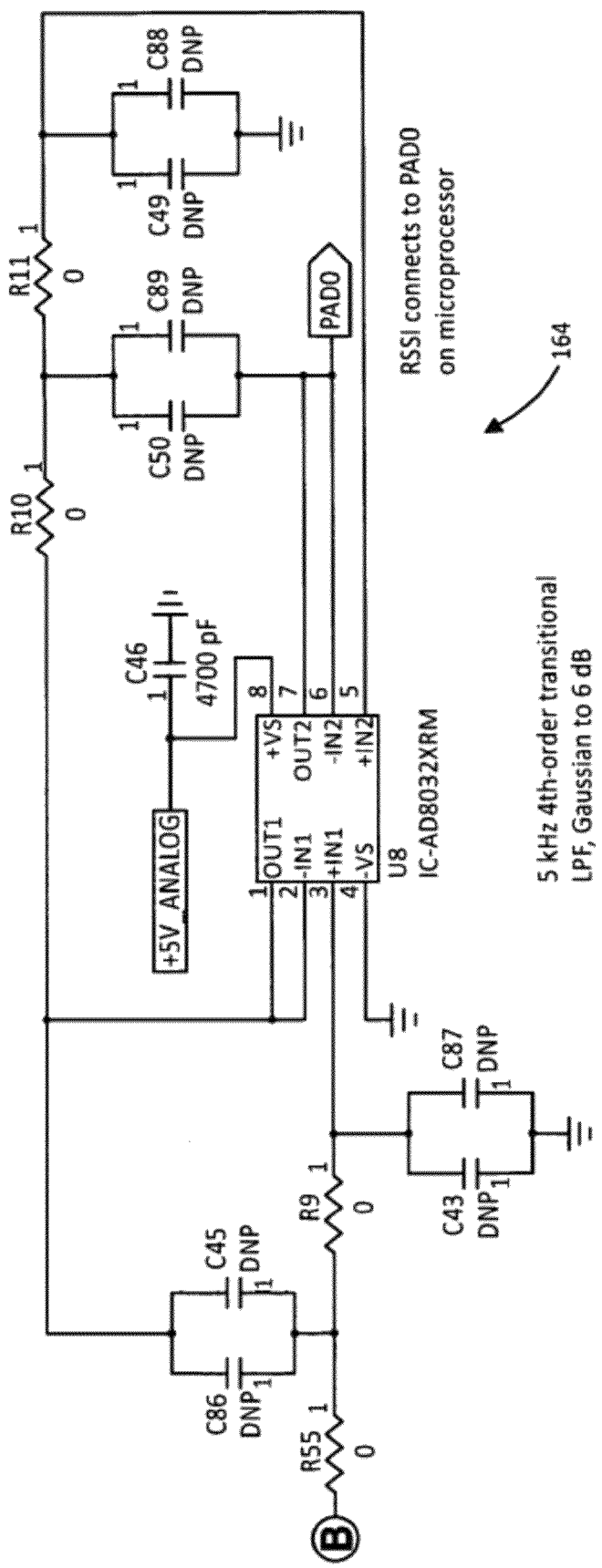
Fig. 3a(9)

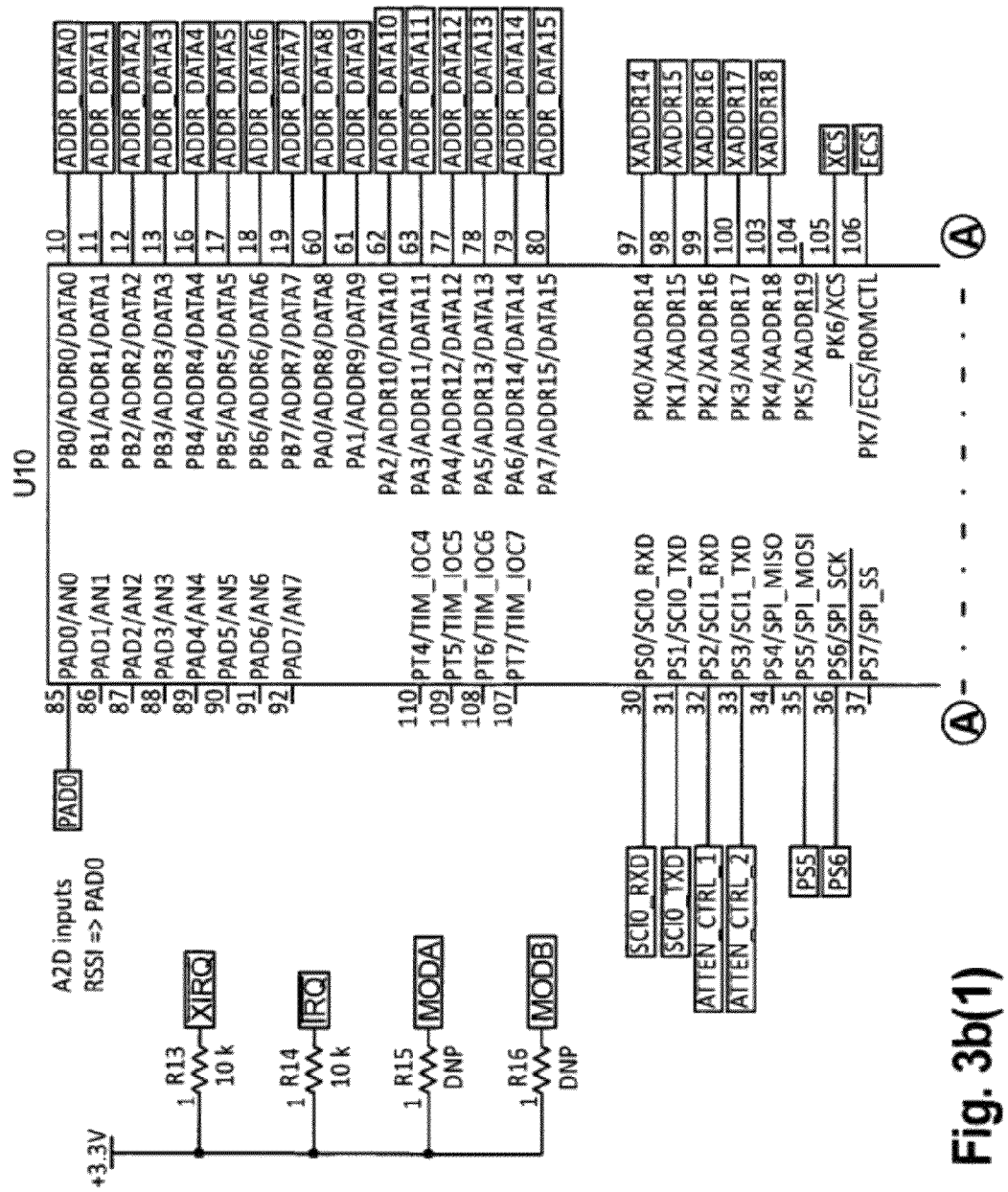
Fig. 3b(1)

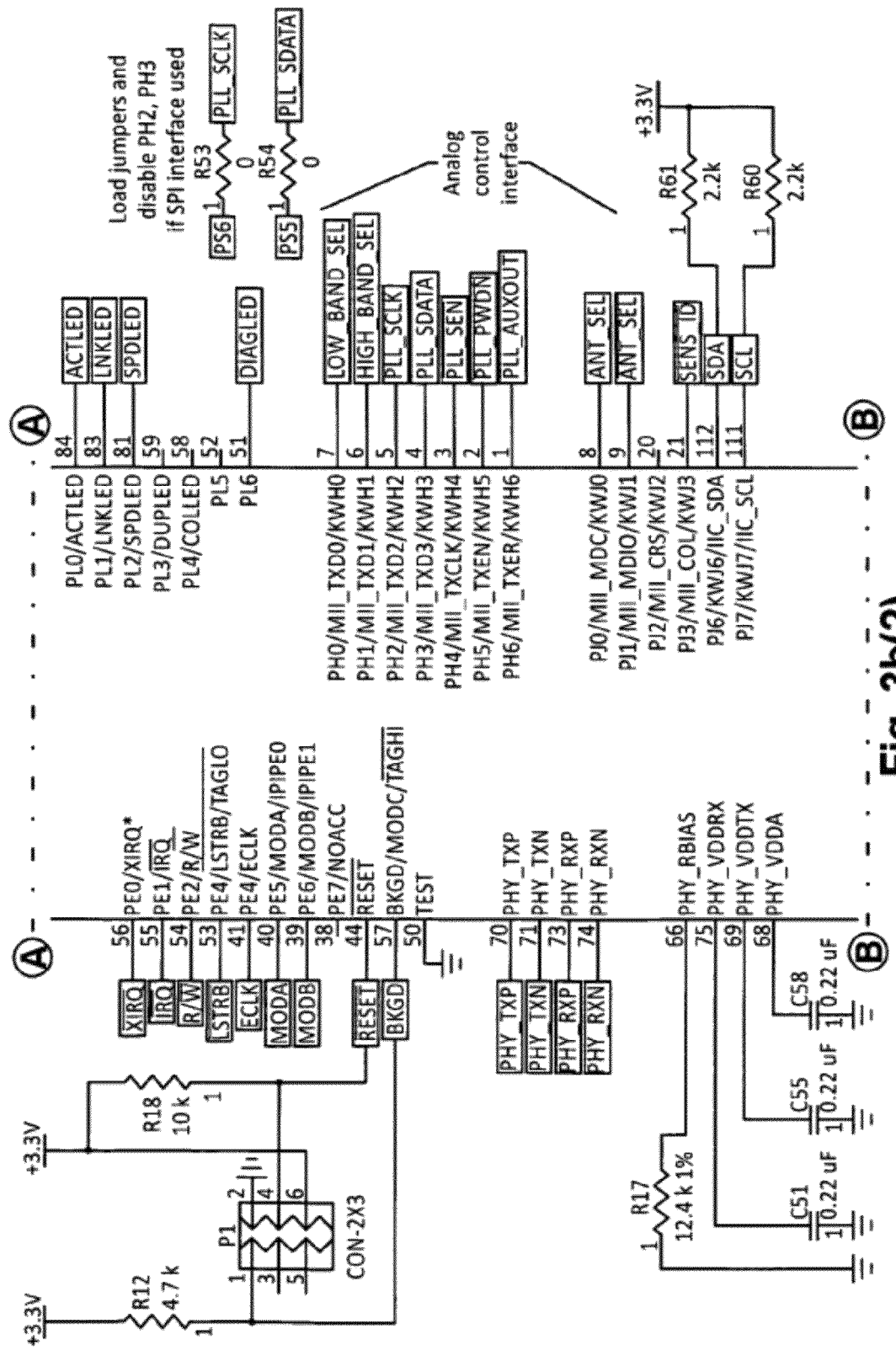
Fig. 3b(2)

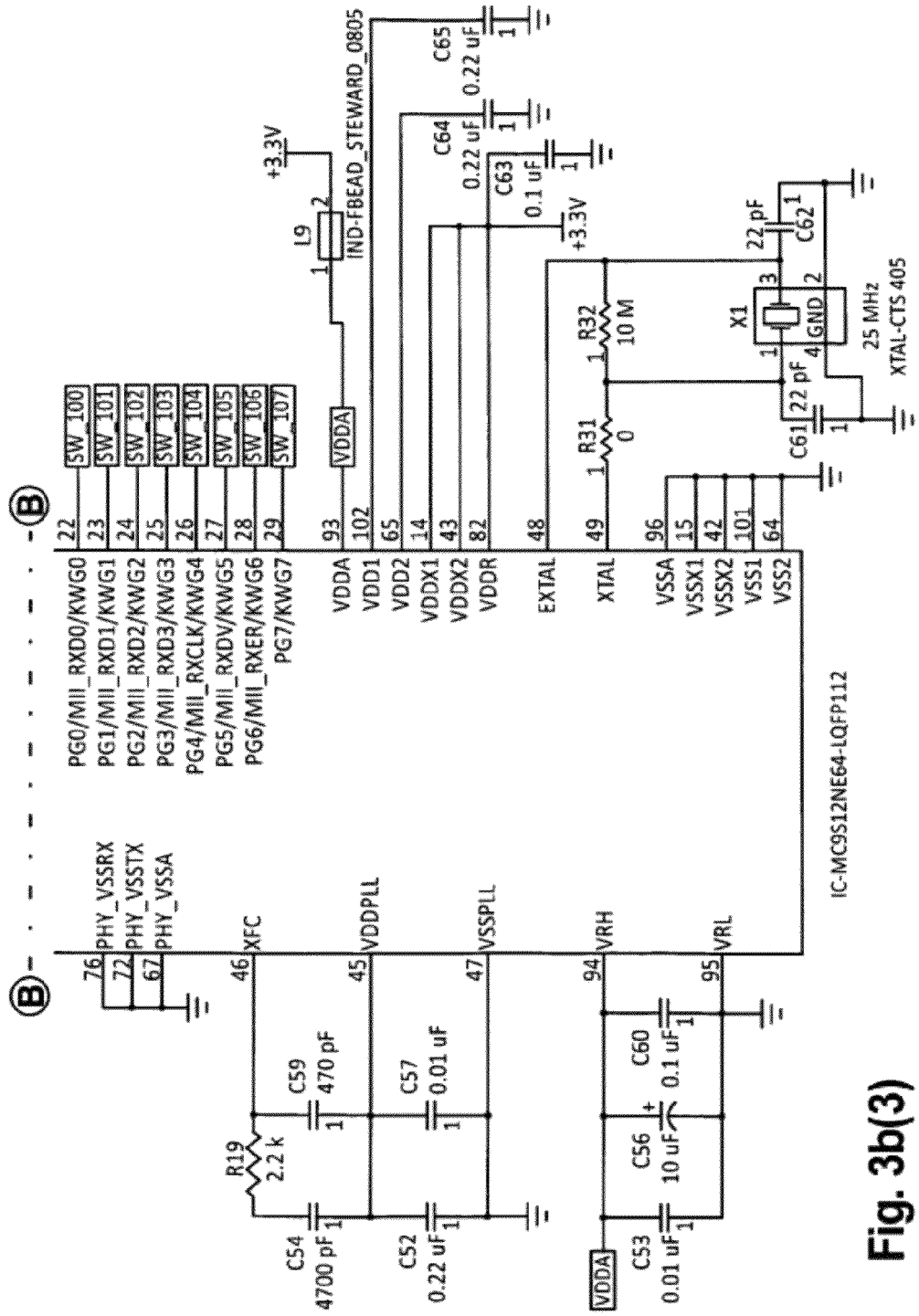
Fig. 3b(3)

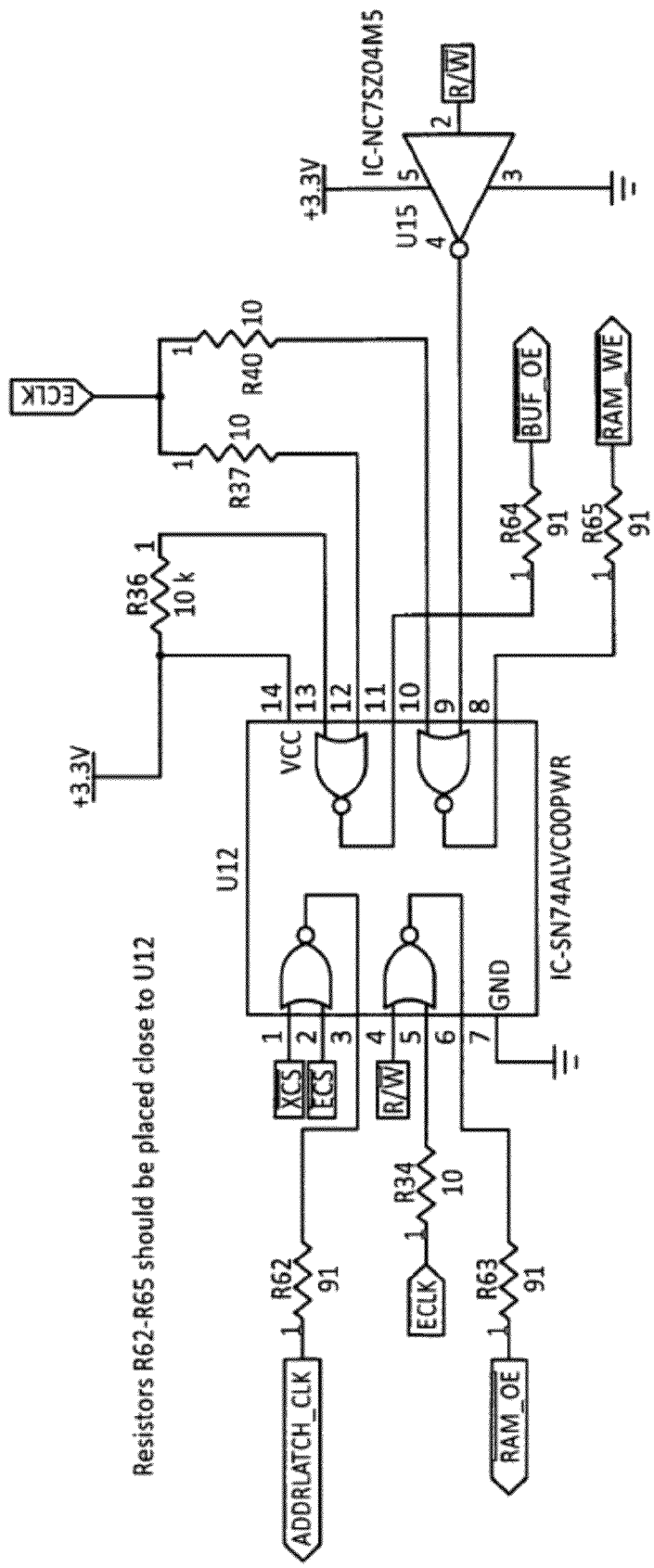
Fig. 3b(4)

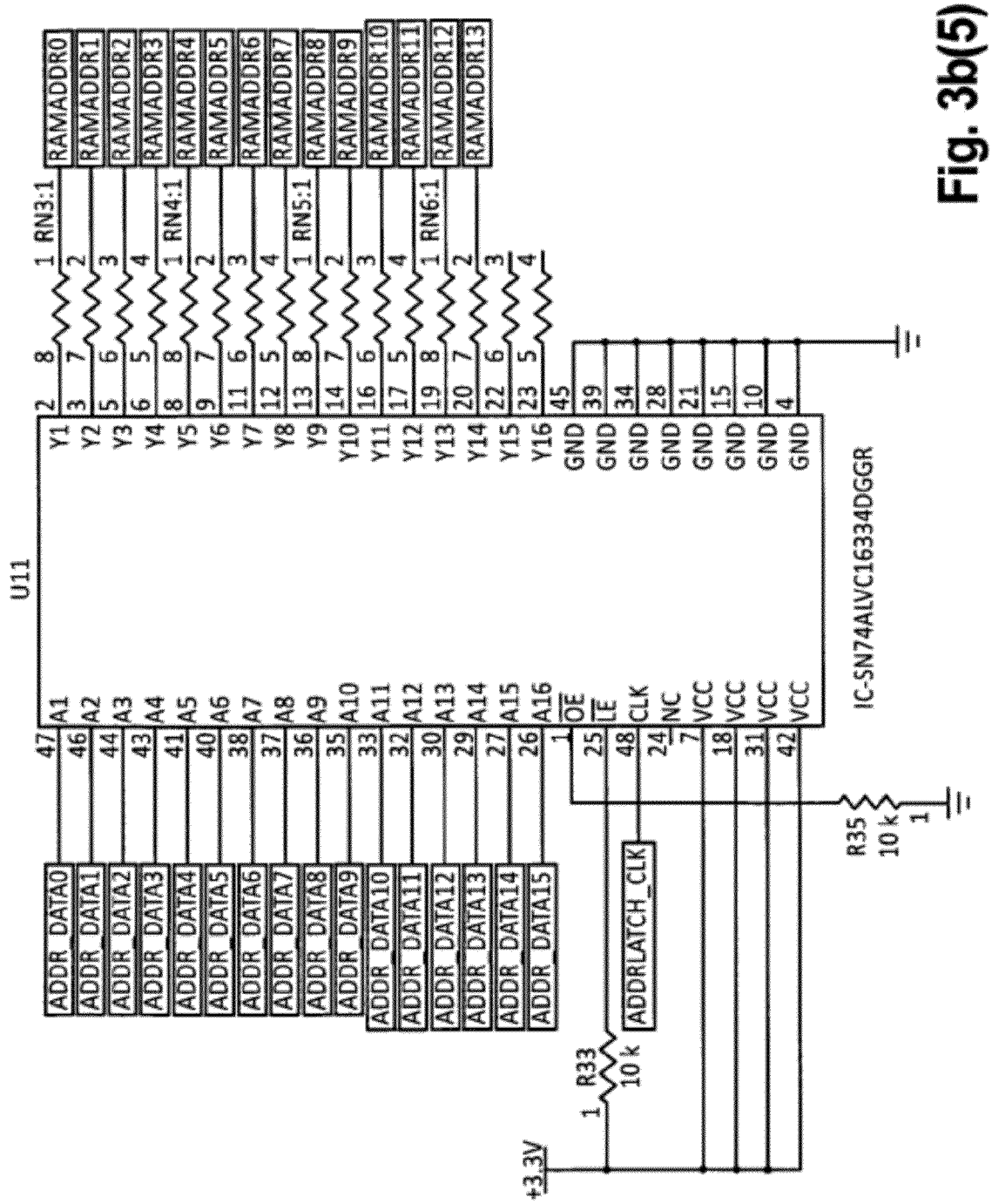
Fig. 3b(5)

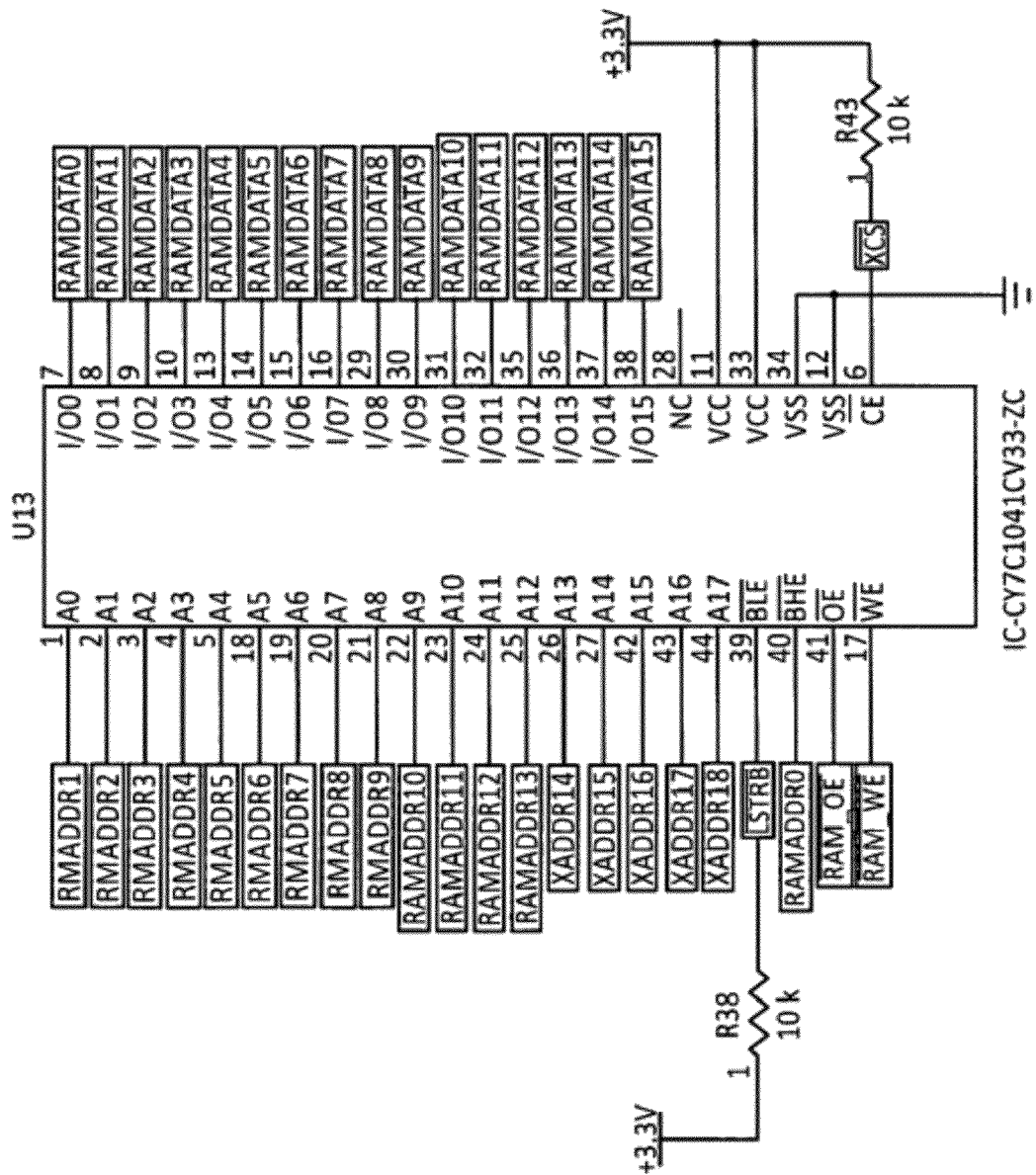
Fig. 3b(6)

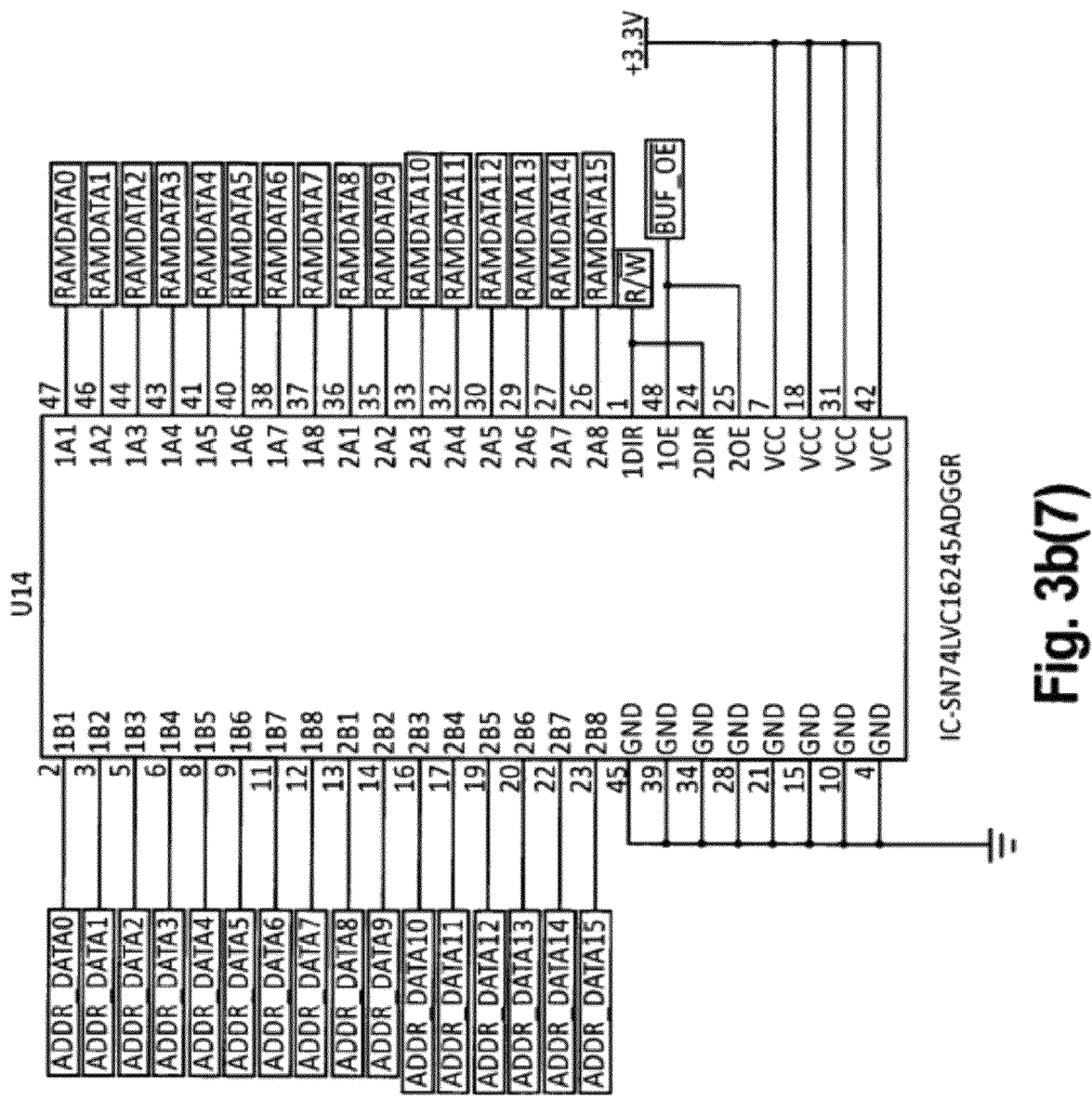
Fig. 3b(7)

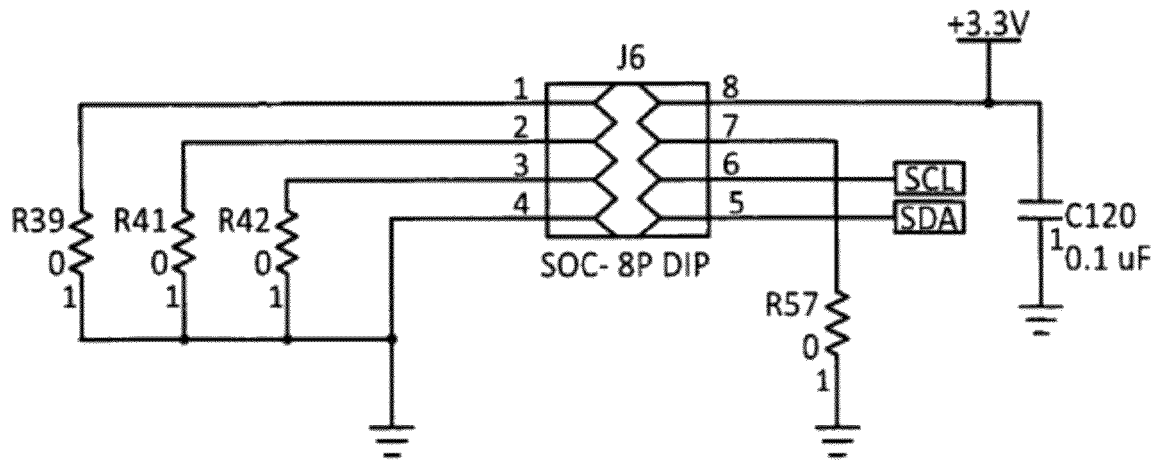
Fig. 3b(8)
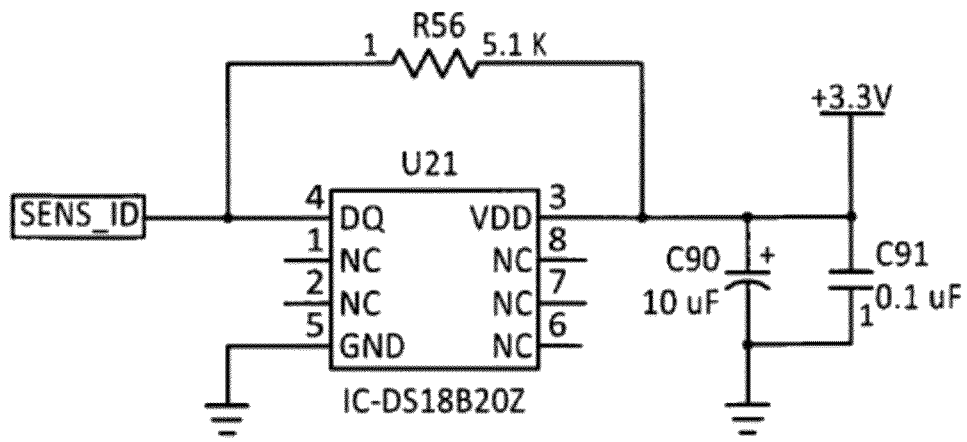
Fig. 3b(9)

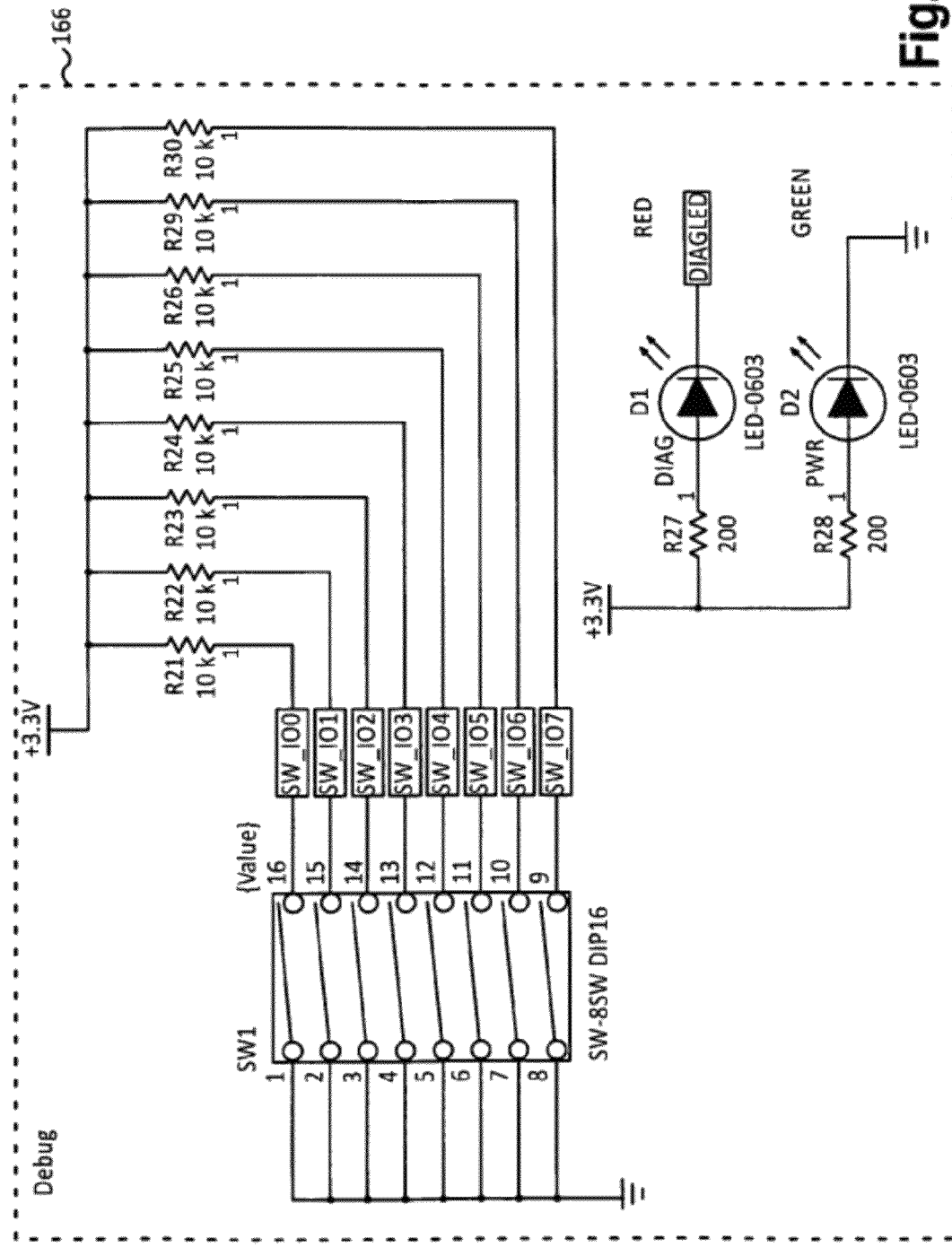
Fig. 3b(10)

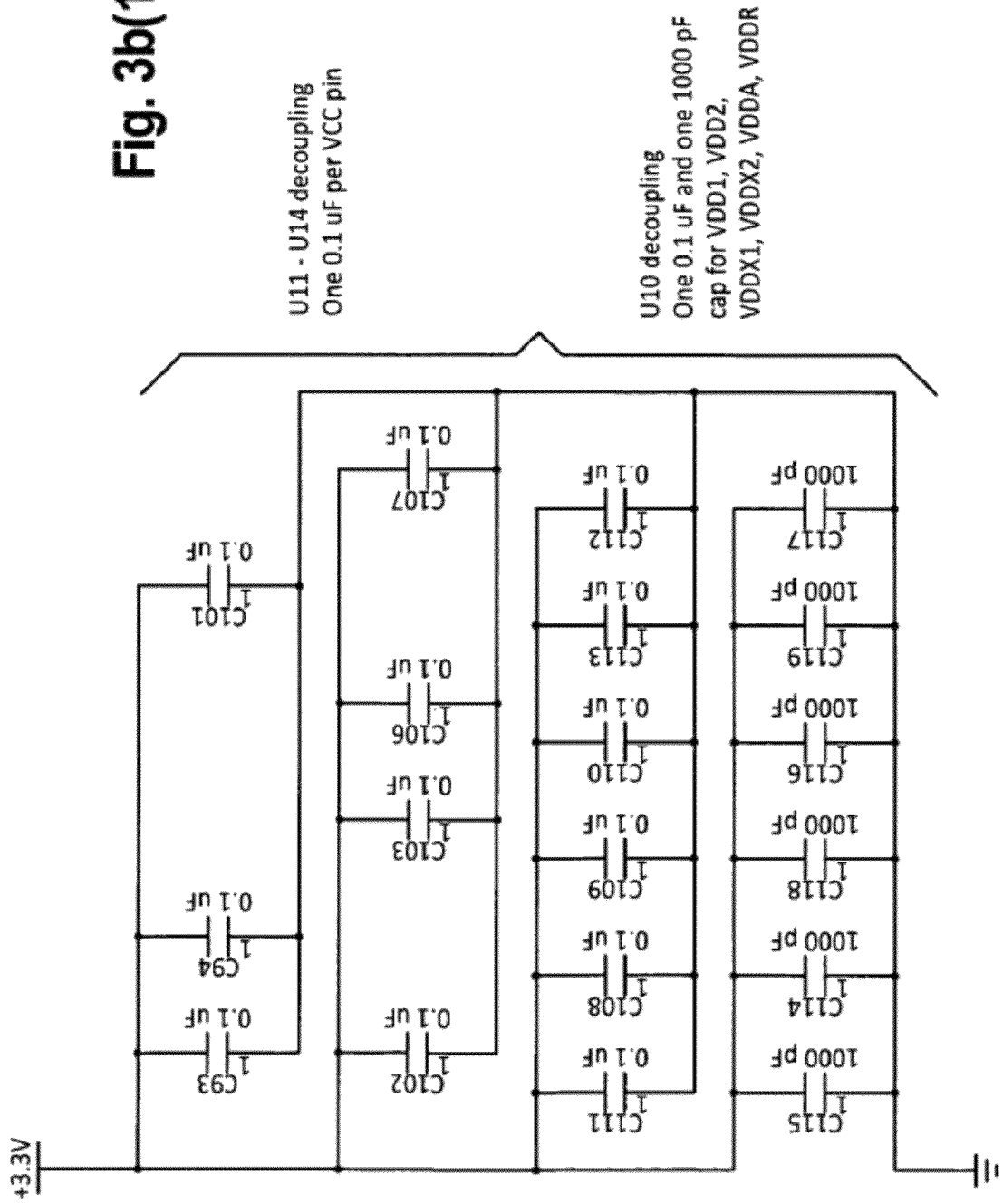
Fig. 3b(11)

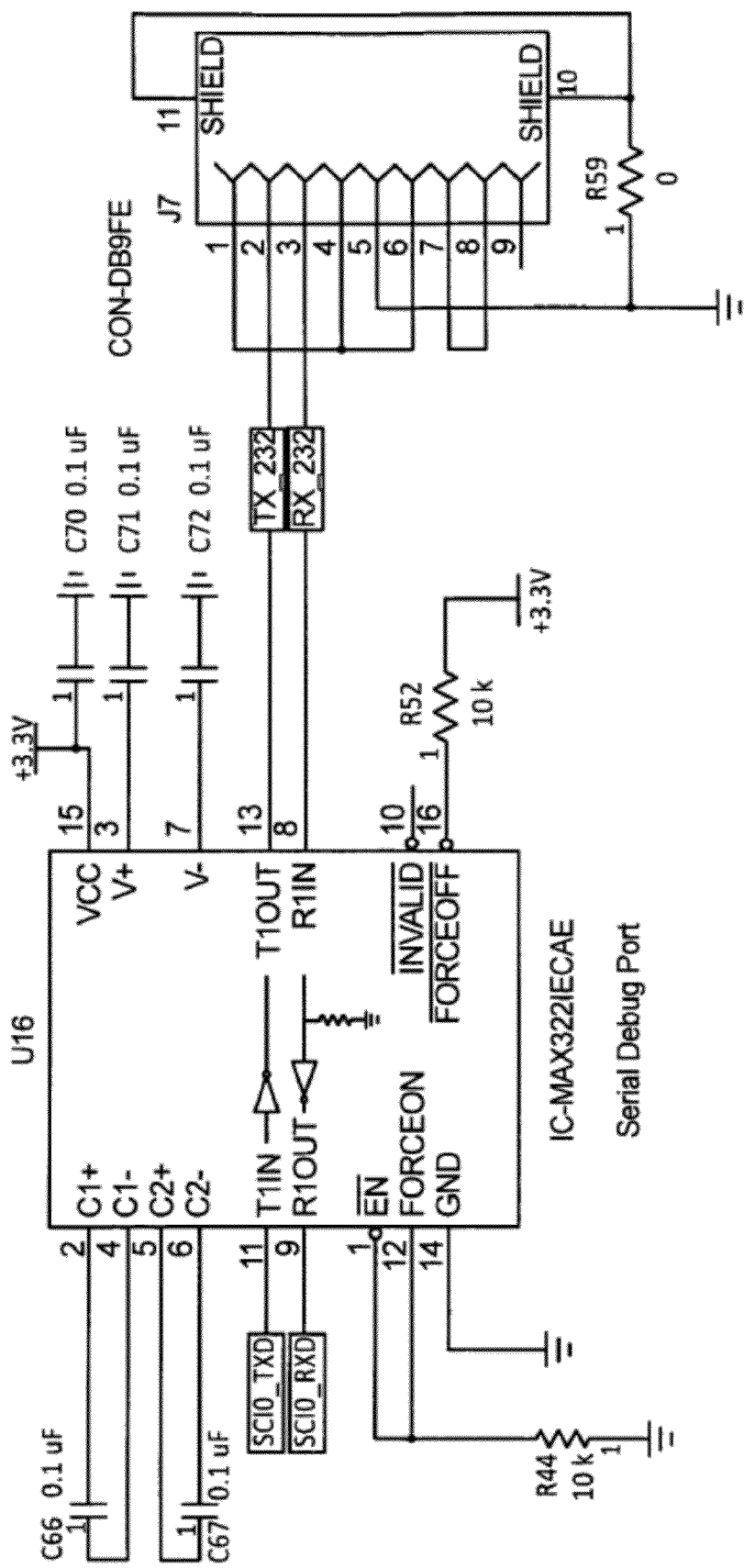
Fig. 3c(1)

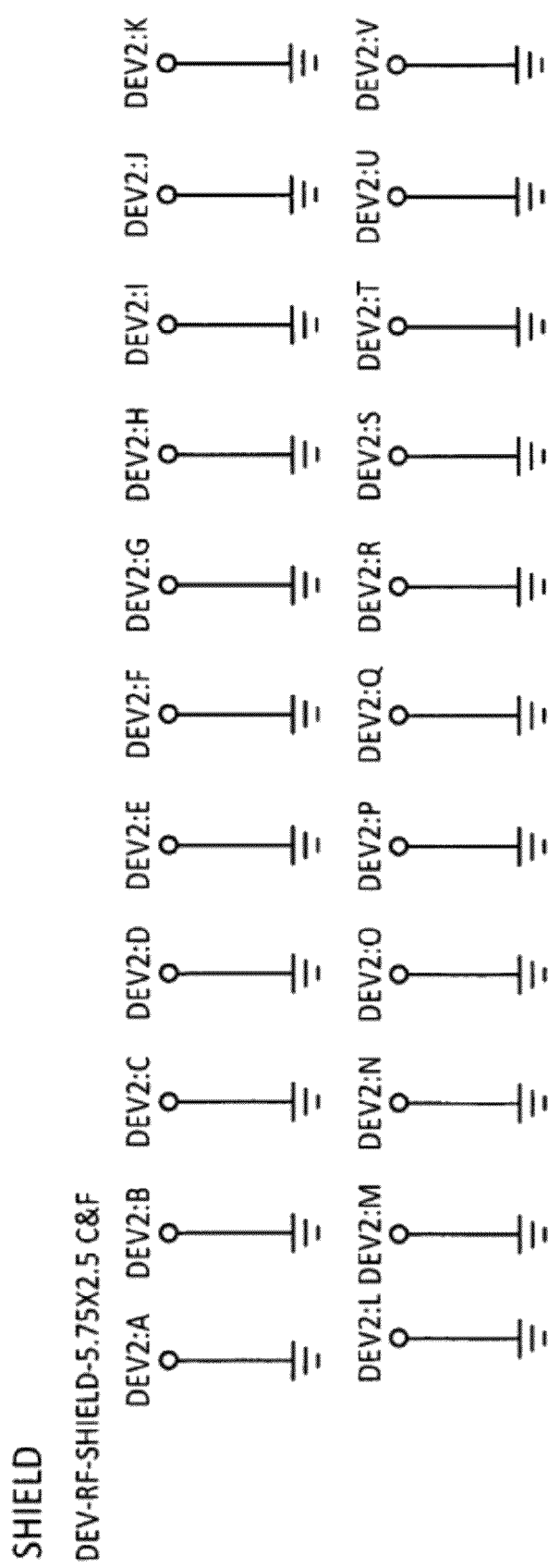
Fig. 3c(2)

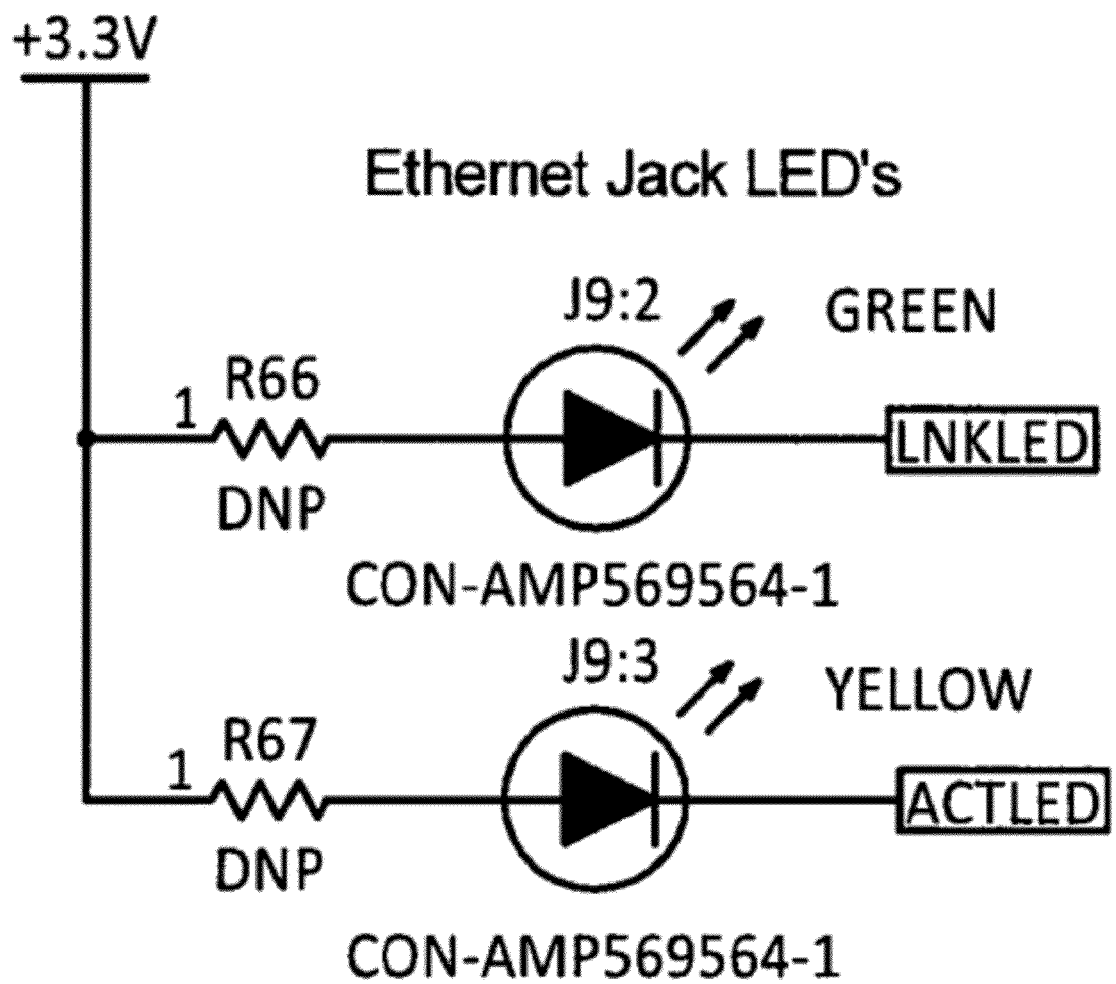
Fig. 3c(3)

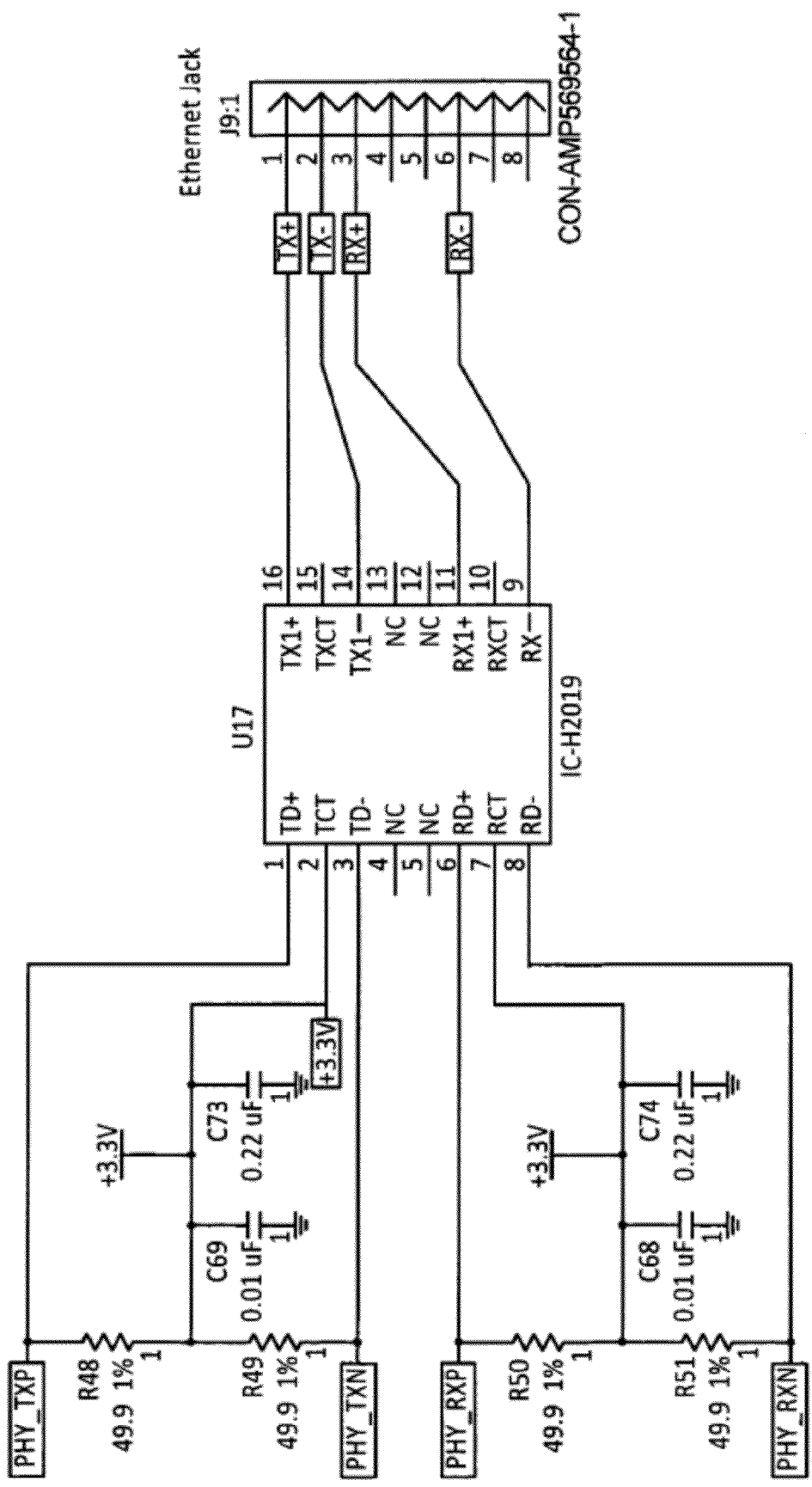
Fig. 3c(4)

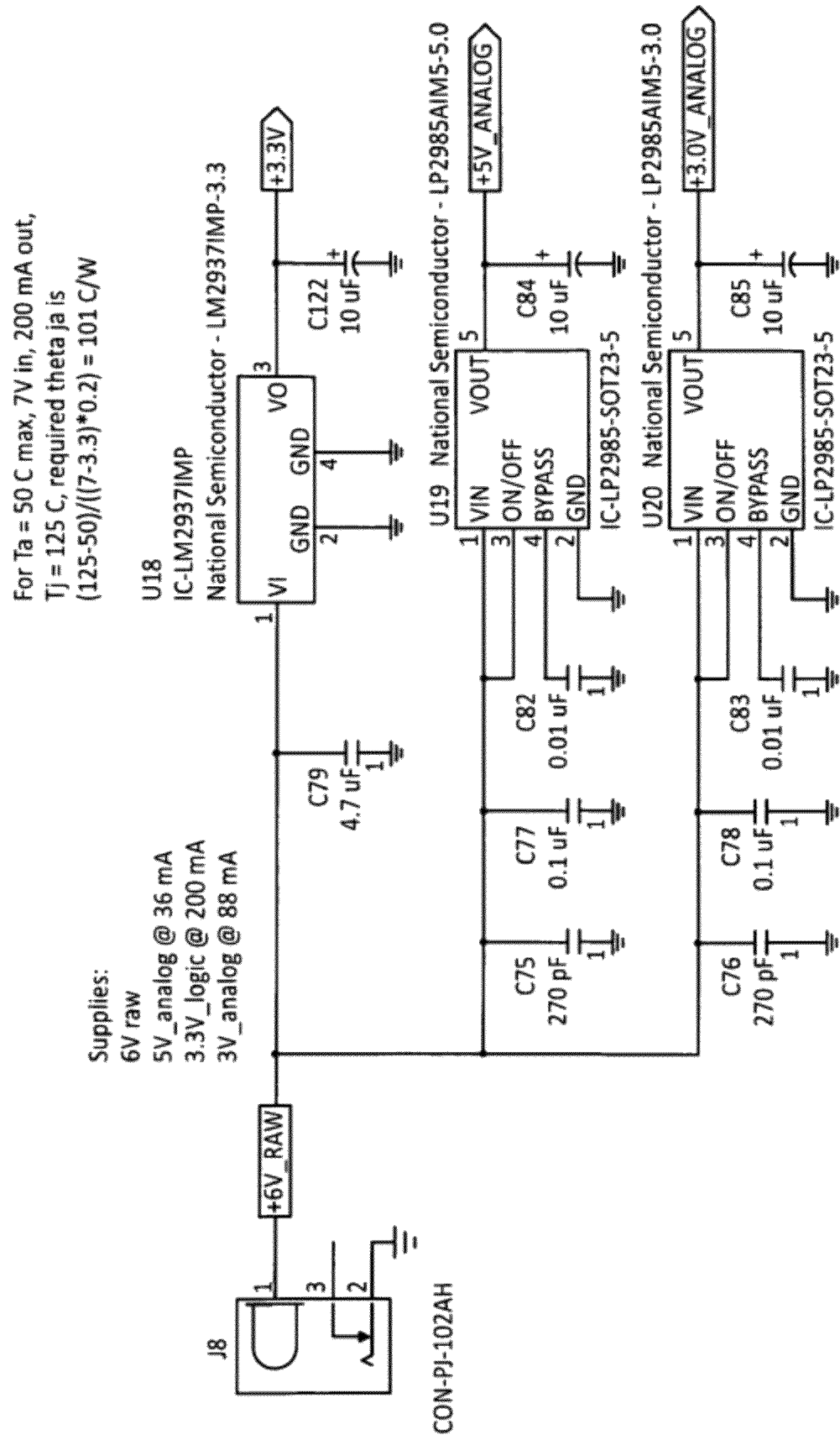
Fig. 3c(5)

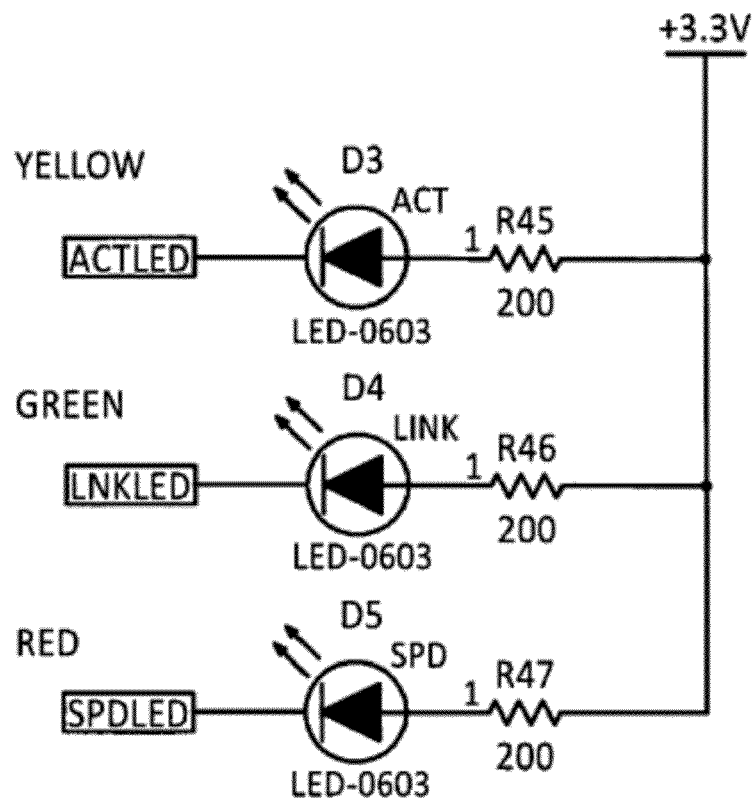
Fig. 3c(6)
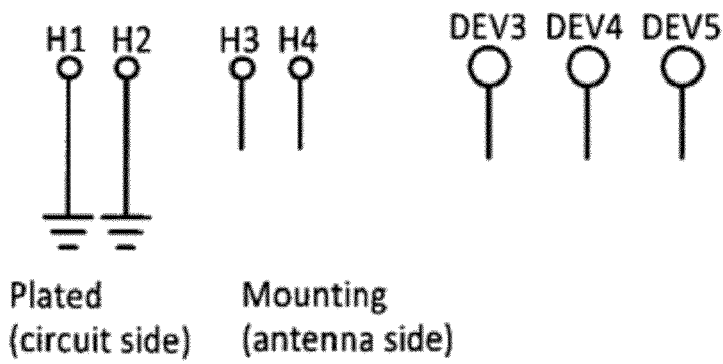
Fig. 3c(7)

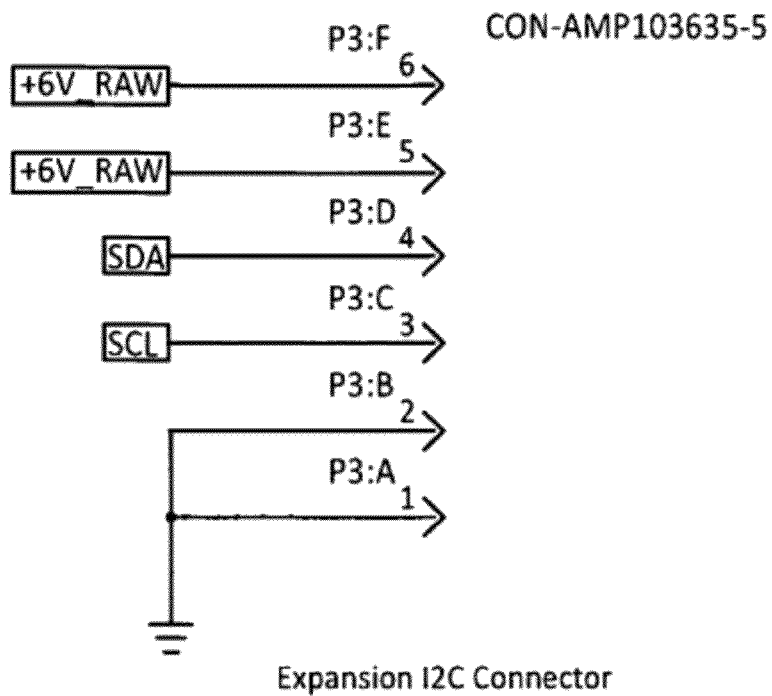
Expansion I2C Connector
Note on component types:
All capacitors unless otherwise noted are NPO (where available) or X7R, 10 WVDC minimum.
Fig. 3c(8)
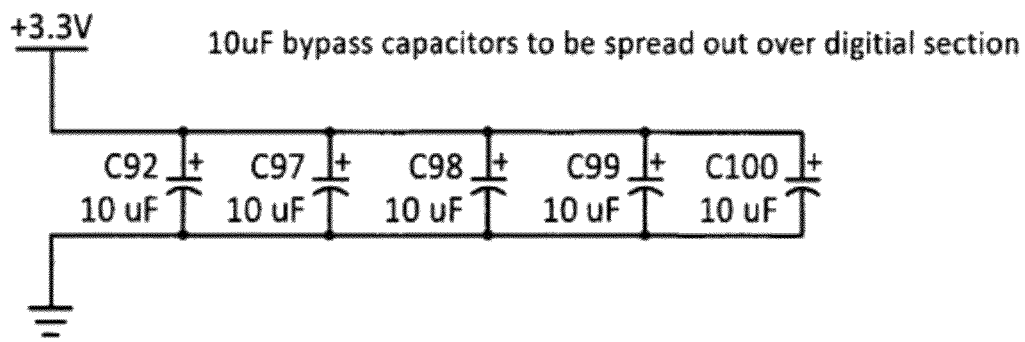
Fig. 3c(9)

| Band: | Comment: | Min Freq MHz: | Max Freq MHz: |
|---|---|---|---|
| Cellular | Original AMPS cell phone band | 824 | 849 |
| ESMR | Extended Specialized Mobile Radio; used by Nextel, Southern LINC | 806 | 821 |
| CMRS | Commercial Mobile Radio Service; additional Nextel allocation for 800 MHz reband | 896 | 901 |
| ISM900 | Industrial/Scientific/Medical; used for Nextel Direct Talk (off network mobile-to-mobile) | 902 | 928 |
| PCS | Personal Communications Services | 1850 | 1910 |
| AWS | Additional Nextel allocation for 800 MHZ reband | 1910 | 1915 |

Fig. 8

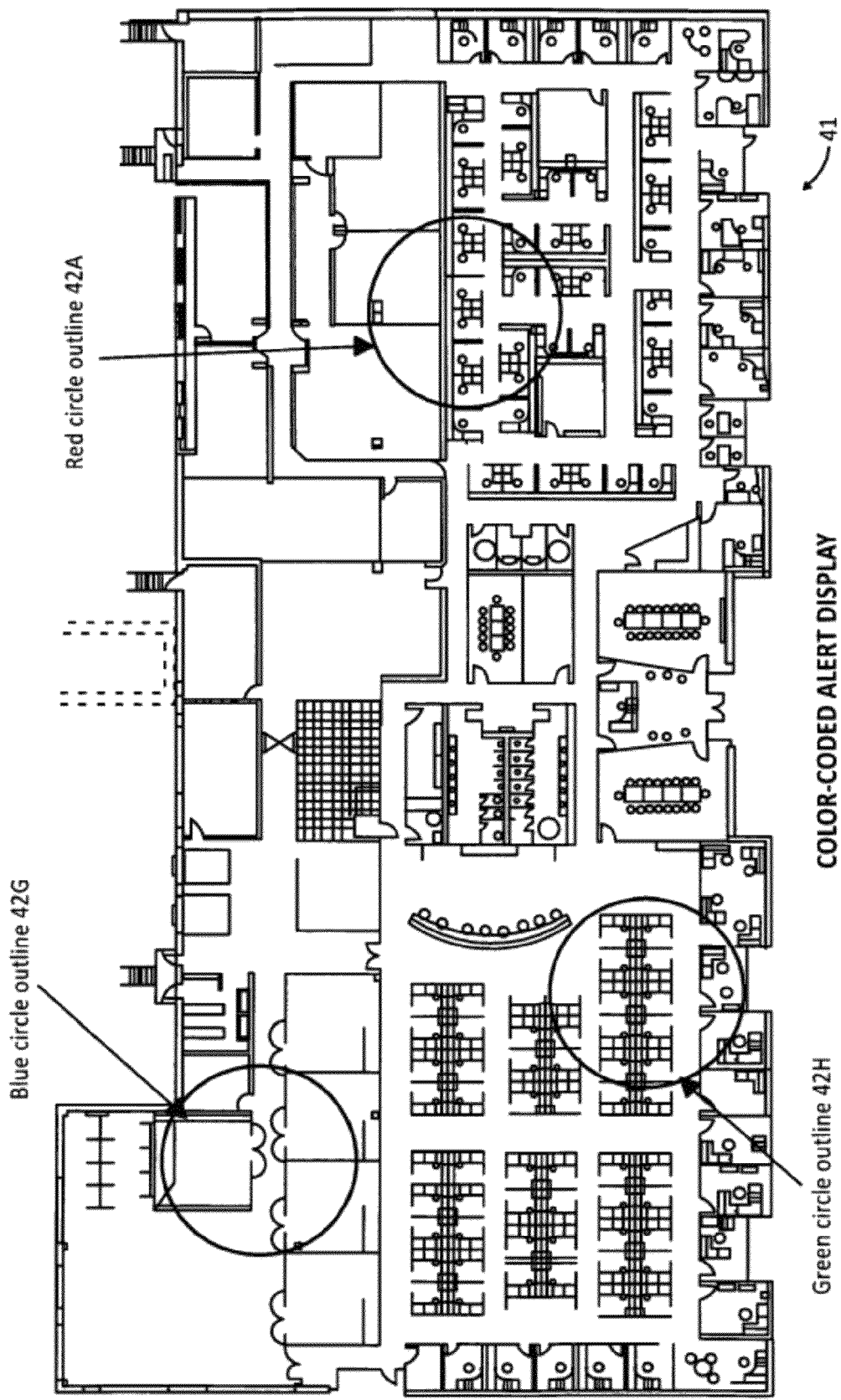

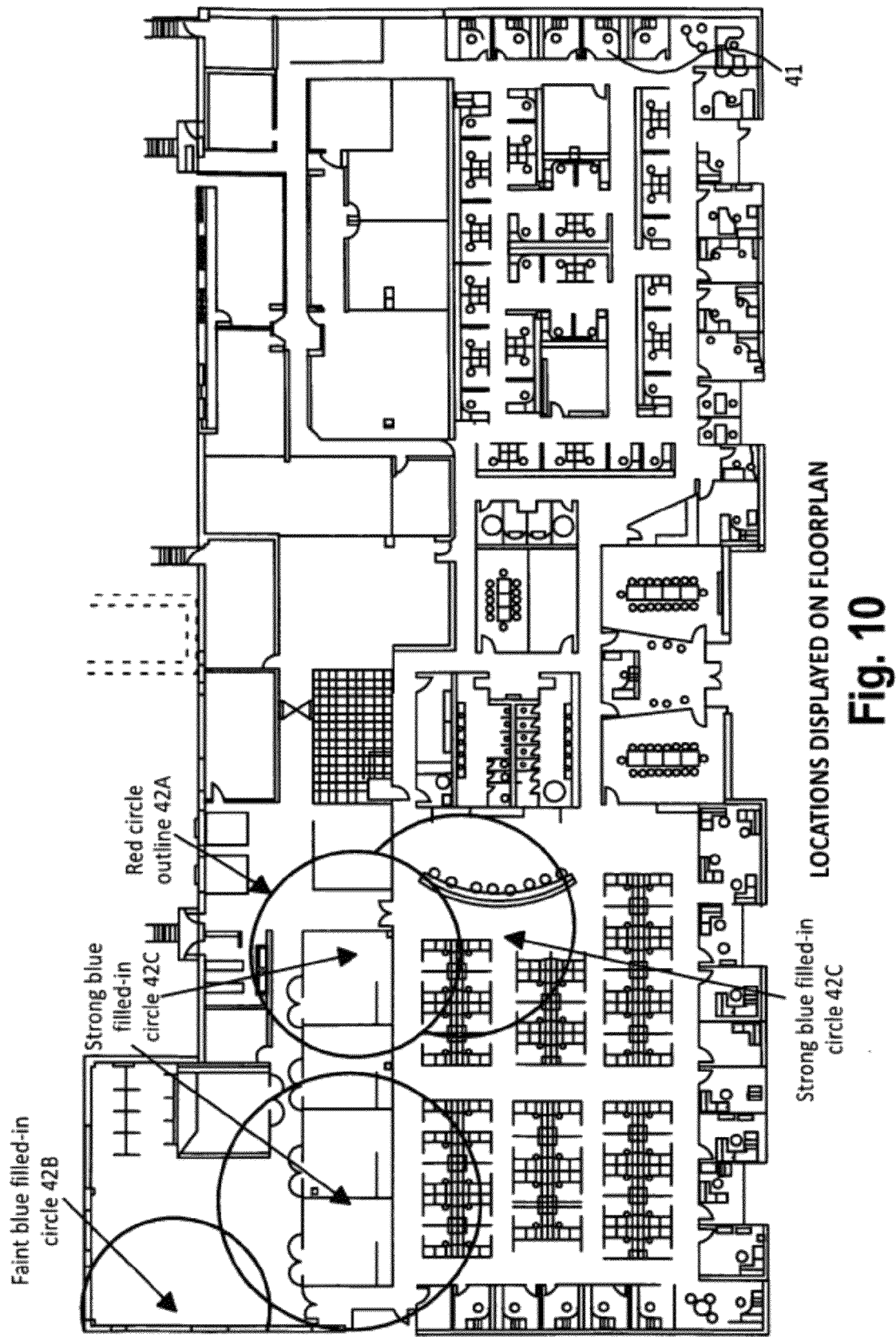

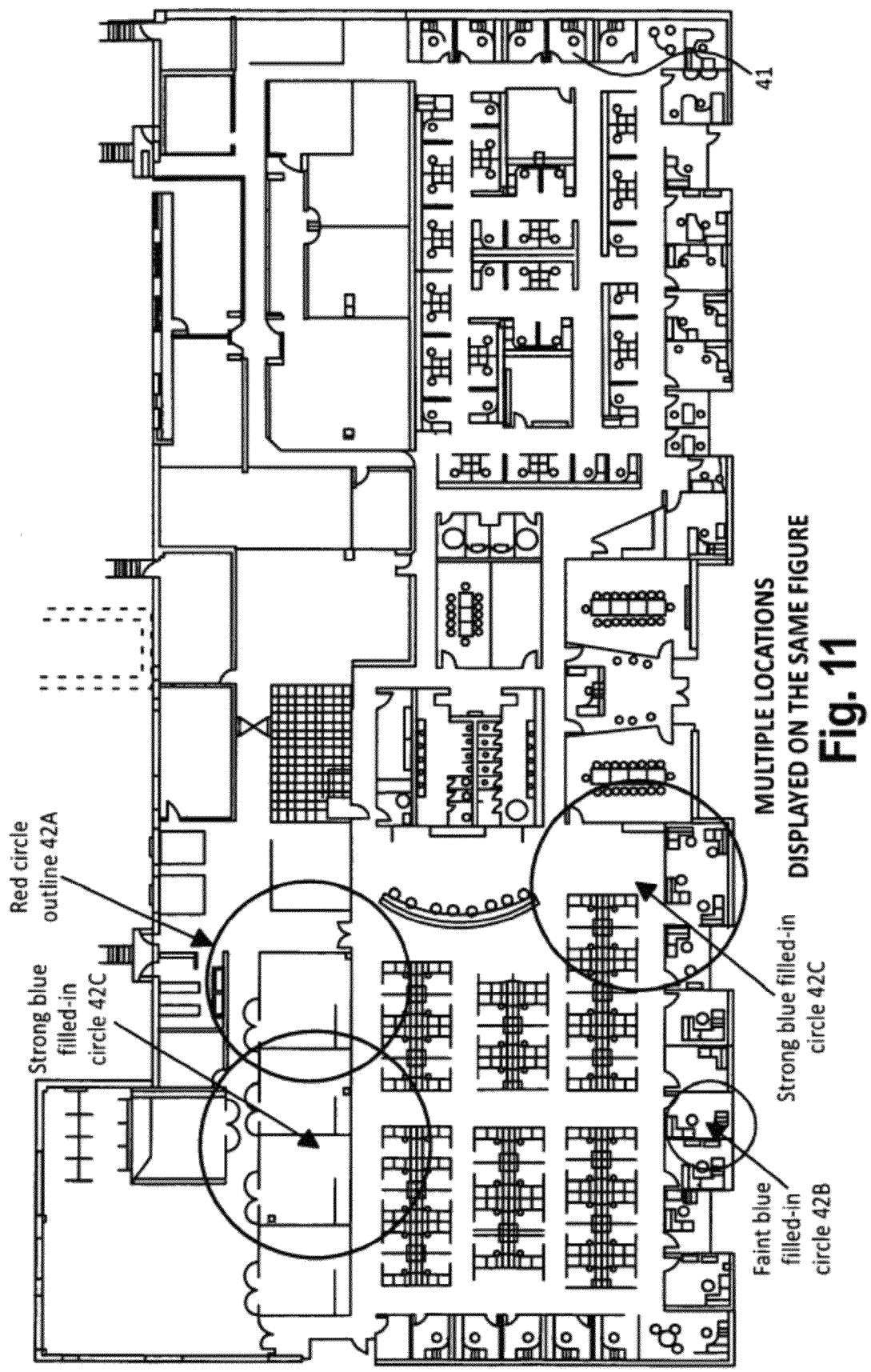

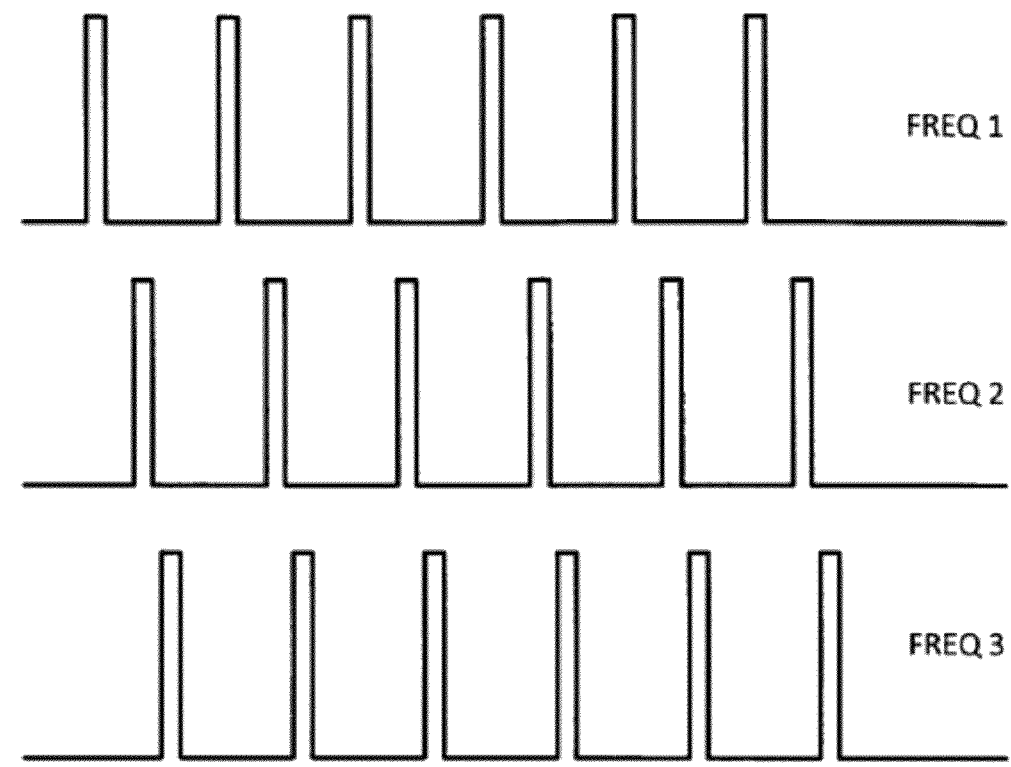
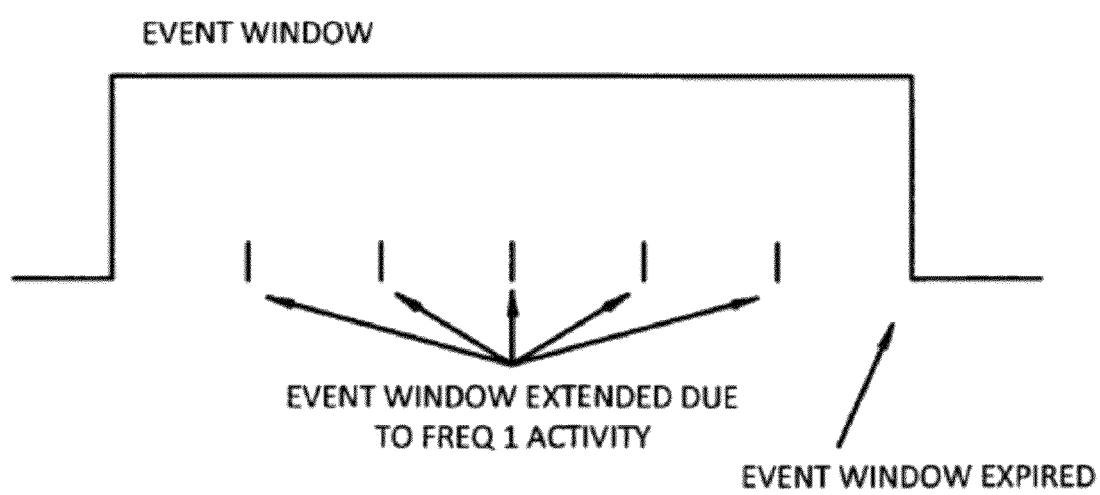
Fig. 20

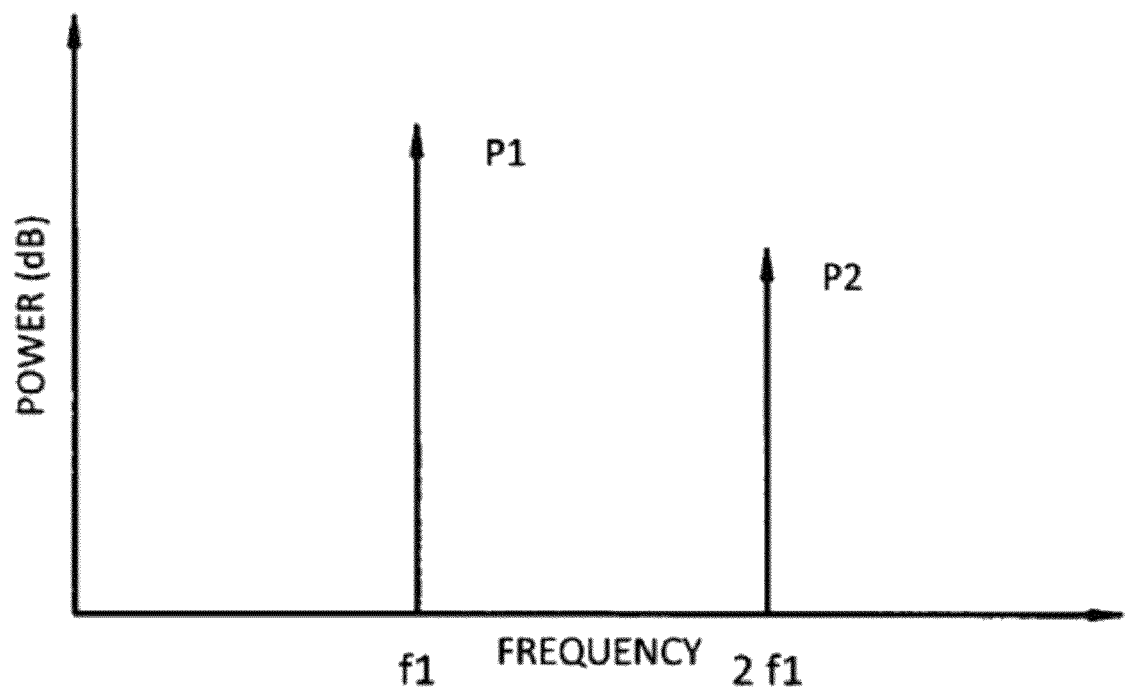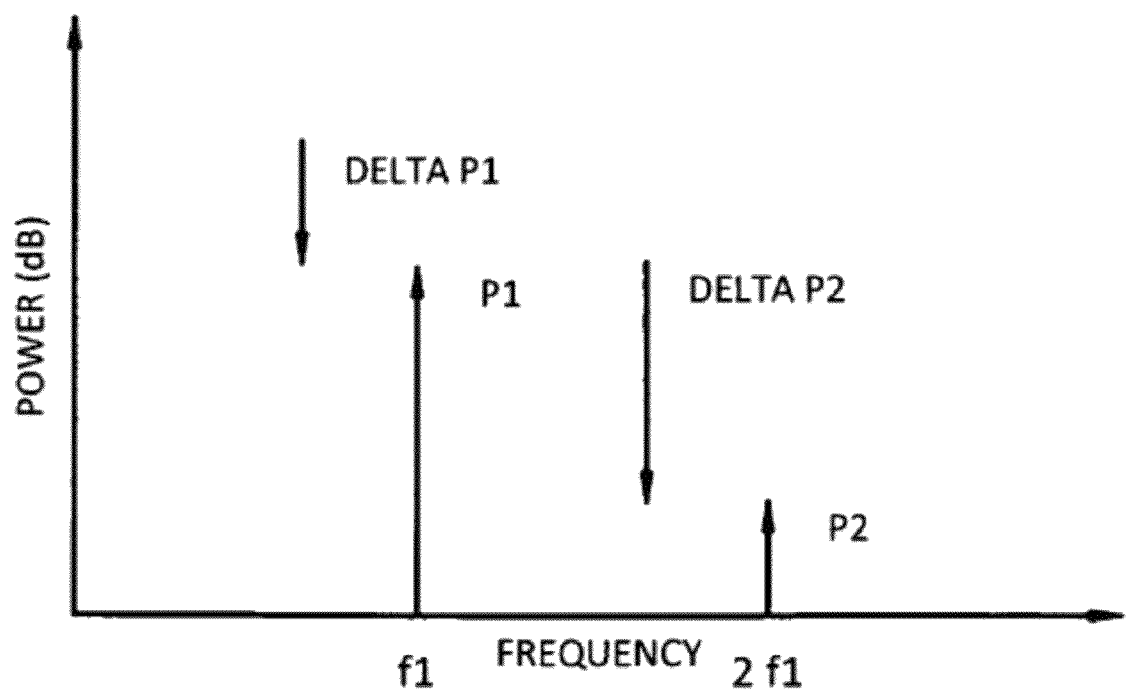
Fig. 32

SYSTEM AND RELATED CIRCUITS AND METHODS FOR DETECTING AND LOCATING CELLULAR TELEPHONE USE WITHIN A GEOGRAPHICAL AREA OR FACILITY

CROSS REFERENCE TO RELATED APPLICATIONS

This application is a continuation of U.S. patent application Ser. No. 11/974,797 filed Oct. 16, 2007, entitled "System and Related Circuits and Methods for Detecting and Locating Cellular Telephone Use Within a Geographical Area or Facility," which in turn is related to U.S. Provisional Application Ser. No. 60/852,385, which was filed on Oct. 17, 2006, and is entitled "Methodology and System to Prevent False Alarms from Nearby Areas Where Phone Use is Permitted"; U.S. Provisional Application Ser. No. 60/852,444, which was filed on Oct. 17, 2006, and is entitled "Methodology to Divide Facility Into Independent Regions for Accurate and Efficient Detection and Location of RF Sources"; U.S. Provisional Application Ser. No. 60/852,324, which was filed on Oct. 17, 2006, and is entitled "Use of an Integral Variable Attenuator to Identify Potential Harmonic Distortion Effects in a Direct-Conversion Receiver"; U.S. Provisional Application Ser. No. 60/852,440, which was filed on Oct. 17, 2006, and is entitled "Intermediate Frequency Response and Frequency Scanning Method to Minimize Measurement Interval with Direct-Conversion Frequency-Scanning Energy-Detection Receiver"; U.S. Provisional Application Ser. No. 60/852,441, which was filed on Oct. 17, 2006, and is entitled "Method for Accurately Measuring Peak Signal Level of Bursty RF Source Across Non-Synchronized Array of Agile Receivers"; U.S. Provisional Application Ser. No. 60/852,323, which was filed on Oct. 17, 2006, and is entitled "Method to Allow a Sequence Of Time-Discontinuous or Frequency-Hopping Spread Spectrum (FHSS) Transmissions From a Radio Frequency (RF) Source to be Identified as a Single Event"; U.S. Provisional Application Ser. No. 60/852,322, which was filed on Oct. 17, 2006, and is entitled "Method for Visually Differentiating Frequency Bands in a Cell Phone Detection and Location System"; U.S. Provisional Application Ser. No. 60/852,321, which was filed on Oct. 17, 2006, and is entitled "Method for Automatic Scaling of RF Source Location Estimate Uncertainty Based on a Measure of Effective Receiver Spacing for a Networked Spatially Distributed Receiver Array"; U.S. Provisional Application Ser. No. 60/852,442, which was filed on Oct. 17, 2006, and is entitled "Method for Graphically Displaying a Historical Record of Locations Logged by a Location-Determining System"; and U.S. Provisional Application Ser. No. 60/852,384, which was filed on Oct. 17, 2006, and is entitled "System for Detecting and Locating Illicit Cellular Telephone Use Within a Facility", the disclosure of each of which is hereby incorporated by reference and on which priority is hereby claimed.

BACKGROUND OF THE INVENTION

1. Field of the Invention

This invention relates to methods and systems for monitoring, detecting, and locating illicit cellular phone use, and more specifically relates to: such systems that are divided into multiple independent regions; such methods and systems capable of segregating cellular transmission from outside a specified area; methods of visually displaying such detections; methods of displaying historical records of logged detections; methods of estimating regions of uncertainty; methods that allow a sequence of time-discontinuous or frequency-hopping spread spectrum (FHSS) transmissions from a RF source to be identified as a single event; direct-conversion receivers (DCR's) used as radio frequency (RF) energy detectors and utilizing a bandpass intermediate frequency (IF) filter and methods relating to the same; methods of measuring peak signal levels of bursty RF sources, and more specifically relates to methods of accurately measuring peak signal levels of bursty RF sources across non-synchronized arrays of agile receivers; and DCR's having an integral variable attenuator capable of identifying potential harmonic distortion effects.

2. Description of the Prior Art

Very often secure facilities such as government buildings, court rooms, prisons and hospitals require restrictions of cellular phone use and communications within designated areas. The introduction of cell phones and other communications devices, whether intentional or accidental, can result in unauthorized disclosure of classified data, financial information, medical records, and the like. These devices also have the potential to electromagnetically interfere with the operation of critical equipment such as life support.

In prisons and other correctional facilities, it is essential to monitor and prevent illicit and unauthorized cellular communications. Illicit communications within these facilities create a safety hazard for the prisoners, employees, and surrounding citizens. Very often, cellular devices are smuggled into prisons so inmates may continue making illegal transactions and/or arrangements. Devices are hidden in mattresses, cells, and other common locations. Correctional facility employees often are bribed to import cellular devices for inmates. Conventionally, it is extremely difficult to track and monitor such devices and communications, as the common method is strictly a cell-by-cell search. The efficiency and effectiveness of this technique is limited due to the prisoners' and some employees' overwhelming desire to evade detection.

An effective solution must provide continuous, real-time coverage to ensure that new devices are detected as they are introduced into the facility. The system must not only detect the presence of unauthorized devices, but it must also determine their locations to allow prompt corrective action to be taken.

Facilities requiring monitoring include large and small facilities with multiple rooms and/or multiple levels constructed with a variety of techniques. Conventional systems measure RF source emissions within an array or grid of receivers placed in known positions. A single system monitoring a plurality of areas often can be inefficient and inaccurate. A system using measurements of RF propagation must provide the capacity to account for abrupt changes in RF propagation caused by obstructions such as floors, walls, doors, and certain furniture pieces. Emissions from RF sources also very often can leak through obstructions, creating false readings by the grid of receivers. A single array of receivers covering a facility is not effective or reliable; rather, a means of breaking the facility up into regions of consistent RF conditions is necessary, as is provided with the present invention. This ability provided with the present invention also provides a scalable means to efficiently accommodate systems with widely varying numbers of sensors and areas of interest.

Conventionally, individual sensors have been placed in areas of interest to detect phone signals in the vicinity of the region. Once detected, an alarm is triggered, alerting the proper authorities. Unfortunately, the conventional design is not capable of precisely detecting transmissions within a defined spatial area. Transmissions originating from cell phones or other mobile communication devices in close proximity to a restricted area, such as that from outside a shared door or the opposite side of a wall, trigger false alarms, as the calls actually are being placed from outside of the restricted region. This inability to differentiate between transmissions in restricted and unrestricted areas has caused the conventional design to be unreliable and inefficient.

Cell phones service is provided by a variety of networks operating at different frequencies and using a number of air interface protocols. An effective monitoring system, such as provided by the present invention, should be capable of detecting and locating devices using any of these protocols, networks, or frequencies. The ability to visually differentiate between frequency bands, as provided by the present invention, is an important tool to help authorities to determine that seized phones are consistent with the detected activity.

For evidentiary and investigative purposes, it is important for a cell phone monitoring system to provide a means to view a historical record of activity. Such a record is provided by the system of the present invention.

Any practical RF source location system will exhibit some amount of uncertainty or error in the locations determined for each source. As an aid to authorities to help determine the appropriate search area, an effective monitoring system should display information regarding the accuracy of the estimated location. Such information is provided by the system of the present invention.

Many times, cell phone calls or messages are divided into multiple RF bursts separated in time and/or frequency. Time-division-multiple-access (TDMA) schemes utilize a number of timeslots that are granted to different users; individual transmissions are broken up to fit into the allocated slots. Text, data, voice, and picture messages are often spread out into many RF bursts. Finally, cell phones may utilize frequency-hopping-spread-spectrum techniques to mitigate the effects of multipath fading or narrowband interference. An effective monitoring system should have the capability to aggregate these separated events to better represent the actual usage pattern. The system of the present invention has this capability.

OBJECTS AND SUMMARY OF THE INVENTION

It is an object of the present invention to provide a system and method for detecting and locating illicit cellular telephone use within a facility.

It is another object of the present invention to provide a method for dividing a facility into independent regions for accurate and efficient detection and location of RF (radio frequency) sources.

It is still another object of the present invention to provide a method and system for preventing false alarms from nearby areas where cellular telephone use is permitted.

It is a further object of the present invention to provide a method for visually differentiating frequency bands in a cell phone detection and location system.

It is yet a further object of the present invention to provide a method for graphically displaying a historical record of locations logged by a location-determining system, and more specifically, a system for detecting and locating illicit cellular telephone use.

It is still another object of the present invention to provide a method for automatic scaling of RF source location estimate uncertainty based on a measure of effective receiver spacing for a networked spatially distributed receiver array.

It is another object of the present invention to provide a method for allowing a sequence of time-discontinuous or frequency-hopping spread spectrum (FHSS) transmissions from a radio frequency (RF) source to be identified as a single event.

It is another object of the present invention to provide an intermediate frequency response and frequency scanning method for minimizing measurement intervals with direct-conversion, frequency-scanning, energy-detection receivers.

It is yet a further object of the present invention to provide a method for accurately measuring peak signal levels of bursty RF sources across non-synchronized arrays of agile receivers.

It is another object of the present invention to provide a direct-conversion receiver that uses an integral variable attenuator to identify potential harmonic distortion effects in the receiver.

In accordance with one form of the present invention, a system for detecting and locating illicit cellular telephone use within a facility includes an array of radio frequency (RF) receivers, each receiver being placed in a predetermined location in the facility, and a central server, the receivers being in electrical communication with the central server. The server commands a group or groups of receivers to tune to a frequency of interest and to perform detailed sample rate measurements of the RF signal level received at the receivers.

Preferably, the array of receivers is organized into a plurality of measurement areas covering widely separated areas of the facility or different buildings of the facility, and the plurality of receivers of a measurement area is organized into a plurality of measurement groups covering areas of approximately uniform RF propagation conditions.

Even more preferably, each receiver scans a frequency band of interest non-synchronously and independently of the other receivers in the array. Also, each receiver is preferably a direct-conversion receiver.

Various methods of the present invention described herein relate to the detection of a desired RF signal indicative of illicit cellular telephone use, and distinguishing a fundamental frequency RF signal that is detected from spurious RF signals caused by harmonic distortion. Also, a method of minimizing the number of steps required to completely measure an RF frequency band by using direct-conversion receivers includes the step of selecting a particular bandpass response corner frequency so that the sideband of each measurement using a bandpass filter has a particular bandwidth and a notch associated therewith, and further includes the step of incrementally changing the local oscillator frequency of the direct-conversion receiver in successive steps of alternating particular frequency increments until the entire frequency band is covered.

These and other objects, features and advantages of the present invention will be apparent from the following detailed description of illustrative embodiments thereof, which is to be read in connection with the accompanying drawings.

BRIEF DESCRIPTION OF THE DRAWINGS

FIG. 3 is a detailed schematic diagram of a preferred form of a receiver used in the system and formed in accordance with the present invention.

FIG. 8 is a table of various frequency bands of commonly available cellular phones.

FIG. 9 is a screen shot of a display provided by the system of the present invention which is a visual indication of the location of cellular phone activity indicated by overlaying a circle on the display of a facility floor plan.

FIG. 10 is a display screen shot created in accordance with the present invention, displaying the historical locations of logged cellular phone detections.

FIG. 11 is a display screen shot created in accordance with the present invention, displaying multiple locations on the same floor plan of a facility.

FIG. 20 is a graphical illustration of an event window created in accordance with a method of the present invention for detecting cellular telephone radio frequency (RF) emissions and a frequency-hopping, spread spectrum (FHSS) source.

FIG. 32 is a graphical representation of the change in relative levels of a signal and its distortion-produced second harmonic as the fundamental level is reduced, illustrating the application of an integral variable attenuator to identify potential harmonic distortion effects in a direct-conversion receiver in accordance with the present invention.

DETAILED DESCRIPTION OF THE PREFERRED EMBODIMENTS

Each of the preferred embodiments of the present invention will now be described in detail. To facilitate an understanding of the invention, each embodiment will be described under a specific heading that was taken from one of the titles of the U.S. provisional applications on which this application is based. The headings provided below should not be construed as limiting the invention in any manner.

Figure 1:
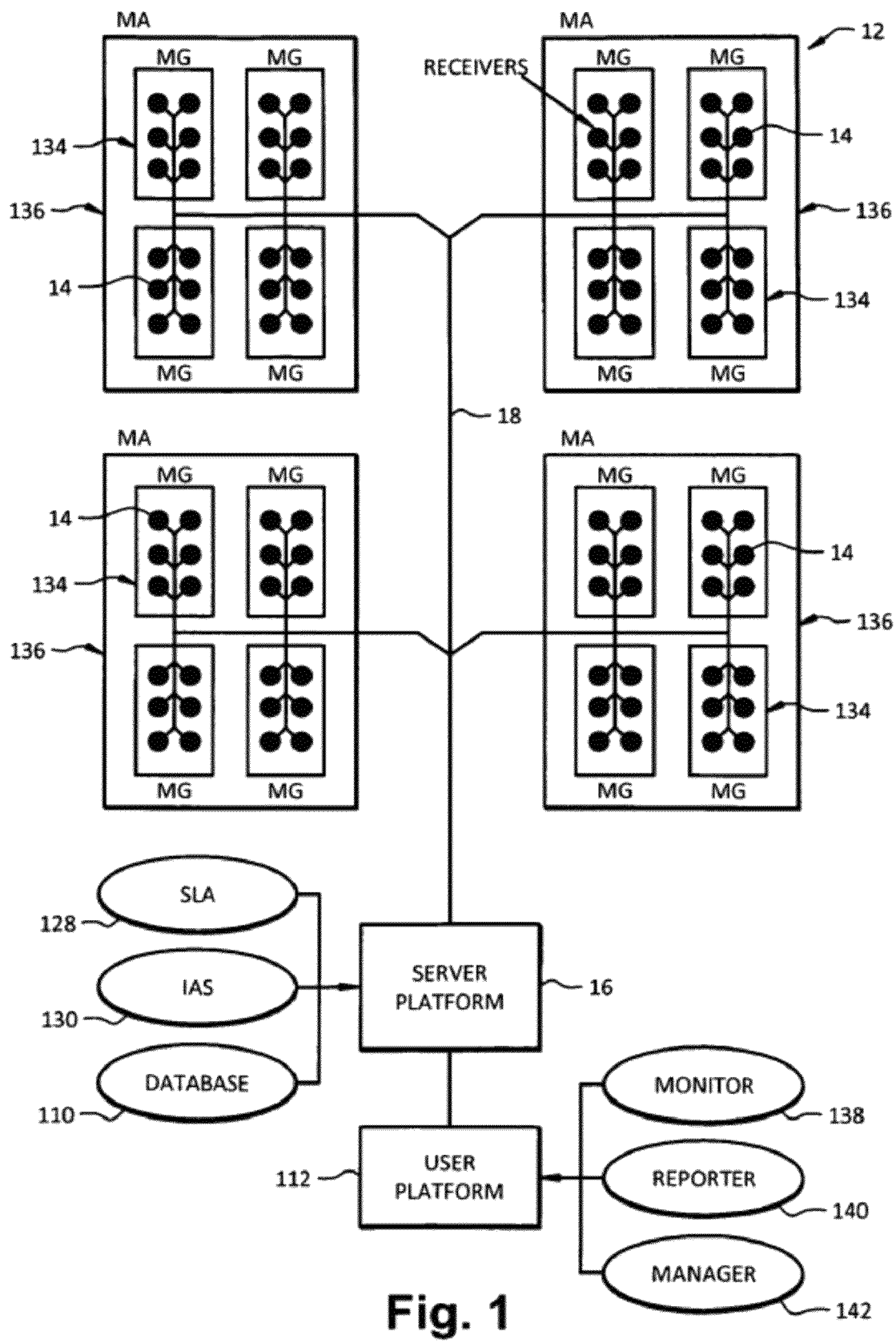
FIG. 1 is a block diagram of the overall system of the present invention for detecting and locating illicit cellular telephone use within a facility.

System for Detecting and Locating Illicit Cellular Telephone Use Within a Facility This embodiment of the present invention is a system 12 for the detection and location of illicit cell phone use, as illustrated in FIG. 1. The system 12 employs an array of radio frequency (RF) receivers 14 in known locations. These receivers 14 are connected to a central server 16 and communicate by using an Ethernet communication system 18. The server 16 runs software to control system operation and to determine the presence and location of any cell phones. A database 110 of relevant data and results is maintained on the server 16. Client application software on remote platforms 112 or the central computer support user interactions with the system.

Figure 2:
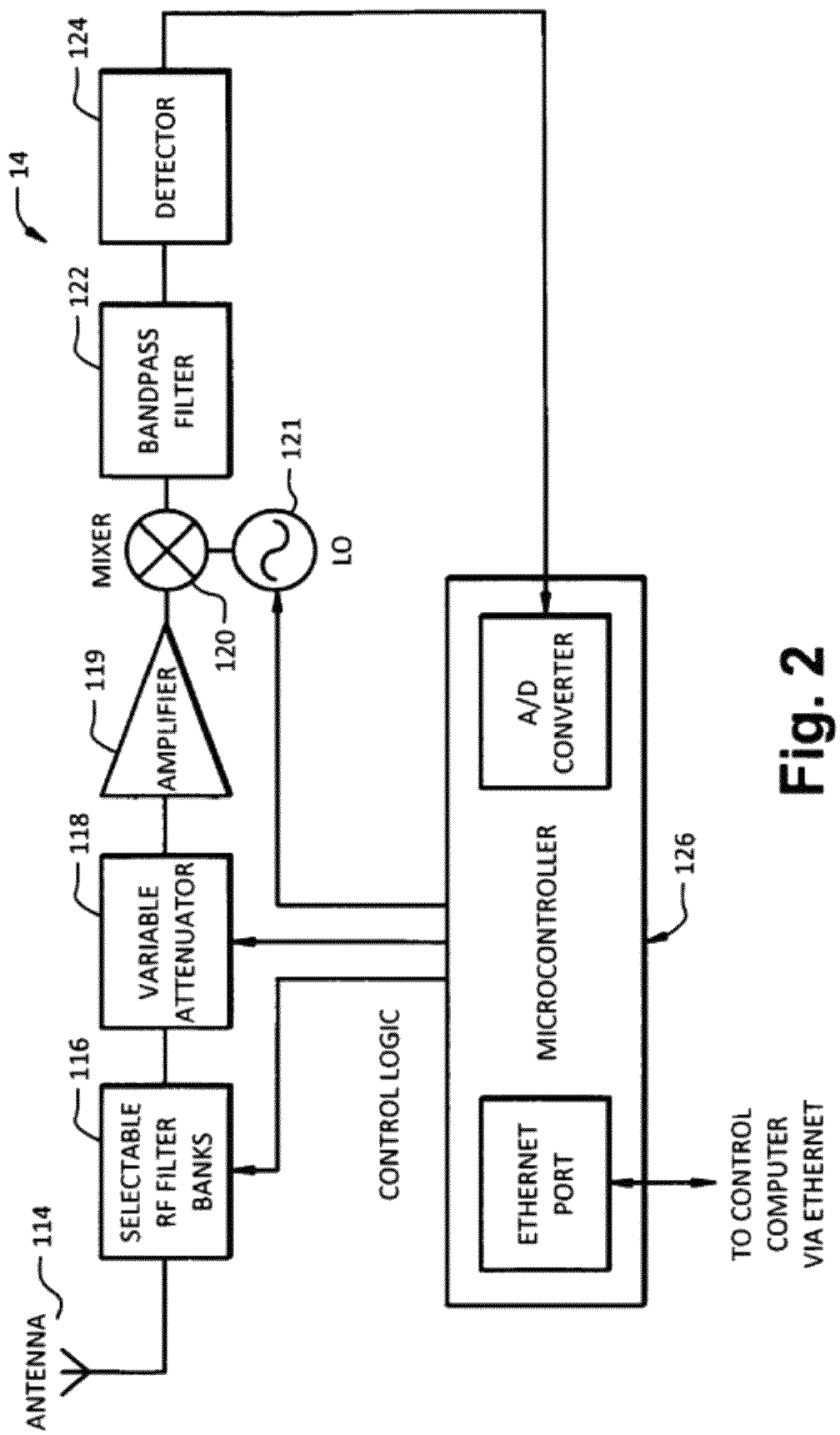
FIG. 2 is a block diagram of a receiver formed in accordance with the present invention and used in the system for detecting and locating illicit cellular telephone use within a facility.

The receivers 14, as illustrated in FIG. 2, are preferably low-cost units employing direct-conversion architecture. An omnidirectional antenna 114 is preferably integrated into the circuit board of the receivers 14. The RF signal received by the antenna 114 passes through a switchable RF filter bank 116 electrically connected to the antenna 114 and designed to reject out-of-band subharmonic and harmonic signals. A variable attenuator 118 electrically connected to the output of the RF filter bank 116 can be used to extend the dynamic range of the receiver 14 as well as to test for the presence of harmonic distortion effects. An amplifier 119 may be included and is preferably electrically connected to the output of the attenuator 118 to amplify the signal. A mixer 120 is electrically connected to the output of the amplifier 119 and downconverts both sidebands of the RF signal centered on the synthesized local oscillator 121 (LO) frequency to baseband, the local oscillator 121 being electrically connected to the mixer 120. A bandpass filter 122 is electrically connected to the output of the mixer 120 and sets the resolution bandwidth of the system. A detector 124 is electrically connected to the output of bandpass filter 122 and outputs a voltage proportional to the signal power at its input and thus proportional to the RF level at the antenna 114. An on-board microcontroller 126 receives commands from and transmits data to the server 16, controls the LO frequency of local oscillator 121, selects the appropriate filter bank 116 for the frequency of interest, controls the attenuator 118, and converts the analog output voltage of detector 124 to a digitized power level measurement.

The frequency plan and filtering in the receiver 14 is designed to reject the forward link signals from nearby cell towers (including those serving other frequency bands) and harmonic/subharmonic signals that could cause spurious detections in the direct-conversion receiver. The receiver 14 preferably does not perform demodulation, so no privacy issues are raised and no court orders are required to operate the system. The system of the present invention works with all types of cell phone signals, network providers, transmission protocols, models of phones, and message types. The system can detect phone transmissions during network registration/re-registration, paging/ringing, data/text/voice mail messaging, and/or voice conversation activity. The user does not have to be actively using the phone for detection and location to occur.

The network scans through the reverse link frequencies used by cell phones to communicate to the network provider base station, or for off-network mobile-to-mobile communications, until a signal of interest is detected. This is a signal exceeding user-definable absolute and relative-to-background power thresholds. When this occurs, the receivers 14 notify the central computer (i.e., the server) 16. The server 16 in turn commands a group or groups of receivers 14 to tune to the frequency of interest and perform detailed, high-sample-rate measurements of the RF signal level at each receiver 14.

The receiver measurements are input to a Source Location Algorithm (SLA) 128 in the server software, as shown in FIG. 1. The SLA 128 performs an iterative search to find the best combination of estimated source location and propagation model parameters to fit the receiver measurements to a computer model.

The receivers are organized into Measurement Groups (MG) 134 covering areas of approximately uniform RF propagation conditions to ensure the validity of the SLA model. Different buildings or other widely separated areas of a facility are treated as independent Measurement Areas (MA) 136, each having its own Measurement Groups. This scalable hierarchy supports a broad range of applications encompassing widely varying numbers of sensors.

When certain criteria are met, the Incident Alert Service (LAS) 130 notifies the end user that illicit cell phone activity has been discovered. The location estimate includes a dynamic radius of uncertainty that reflects the density of receivers 14 used to calculate the result. This helps facility security personnel to determine the area to be searched to confiscate the phone.

The server 16 employs a database architecture to store and process the receiver data and location estimates. The database 110 allows reports of activity to be constructed from historical data.

Preferably, three software client applications provide graphical user interface to and control of the system. The client applications may be run on the server itself or on external computers connected to the server 16 via Ethernet. These applications are intended to be used by different levels of users. User access is controlled to ensure that the system cannot be sabotaged or improperly reconfigured by insufficiently trained users.

The monitor application 138 of the system of the present invention is used by minimally-trained operators to view alerts in real time. It shows the location of any cell phone superimposed on a facility floor plan. The alerts are grouped by frequency bands. Ongoing activity within a particular band is grouped together into one or more alerts depending on the interval between successive detections. The aggregated location estimates associated with a particular alert can be displayed to determine whether the phone is stationary or has been in motion and to determine the length of time the phone has been in use.

The Reporter application 140 of the system of the present invention is used to generate reports based on archived data. It provides both spreadsheet-compatible and graphical outputs. Reports can be custom-tailored to particular days, shifts, areas, etc.

The Manager application 142 of the system of the present invention is used by trained operators to set up and maintain the system. It is used to set detection thresholds, assign receivers to Measurement Groups 134 and Areas 136, view detailed technical data, enable or disable frequency band coverage, etc.

A schematic diagram of the preferred form of a receiver for use with the system and constructed in accordance with the present invention is shown in FIG. 3. Basically, and as shown in detail in FIG. 3, each receiver preferably includes an input selection section 144, a phase locked loop (PLL) synthesizer section 146, an RF preselect filtering section 148, a switchable attenuator section 150, a low noise amplifier (LNA) 152, a downconverter (downconversion to baseband section) 154, a differential to single ended converter (DIFF to SE conversion section) 158, an IF (intermediate frequency)/baseband filter section 160, a log detection section 162, a video filter 164, a microcontroller U10, a 16 bit universal bus driver U11, a 16 bit bus transceiver U14, a 256K by 16 static RAM U13, a debug switching section 166, a communications interface U16 used as a serial debug port, a magnetic transformer module U17 connected to Ethernet jack J9:1, and various voltage regulators U18-U20.

Methodology to Divide Facility into Independent Regions for Accurate and Efficient Detection and Location of RF Sources The system of the present invention to detect and locate illicit cellular telephone use can centrally monitor individual buildings, wings of a building, courtyards, etc., or various combinations of these areas. The system may encompass many receivers 14 distributed over a large campus. A more efficient, flexible system with better functionality results from careful organization of the system. A means and method to implement this organization are described in detail below.

The facility 21 to be monitored is first divided into independent regions known as Measurement Areas (MA) 136, as shown in FIG. 1. MA's are independent from each other. It is assumed that no significant RF coupling exists between different MA's. The receivers 14 within any MA 136 do not participate in any measurements performed by receivers 14 in another MA. Dividing the facility into these independent MA's 136 allows the system to conveniently and efficiently direct the receivers 14 within each MA 136 in an independent fashion and limits the number of sensors with which the central processor must simultaneously communicate. Each MA 136 has an independent coordinate frame that is used to identify its receiver locations and to identify the locations of any RF sources detected within its boundaries.

Figure 4:
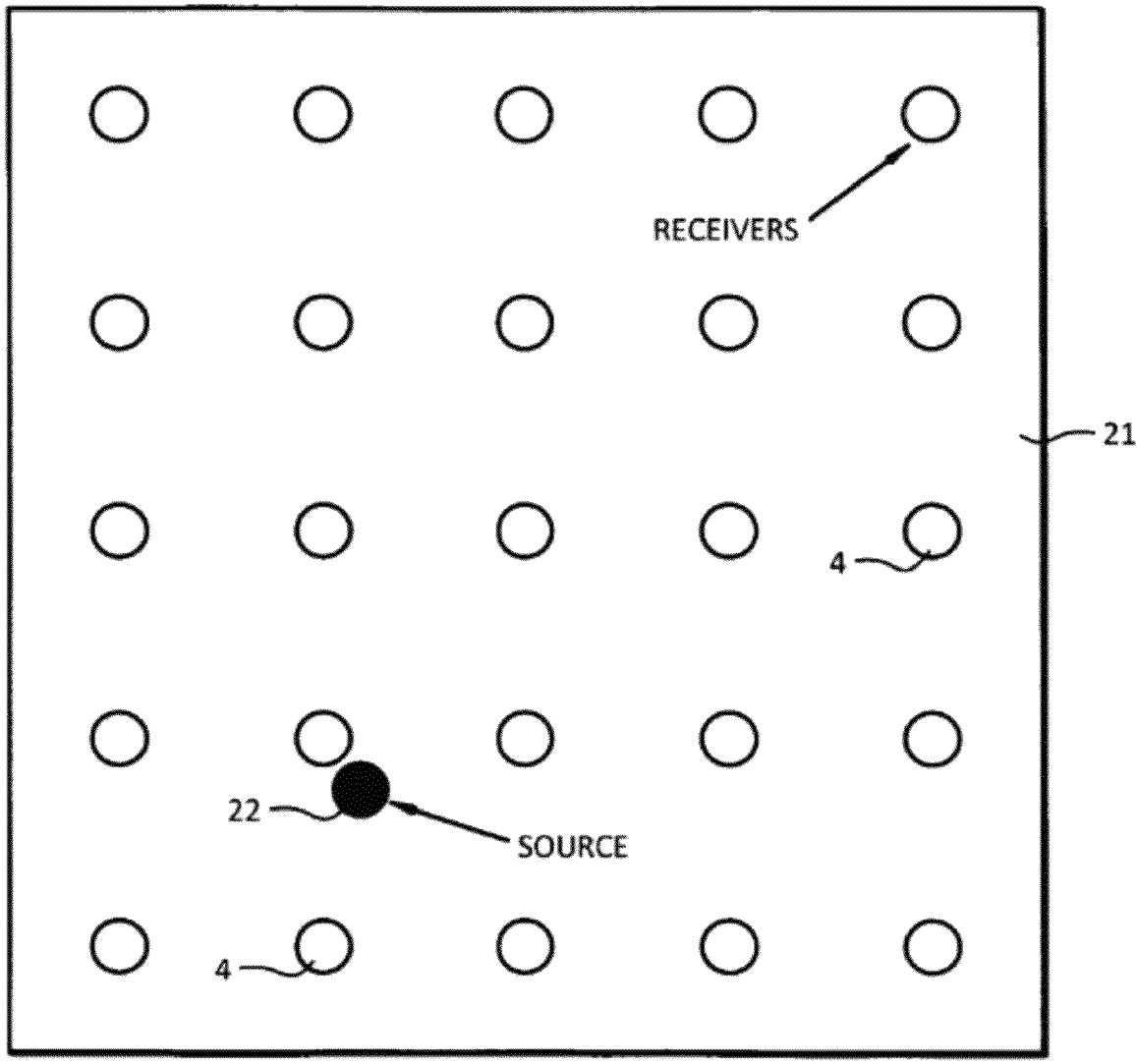
FIG. 4 is an illustration of the geographical locations of a system for detecting and locating RF sources formed in accordance with the present invention.

One technique for determining the source location according to the receiver measurements relies on relatively uniform propagation between the source 22 and the receivers 14 used to determine its location, as shown in FIG. 4. Specifically, the propagation loss is assumed to follow an $r^n$ relationship, where r is the range from the receiver 14 to the source 22 and n is the path loss exponent. In free space, n=2 and we get the familiar r-squared path loss. A macro-scale model for an obstructed indoor environment allows n to vary to best fit the measured data to the propagation model. Values of n>2 model the effects of multipath fading, blockage, absorption, etc. Values of n<2 account for waveguiding effects of corridors and the like.

For the location estimate to be valid, the RF signal propagation conditions between the source 22 and each of the receivers 14 should be consistent. There should be no abrupt changes, such as the presence of a heavily-reinforced wall that would introduce a sudden increase in attenuation over a small distance. The inventors herein developed the concept of Measurement Groups (MGs) 134, which encompass sets of receivers 14 distributed throughout a region of relatively uniform propagation. The receivers 14 are separated into different MG's 134 based on conditions that do not satisfy the uniform propagation consideration. Each MG 34 belongs to a particular MA. MA's may have several MG's 134, as shown in FIG. 1.

Figure 5:
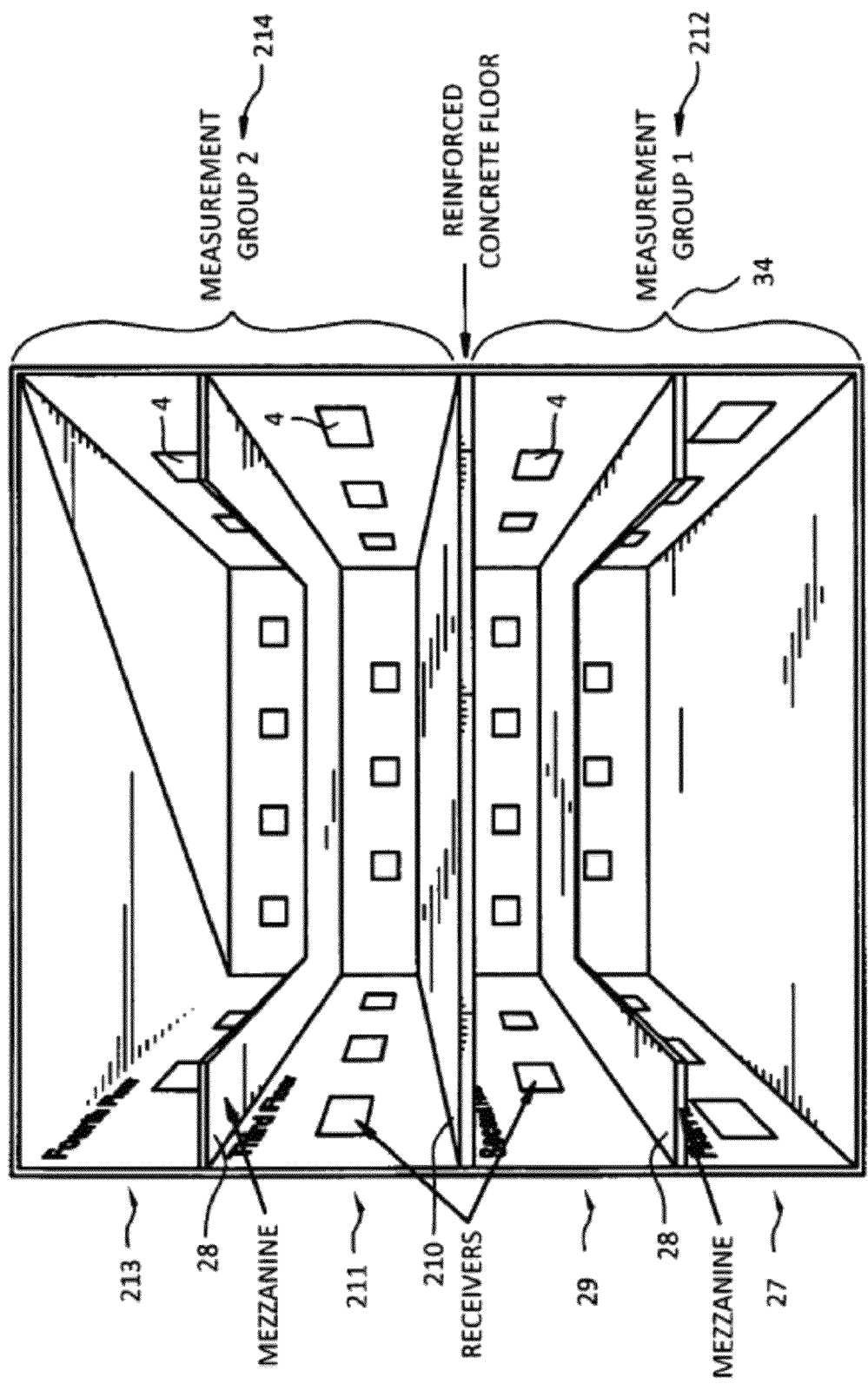
FIG. 5 is an illustration of a hypothetical structure divided into measurement groups utilizing the present invention.

A hypothetical four-level prison cellblock structure is shown in FIG. 5. The first and second levels 27, 29 are separated only by a mezzanine 28, as are the third and fourth levels 211, 213. A heavily reinforced concrete floor 210 separates the first and second levels 27, 29 from the third and fourth levels 211, 213.

An array of receivers 14 is distributed throughout this structure as indicated. The receivers 14 on the first and second levels 27, 29 are in substantially the same propagation environment and are therefore treated as one MG 212. Similarly, the receivers 14 on the third and fourth levels 211, 213 make up a second MG 214. The concrete floor 210 between the two MG's 212, 214 represents a significant departure from the relatively uniform propagation that exists within either MG 212, 214 and therefore prevents all of the receivers 14 from being validly assigned to a single MG 134. However, there still may be significant signal coupling between these MG's 212, 214. In order to accurately determine the location of an RF source 22 that is detected by multiple MG's 134, the system of the present invention identifies the MG 134 of the present invention with the highest-quality measurements. This is typically done by taking the MG 134 with the highest measured signal power. Only the readings from the receivers 14 within this MG 134 are used to determine the source 22 location. In this way, the system and method of the present invention ensure that the uniform propagation model is appropriately used.

Methodology and System to Prevent False Alarms from Nearby Areas where Phone Use is Permitted The inventors herein have developed a methodology to prevent false alarms from legitimate cell phone signals in nearby areas.

Figure 6:
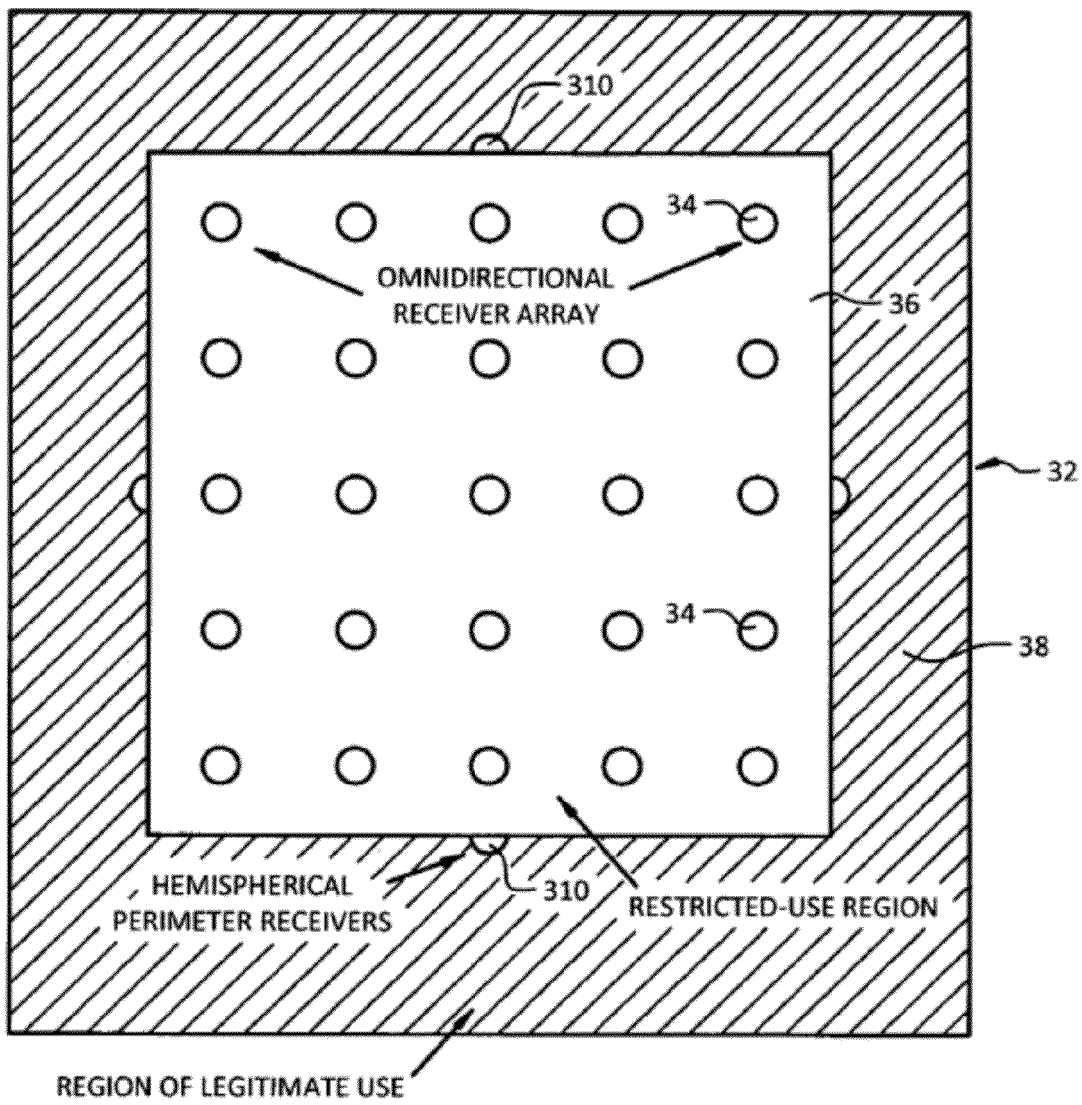
FIG. 6 is an illustration of the geographical locations of an omni-directional receiver array and hemispherical perimeter receivers used in a system formed in accordance with the present invention to prevent false alarms from nearby areas where telephone use is permitted.

In accordance with the present invention, the monitoring system 32, as illustrated in FIG. 6, contains a number of receivers 34 distributed in known locations throughout the region of interest 36. These receivers 34 are connected to a central processor (not shown) which controls their operation and processes their data. The central processor uses the set of receiver measurements to detect cell phone activity and to determine its location.

For reliable detection of cell phone use within a facility without false alarms, it is important to discriminate between calls occurring within the area of interest 36 and calls originating in the area 38 outside the monitored area. For example, receivers 34 located near doors or windows could detect signals from phone usage in nearby public areas, parking lots, sidewalks, etc. This is particularly true for facilities located in dense urban areas.

The inventors herein have developed a number of means and methods to prevent false alarms due to these nearby legitimate cell phones. First, the ability of the monitoring system 32 to locate phones based on receiver measurements from a number of known positions helps to determine if any detected activity originated within the region of interest 36. Additional protection is provided through dedicated perimeter receivers 310. The signal levels at these receivers 310 are used to determine if the detected signal source is outside the monitored region 36. If the perimeter receivers 310 measure a higher signal level than those inside the monitored region 36, no alarm is issued.

Figure 7:
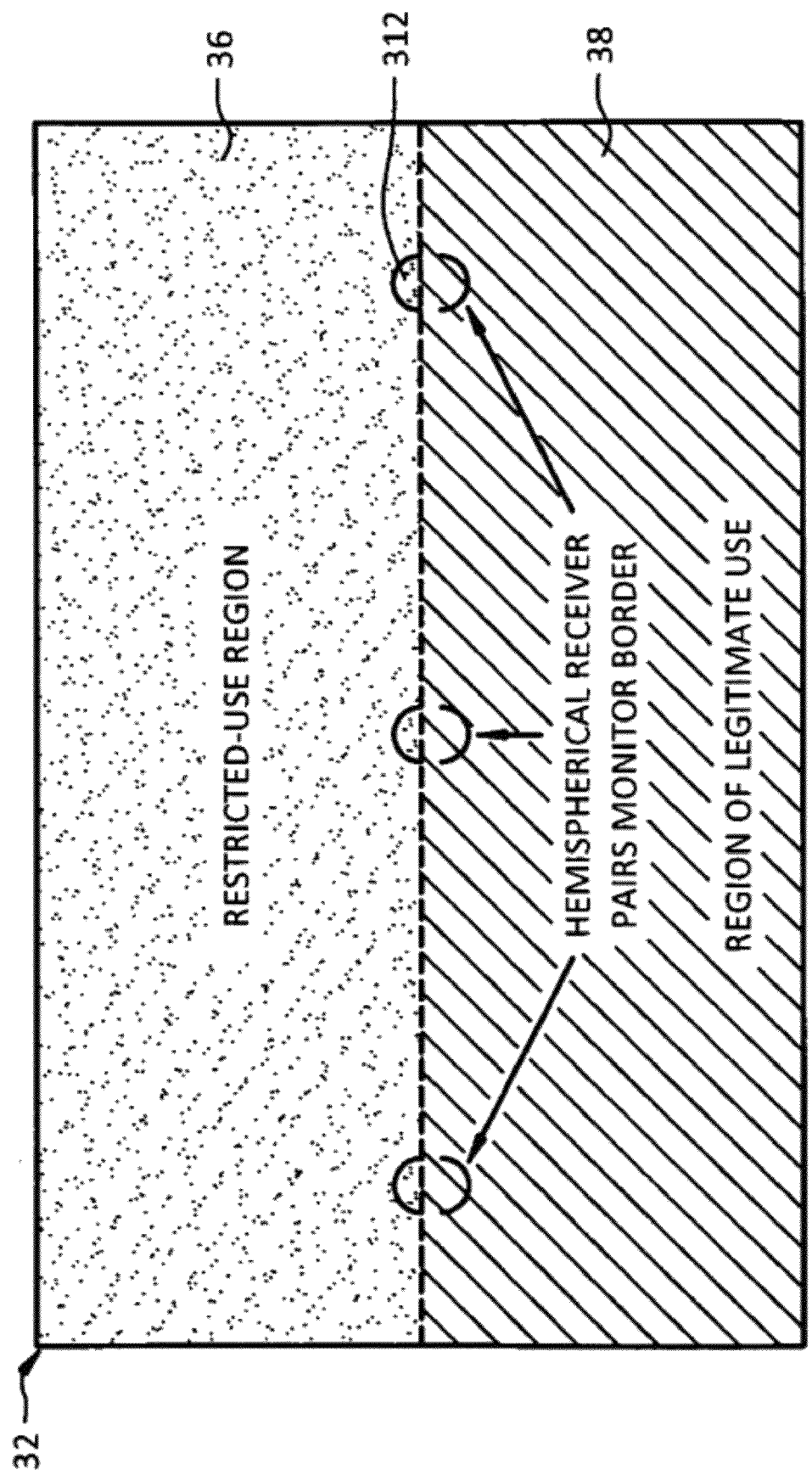
FIG. 7 is an illustration of the paired hemispherical-pattern receivers of the present invention.

FIG. 6 illustrates the perimeter receivers 310 with hemispherical coverage. This could be the result of deploying an omni-directional antenna near a lossy obstruction such as a reinforced concrete wall. Tailored antenna patterns can also be used to determine whether a phone is outside the region of interest 36. For example, receivers with back-to-back hemispherical-pattern antennas 312, such as shown in FIG. 7, can be mounted on a perimeter fence and used to determine which side of the fence has the higher signal power. This concept can be extended using corner reflectors, etc. to achieve quarter-spherical or other patterns to accommodate the geometry of the facility.

Method for Visually Differentiating Frequency Bands in a Cell Phone Detection and Location System The system of the present invention provides a visual indication of the location of cell phone activity by overlaying a circle 42 on a display of the facility floor plan 44, as shown in FIG. 9. The inventors describe herein a method to display which of several cell phone frequency bands is used by the phone. This provides a means to check whether the bands used by any contraband phones seized in the vicinity of the displayed alert are consistent with the displayed information. This in turn helps authorities to determine if additional contraband phones are still unaccounted for:

Cell phones transmit in one or more of several frequency bands, as defined in the table of FIG. 8. Various types of cell phones and network providers operate in different bands. The system of the present invention visually differentiates the display according to the band the phone signal was detected in, for example by setting the color of the circle 42 to one of a defined set depending on the band in question, as illustrated in FIG. 9. If, for example, the system of the present invention detects cellular phone use in a particular area 41 of the facility, the area of detection 41 is displayed, and the detected frequency band is identified and displayed by a colored circle, as shown in FIG. 9 and labeled thereon "red circle outline 42A", "blue circle outline 42G" and "green circle outline 42H", each color denoting a different frequency band of operation. If the frequency band identified corresponds to the operating band of a Nextel™ phone, but a search of the detected probable area of emission uncovers a Verizon™ phone operable at a different frequency band than that identified by the system of the present invention, then it is possible that the Verizon phone found was not the phone whose transmissions were detected and may have been left as a decoy. Accordingly, a further search of the premises for the Nextel™ phone may be required. Thus, the system and method of the present invention provide a further measure in identifying, locating and preventing illicit cellular phone use in a restricted facility.

Method for Graphically Displaying a Historical Record of Locations Logged by a Location-Determining System The system and method of the present invention are capable of determining a time series of location estimates that can be aggregated together based on the intervals between successive events of interest or other means. The system and method are capable of providing a report based on logged historical data. Such a report contains a record of all the times and locations determined by the system over some period of interest. A graphical method for intuitively displaying this time-sequenced information is described below.

This method superimposes the location information over a representation of the region of interest, such as a building floor plan 41, as illustrated in FIG. 10. In this example, each location is represented by a translucent circle centered on the location. When these location circles overlap, the brightness and opacity of the overlapped regions increases. The red circle 42A (labeled "red circle outline") shown in FIGS. 10-13 indicates the location of the source at the time of the maximum received signal.

This method provides a number of benefits. The method leverages the user's natural image-processing ability to extend the capabilities of the system. For a stationary or quasi-stationary object of interest, the method performs a form of averaging to reduce the effects of location estimate errors due to noise, multipath propagation effects, temporary obstructions due to moving objects, interference, etc. In particular, this technique provides a form of diversity by combining the results of many independent location estimates. Diversity techniques are well-known to be effective for mitigation of multipath fading in RF communications.

Figure 12:
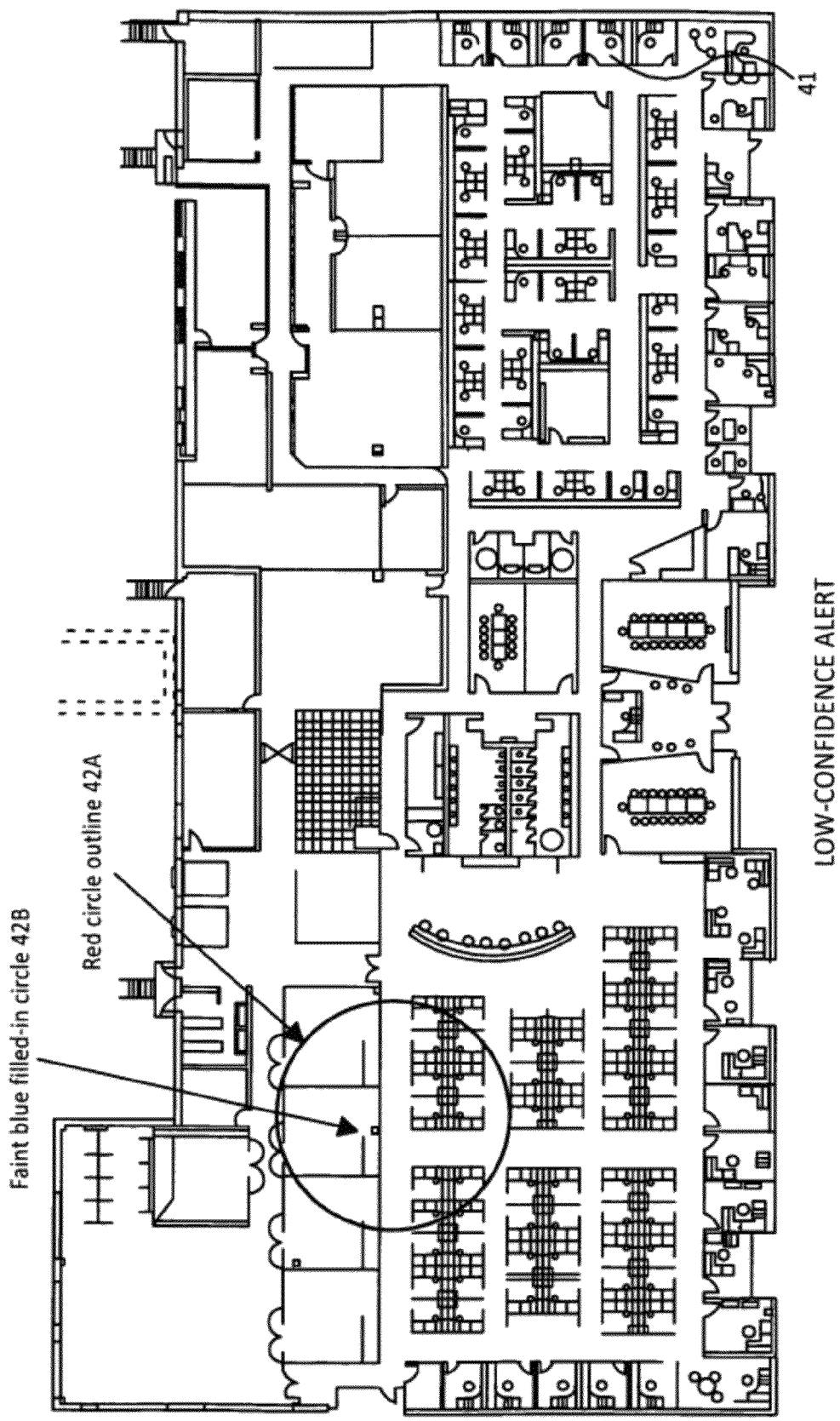
FIG. 12 is a display screen shot created in accordance with the present invention, displaying a low confidence alert.
Figure 13:
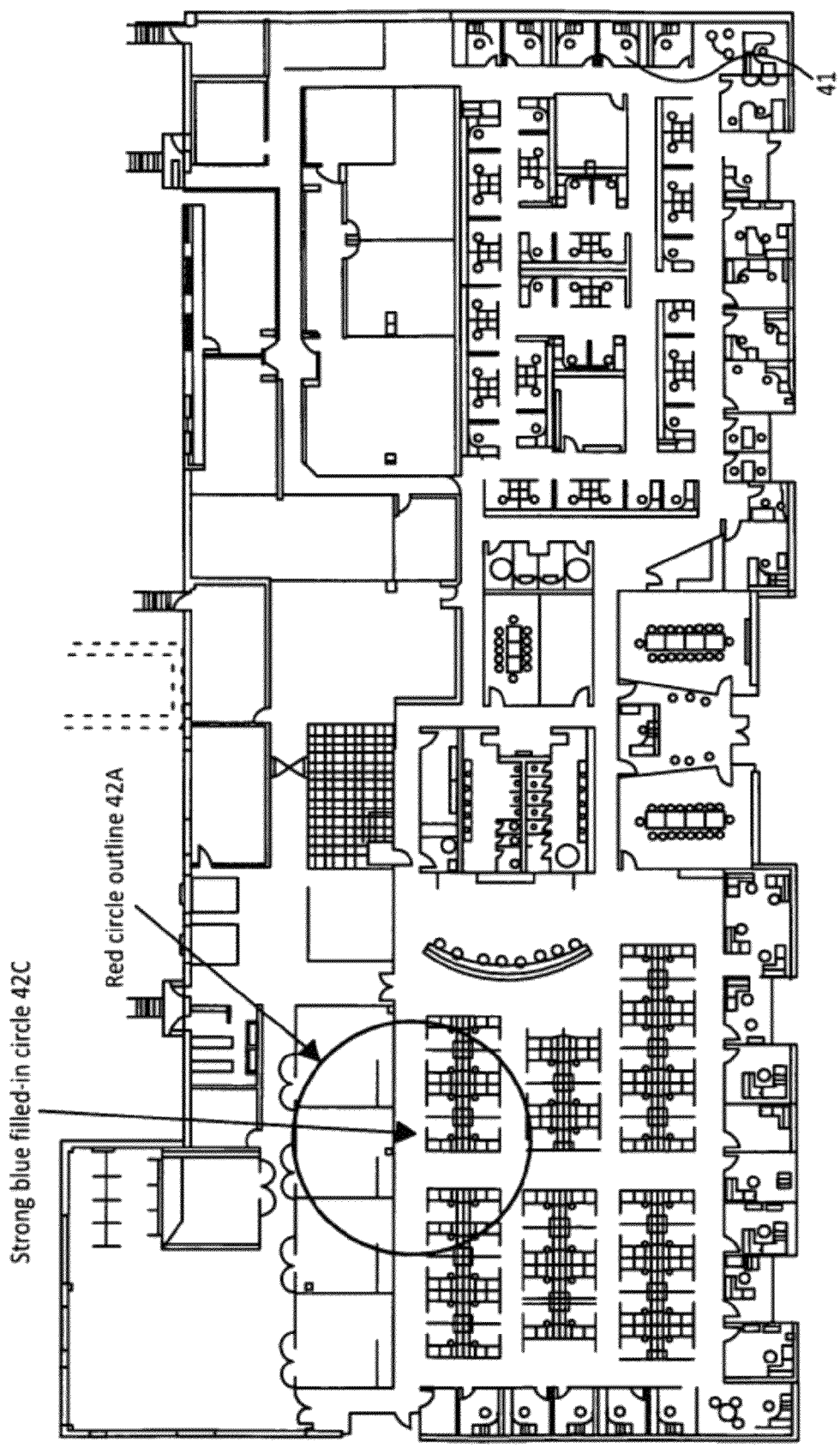
FIG. 13 is a display screen shot created in accordance with the present invention, displaying a high confidence alert.

For multiple objects of interest, this technique clearly indicates the locations of both objects, as illustrated in FIG. 11, as shown by the red and blue circles (labeled "red circle outline 42A", "faint blue filled-in circle 42B" and "strong blue filled-in circle 42C", respectively). This technique also provides a means of quickly establishing whether high confidence should be placed in an estimated location. If only a few events contribute to the record, or if the estimated location exhibits extreme variation over a short period, the display will show only faint circles (labeled "faint blue filled-in circle 42B", situated within the red circle outline 42A), as illustrated in FIG. 12. Conversely, if a number of events map to the same location, the display will show a clearly defined region that merits high confidence, as illustrated in FIG. 13 with the red and blue circles (labeled "strong blue filled-in circle 42C", situated within red circle outline 42A).

Figure 14:
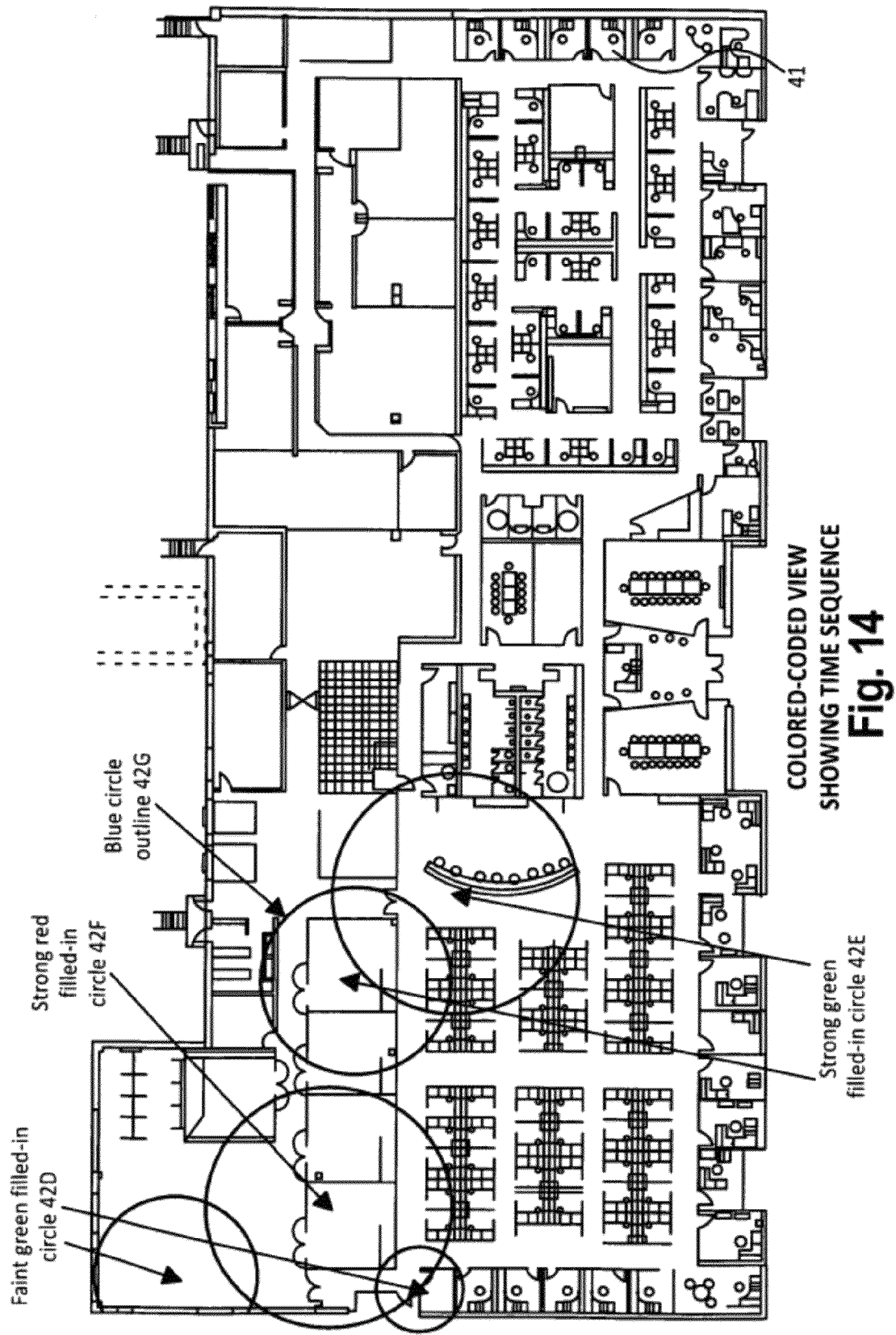
FIG. 14 is a display screen shot created in accordance with the present invention, displaying a color-coded view showing the time sequence of detected emissions from cellular phones.

A variation of this technique visually indicates the time sequence of the events. An example of this concept is provided in FIG. 14. In this view, the locations are displayed in different colors, with the earliest locations in green and the most recent in red, for example (labeled "faint green filled-in circle 42D", "strong green filled-in circle 42E", "strong red filled-in circle 42F" and "blue circle outline 42G" in FIG. 14). This provides information for determining the direction of motion of an object of interest in a single graphical representation on a display screen.

Figure 15:
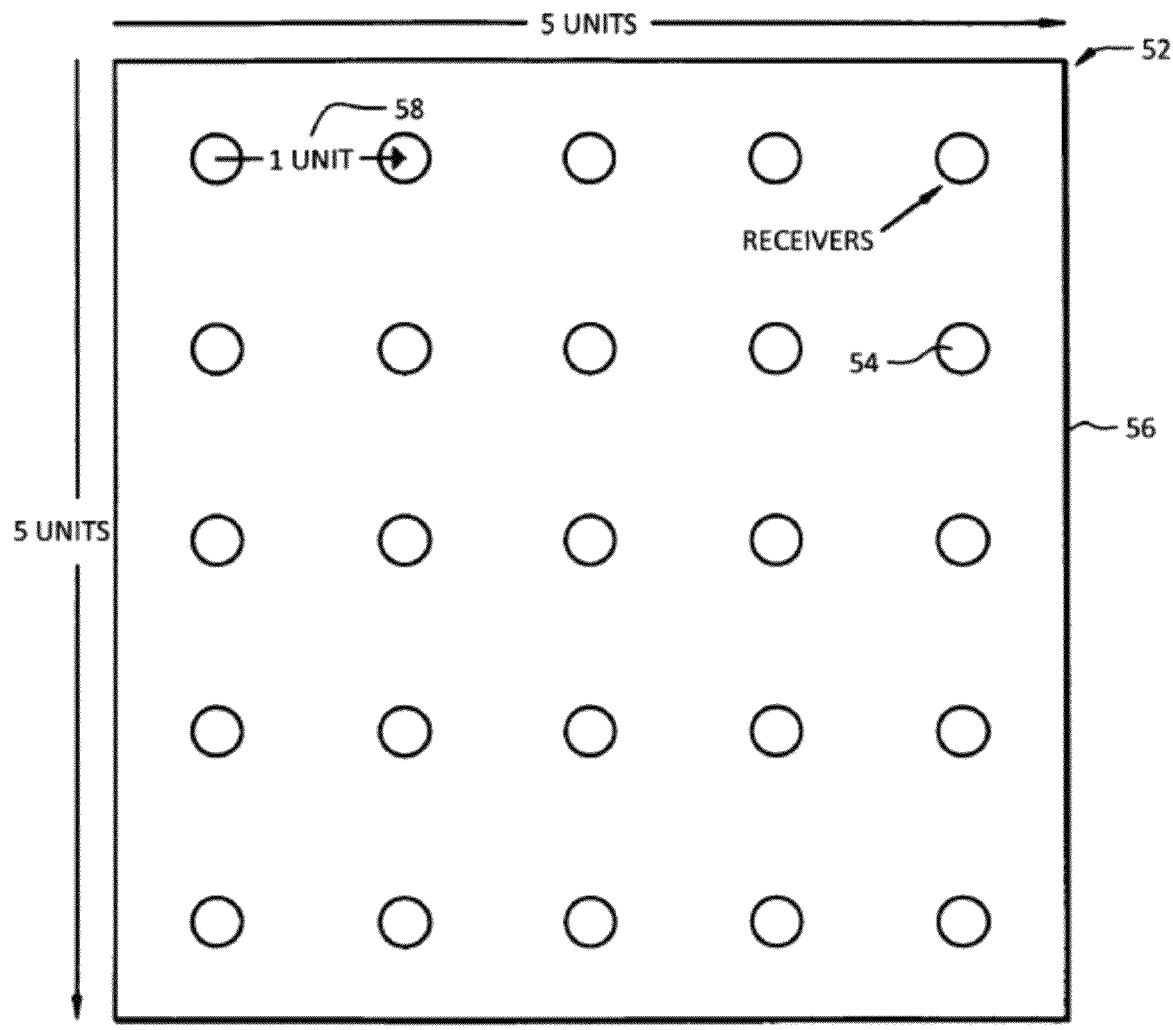
FIG. 15 is an illustration of a uniform square receiver array formed in accordance with the present invention and preferably used to detect cell phone radio frequency (RF) emissions.
Figure 16:
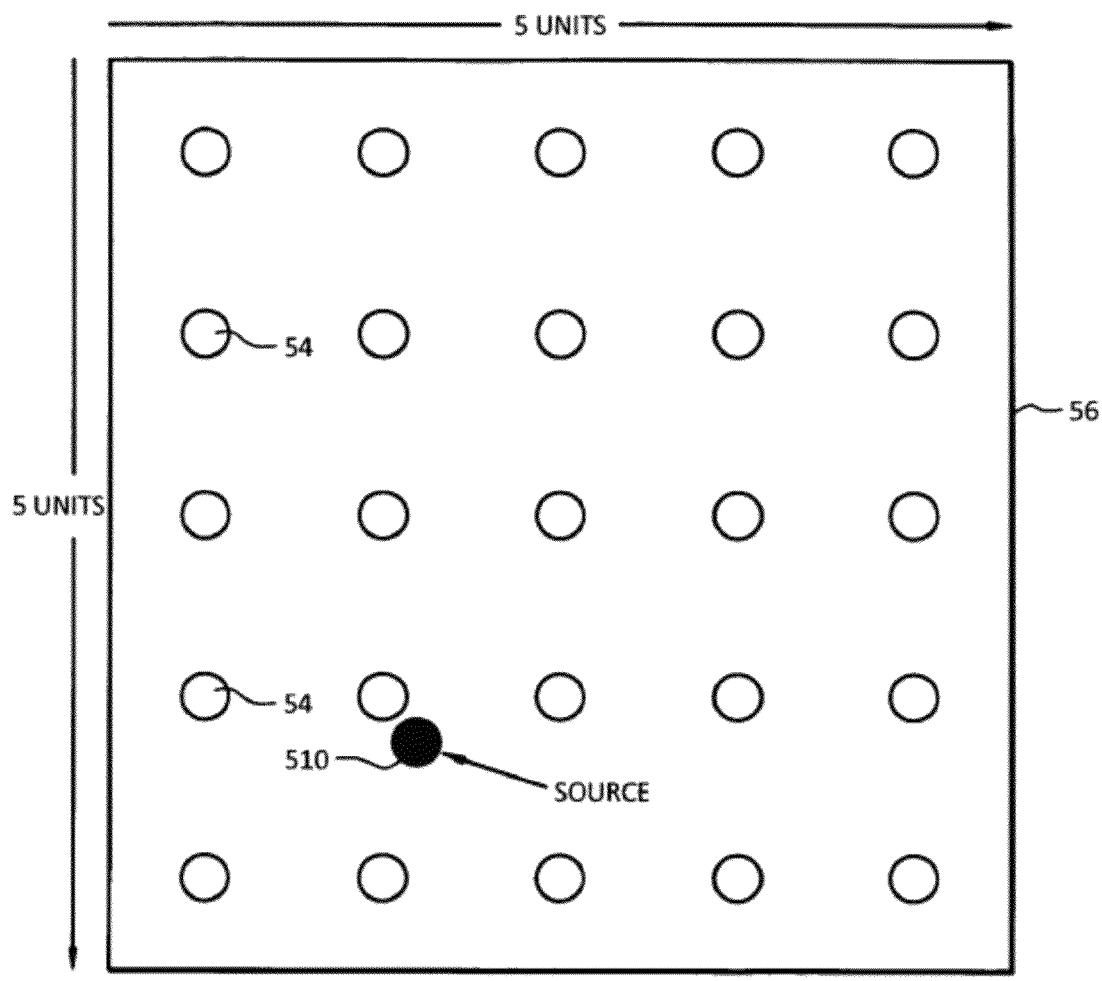
FIG. 16 is an illustration of a uniform square receiver array formed in accordance with the present invention with a source.
Figure 17:
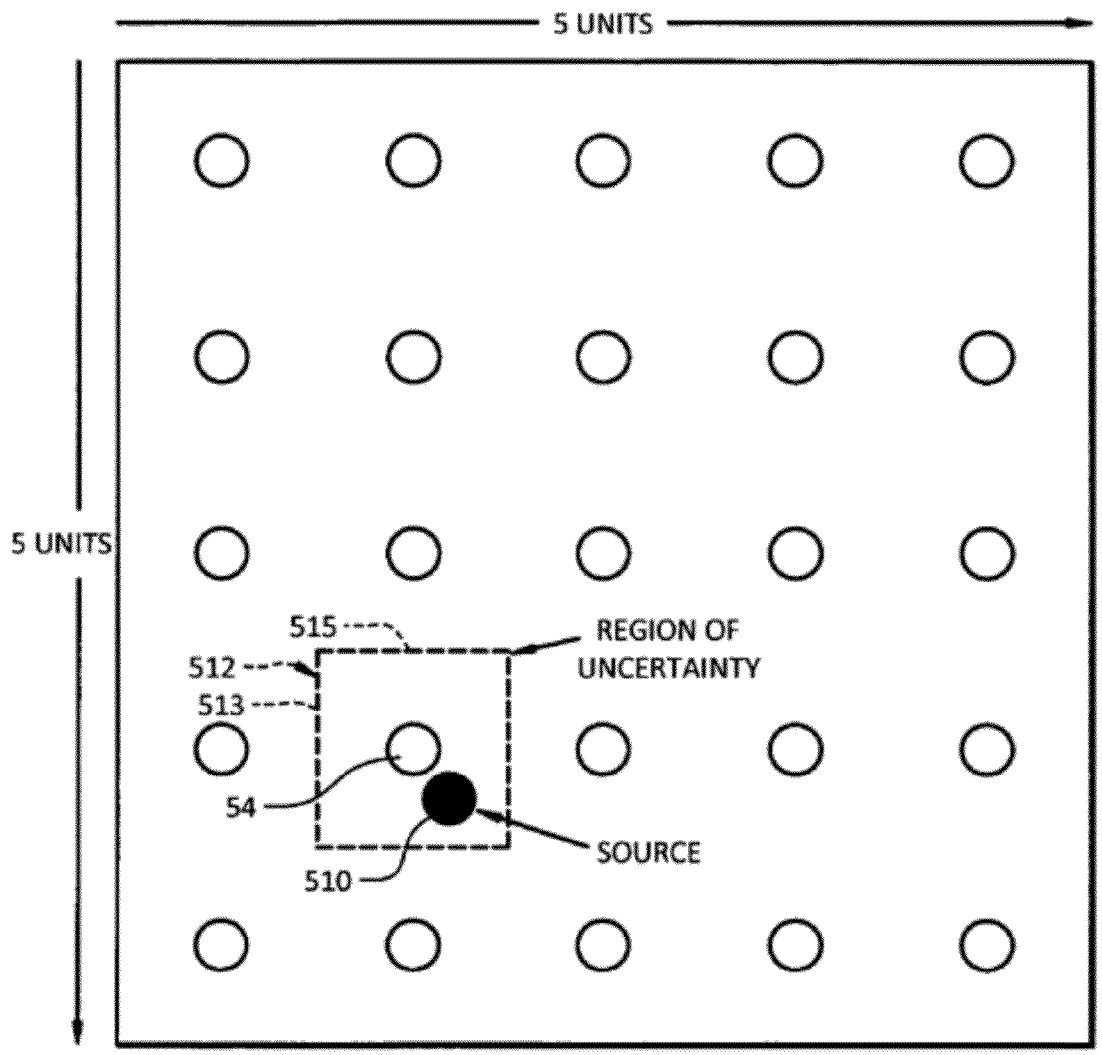
FIG. 17 is an illustration of a uniform square receiver array formed in accordance with the present invention with a source and illustrating a region of uncertainty surrounding the nearest receiver to the source.

Method for Automatic Scaling of RF Source Location Estimate Uncertainty Based on a Measure of Effective Receiver Spacing for a Networked Spatially Distributed Receiver Array Various sources of error, including multipath propagation, obstructions, cell phone antenna pattern distortion caused by the user's head, and calibration errors in the receivers cause uncertainty in the location estimate. The inventors herein have developed a novel method to estimate the region of uncertainty based on the concept of effective receiver spacing. Consider an array 52 of N receivers 54 uniformly distributed over a square area 56, as illustrated in FIG. 15. The inter-receiver spacing 58 for this configuration is given by $d_{\textit{eff}}=\sqrt{(\text{area})/N}$. If all the receivers 54 are identical and the propagation throughout the region is uniform, one can easily determine which receiver(s) 54 an omnidirectional source 510 is closest to based on which receiver(s) 54 measure the highest power, as illustrated in FIG. 16. This concept allows one to construct a region of source location estimate uncertainty 512 which bounds the region that the source 510 must be located within, as illustrated by FIG. 17. In the case that a single receiver records the highest power, the region of uncertainty is the locus of points 514 lying halfway between that receiver and its nearest neighbors. This locus 514 bounds the region that is closest to the receiver 54 in question. For the case of a regular rectangular array of receivers 54, the region of uncertainty is a square 513 whose sides 515 are of length $d_{\textit{eff}}$, as illustrated in FIG. 17.

Figure 18:
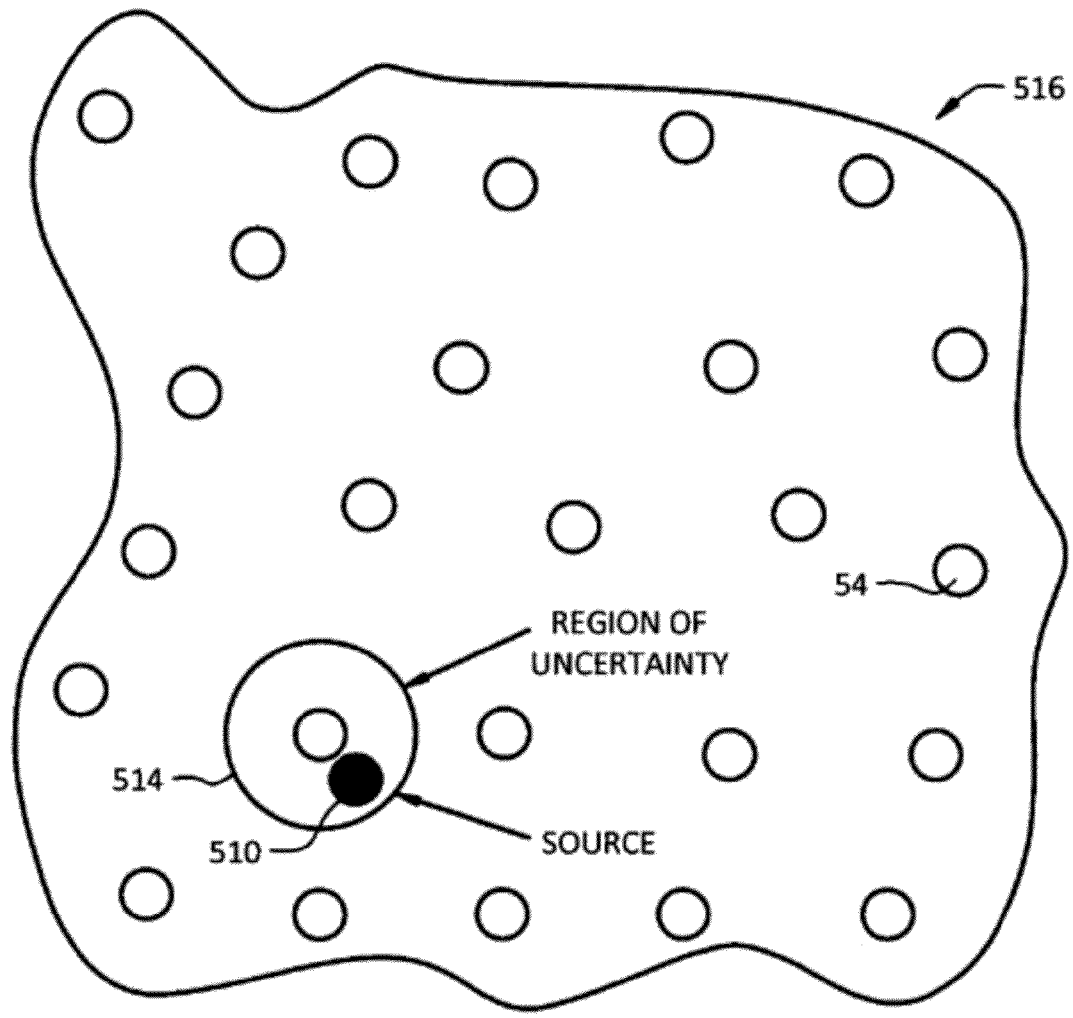
FIG. 18 is an illustration of a non-uniform receiver array and the application of the method of the present invention to determine the region of uncertainty for such an array.

In accordance with the present invention, this concept may be extended to the case of a non-uniform receiver array 516 and a region of approximately uniform propagation, as illustrated in FIG. 18. Here, the receiver spacing is irregular. The inventors herein developed the concept of effective receiver spacing. This is the receiver spacing that would result if the array were uniformly rectangular and the region were square, as in the case previously detailed. One again calculates $d_{\textit{eff}}=\sqrt{(\text{area})/N}$. This result is used as the diameter of a circular region of uncertainty that is centered on the best estimate of the exact source location. The radius of uncertainty is $r_{\textit{eff}}=d_{\textit{eff}}/2$. This concept is easily extended to a three-dimensional receiver array, with $r_{\textit{eff}}=d_{\textit{eff}}/2=\sqrt[3]{(\text{volume})/N}$.

It should be noted that the number of participating receivers 54 is dynamic, as is the region covered by the participating receivers 54. In accordance with the invention, $r_{\textit{eff}}$ is calculated for each source location estimate using the extrema of the participating receiver locations to define the area or volume covered.

Method to Allow a Sequence of Time-Discontinuous or Frequency-Hopping Spread Spectrum (FHSS) Transmissions from a Radio Frequency (RF) Source to be Identified as a Single Event Cell phones transmit in defined frequency bands. In accordance with the method of the present invention, these bands are monitored independently for the presence of a signal of interest. Once a signal source is detected in a particular band, a countdown timer (such as provided in each receiver's microcontroller 126 or in the system's server 16) is initiated. Each time another signal is detected in that band, the timer is reset. This process continues until no further signals are detected within the timeout period since the last signal. The resulting ensemble of measurements is then treated as a single event of interest.

Figure 19:
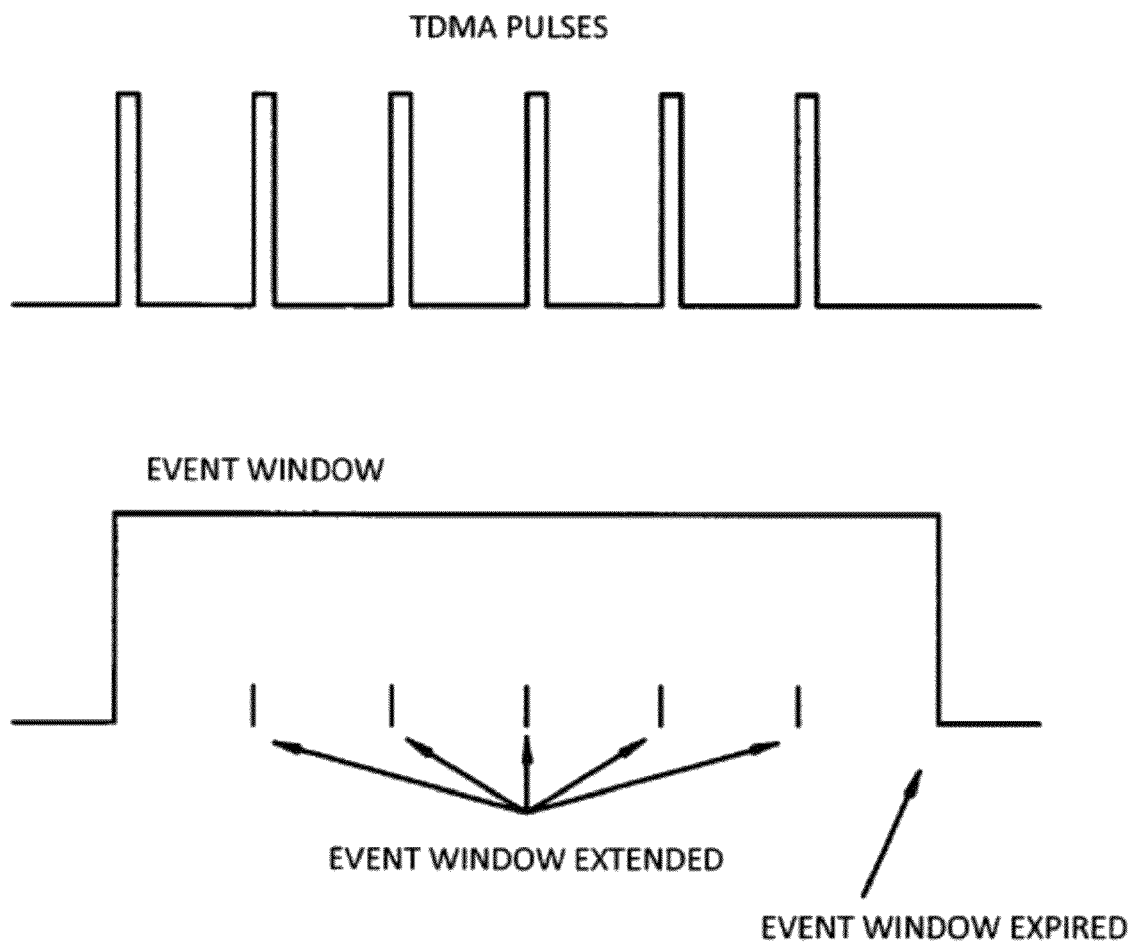
FIG. 19 is a graphical illustration of an event window created in accordance with a method of the present invention for detecting cellular phone radio frequency (RF) emissions, and a time-division-multiple-access (TDMA) source.

FIG. 19 illustrates the application of this technique to TDMA or other single-frequency bursty sources. FIG. 20 illustrates its application to FHSS sources. These sources recursively transmit bursts on a pseudo-random "hoplist" of frequencies. Because each of the frequencies is reused many times within a short interval, the described technique allows these sources to be monitored by measuring just one of the members of the hoplist with a narrowband receiver.

Figure 21:
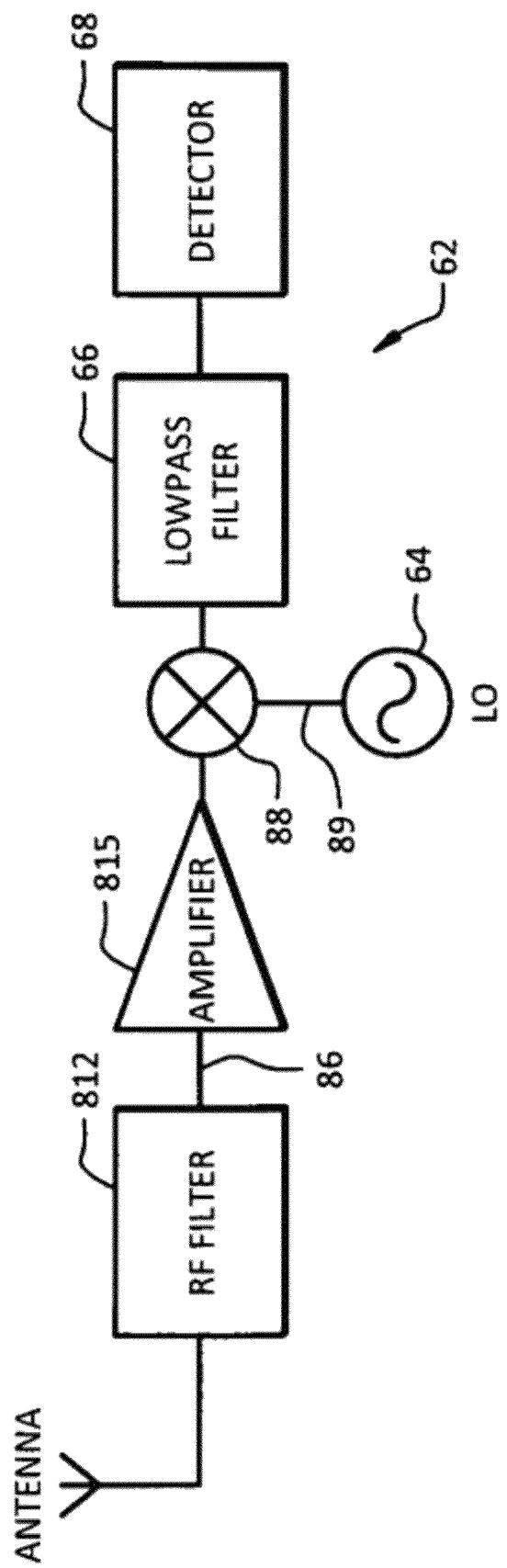
FIG. 21 is a schematic diagram of a conventional direct-conversion receiver (DCR).

Intermediate Frequency Response and Frequency Scanning Method to Minimize Measurement Interval with Direct-Conversion Frequency-Scanning Energy-Detection Receiver A direct-conversion receiver (DCR) 62 employed as an RF (radio frequency) energy detector is shown in FIG. 21. A DCR 62 downconverts an RF frequency band, centered about an RF center frequency $f_c$, to an IF (intermediate frequency) band centered around zero frequency, or DC. This is also known as a baseband signal. The downconversion is performed by mixing the RF signal with a local oscillator (LO) 64 whose frequency $f_0$ is tuned to $f_c$. An IF lowpass filter 66 having cutoff frequency $f_{IFH}$ limits the signal bandwidth entering the detector 68. The RF band containing lower sideband [$(f_c-f_{IFH})$ to $f_c$] and upper sideband [$f_c$ to $(f_c+f_{IFH})$] passes through the IF filter 66 into the detector 68.

In a simple DCR 62 (one that does not employ quadrature-phase techniques to separate the sidebands), the RF sidebands are "overlaid" on top of each other, with the energy of both sidebands summed into the half-bandwidth output spectrum. Although this distorts any information carried by the RF signal, this is unimportant for energy detection and measurement purposes.

The zero-frequency or DC component of the output is frequently a matter of concern in DCR applications. Because of non-ideal mixers or self-mixing resulting from stray coupling between mixer ports, there is typically a residual DC component even in the absence of an input signal. This term can be significantly larger than the signal of interest and must be eliminated in power-measurement applications.

Figure 22:
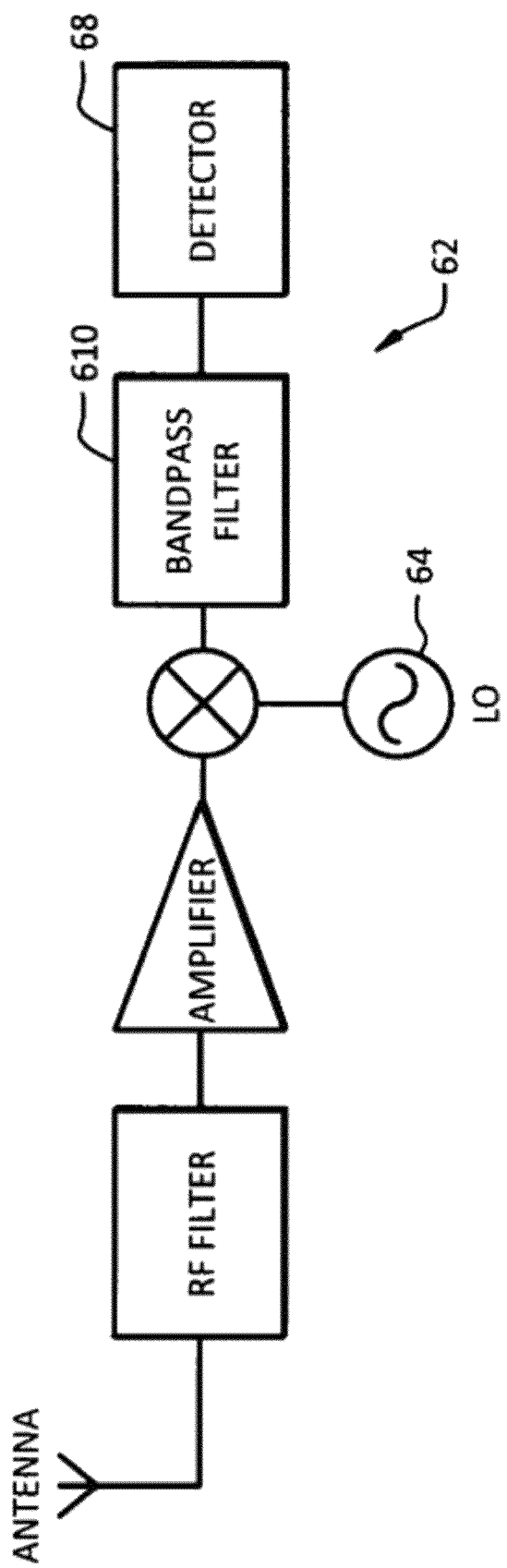
FIG. 22 is a schematic diagram of a DCR with a bandpass IF (intermediate frequency) filter.
Figure 23:
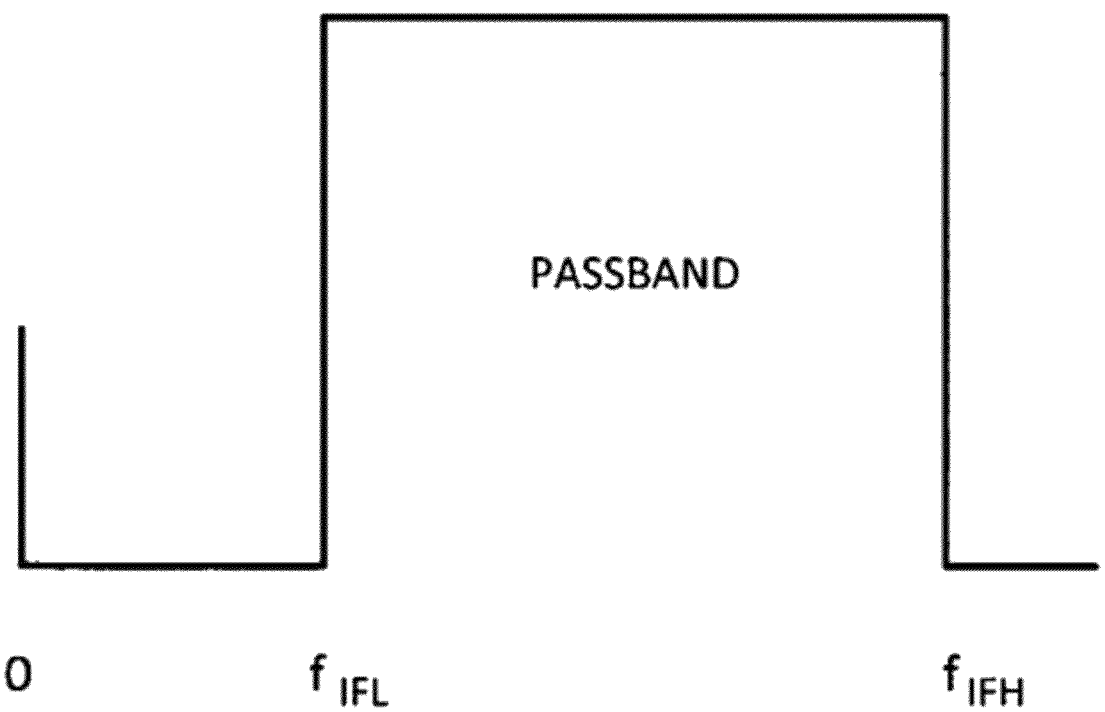
FIG. 23 is a graphical illustration of the bandpass IF response frequency spec

One method of doing this is to substitute a bandpass filter 610 for the lowpass IF filter 68 as shown in FIG. 22. The IF filter passband extends from $f_{IFL}$ to $f_{IFH}$, as illustrated in FIG. 23. This filter blocks the DC component from reaching the detector 68.

Another important function of the bandpass IF filter 610 is to limit the lowest frequency entering the detector 68. For signals above its video bandwidth, the detector 68 produces a steady DC voltage proportional to the average input power. For signals within its video bandwidth, the detector output "follows" the instantaneous logarithm of the input voltage. In order to establish a single voltage representing the input power of the input signal, the video bandwidth of the detector 68 must be reduced below that of the lowest-frequency component of the input signal. This results in a proportional increase in the settling time of the filtered detector output signal and thereby increases the interval required to accurately measure the RF signal level. The settling time can be reduced by increasing $f_{IFL}$.

Figure 24:
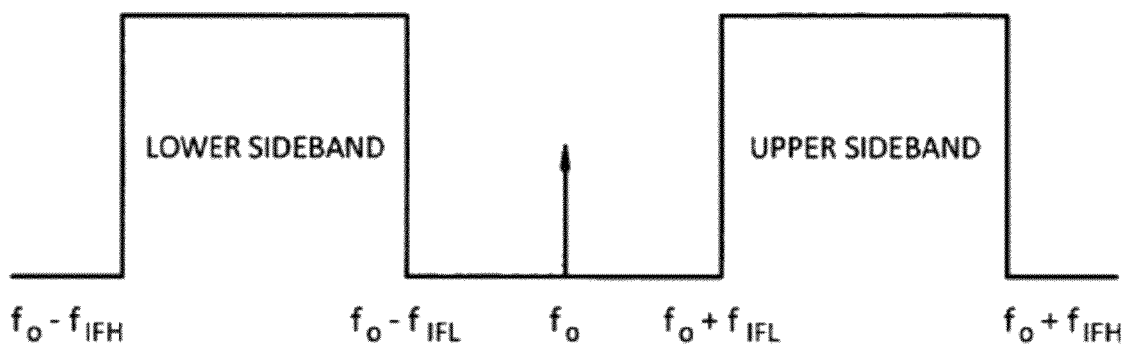
FIG. 24 is a graphical illustration of the RF response frequency spectrum with the bandpass IF filter.

The bandpass IF filter 610 creates a notch in the RF response extending from $(fc-f_{IFL})$ to $(f_c+f_{IFL})$ as shown in FIG. 24. This notch represents a blind spot of width $2 f_{IFL}$ around the RF center frequency because any signal within this notch is significantly attenuated by the IF filter 610. These frequencies should be covered by a separate step in the measurement process if a contiguous RF band is to be completely measured. Being capable of monitoring a contiguous RF band is a desired feature in a system which can detect illicit cellular phone usage, and such is provided by the present invention.

The system of the present invention monitors transmit frequencies used by cellular phones and other personal wireless devices including 806-821 MHz, 824-849 MHz, 896-901 MHz, 902-928 MHz, and 1850-1915 MHz. A novel frequency scanning method is employed to minimize the interval required to measure the RF levels in these bands.

Figure 25:
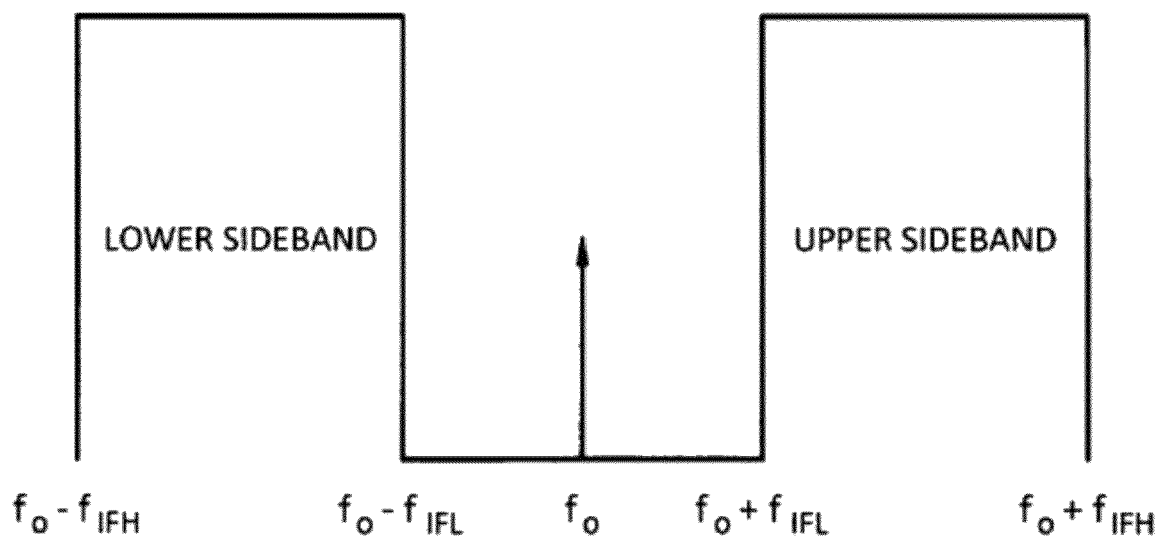
FIG. 25 is a graphical illustration of a bandpass response frequency spectrum which is selected in accordance with an intermediate frequency response and frequency scanning method of the present invention to minimize measurement intervals with direct-conversion, frequency-scanning, energy-detection receivers.

The present invention minimizes the number of steps required to completely measure a contiguous RF band while also minimizing the interval required for the detector output filter response to settle. The bandpass response corner frequencies are selected such that $f_{IFL}=⅓ f_{IFH}$. Each measurement sideband has bandwidth $f_{IFH}-f_{IFL}=⅔ f_{IFH}=2 f_{IFL}$. The resulting "blind spot" width is thus equal to the bandwidth of either measurement sideband, as shown in FIG. 25.

Figure 26:
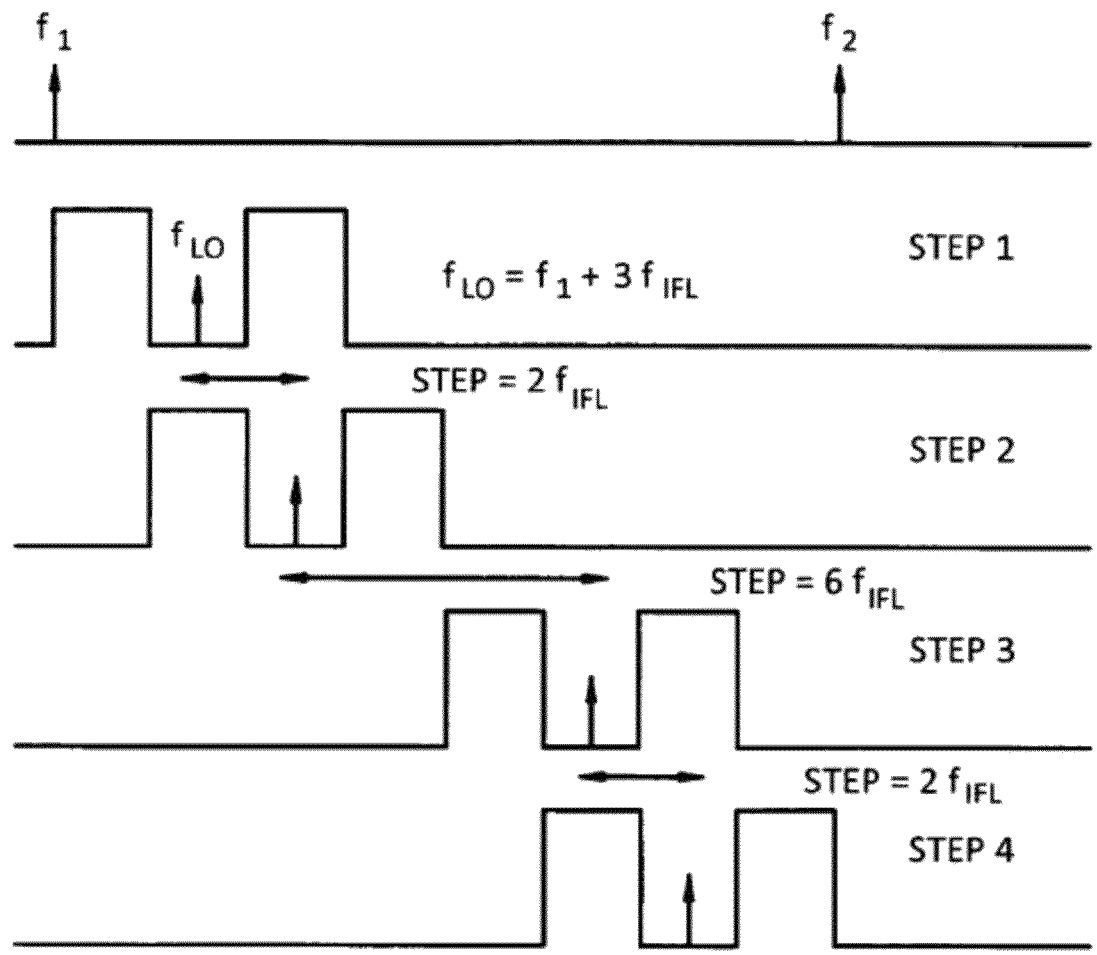
FIG. 26 is a graphical illustration of the measurement steps used in the intermediate frequency response and frequency scanning method of the present invention to minimize measurement intervals with direct-conversion, frequency-scanning, energy-detection receivers using non-overlapping measurements.

A characteristic of this method is that the step change in the LO frequency alternately assumes $2 f_{IFL}$ or $6 f_{IFL}$ on successive steps. The process for measuring a contiguous RF band extending from frequency $f_1$ to frequency $f_2$, where the bandwidth $f_2-f_1>8 f_{IFL}$, is shown in FIG. 26. One begins by setting the LO frequency to $f_0=f_1+3 f_{IFL}$ to measure the energy in the sidebands [$f_1$ to $(f_1+2 f_{IFL})$] and [$(f_1+4 f_{IFL})$ to $(f_1+6 f_{IFL})$]. The second step increments $f_0$ by $2 f_{IFL}$, measuring [$(f_1+2 f_{IFL})$ to $(f_1+4 f_{IFL})$] and [$(f_1+6 f_{IFL})$ to $(f_1+8 f_{IFL})$]. As can be seen, the second step "fills in" the blind spot from the first step without redundantly measuring any of the frequencies covered by the first measurement. The third step increments the LO frequency by $6 f_{IFL}$, measuring [$(f_1+8 f_{IFL})$ to $(f_1+10 f_{IFL})$] and [$(f_1+12 f_{IFL})$ to $(f_1+14 f_{IFL})$]. The process continues, with the LO frequency incremented by $2 f_{IFL}$ or $6 f_{IFL}$ on alternate steps. When $(f_2-f_1)=N\times 8 f_{IFL}$, where N is an integer, the band is covered in 2N non-overlapping measurements.

Figure 27:
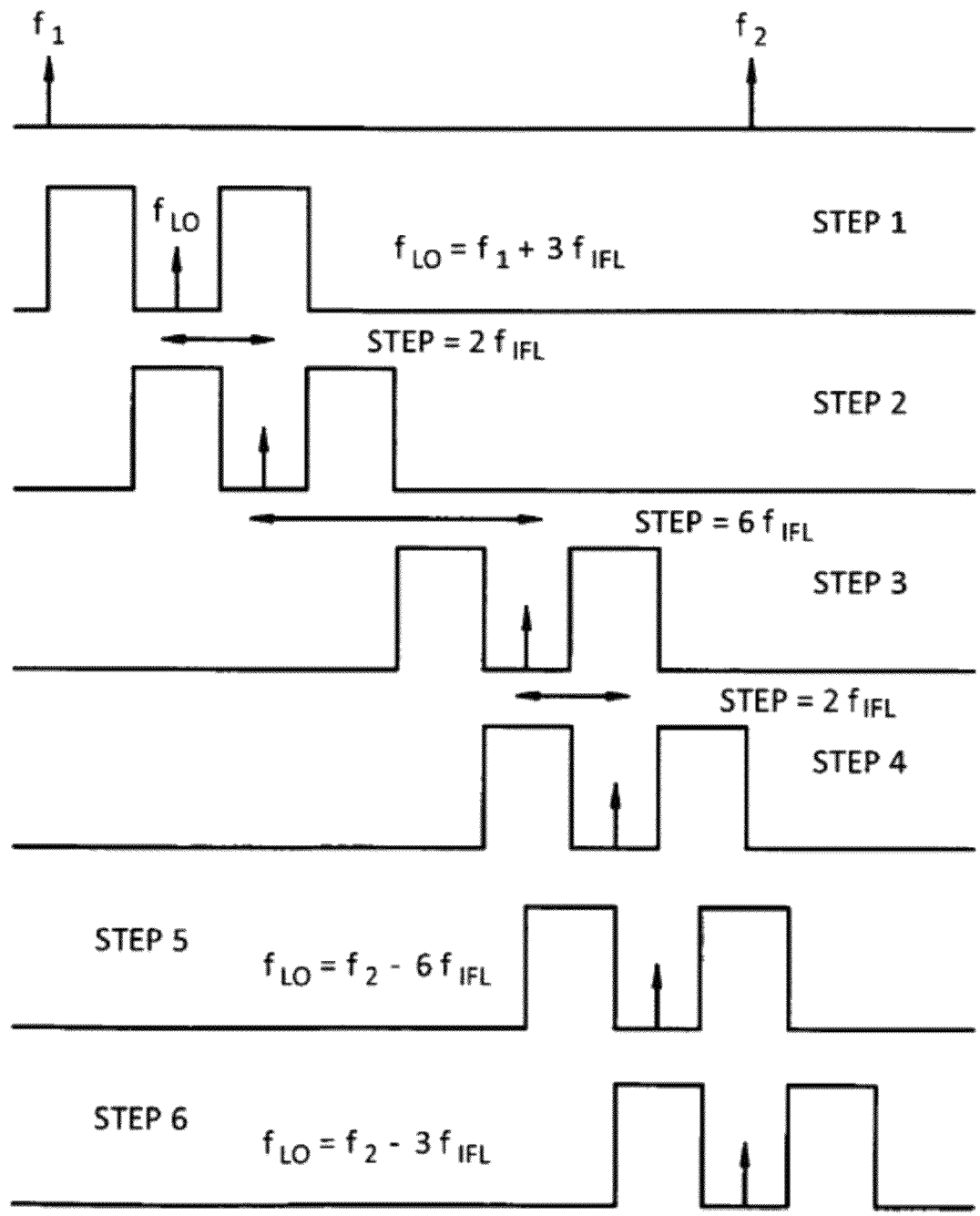
FIG. 27 is a graphical illustration of the measurement steps used in the intermediate frequency response and frequency scanning method of the present invention to minimize measurement intervals with direct-conversion, frequency-scanning, energy-detection receivers using minimally overlapping measurements.

When this condition is not satisfied, the final two settings for the LO frequency can be adjusted to ensure that the measurement does not extend beyond the upper band edge. This is done by setting the LO to $f_0=f_2-5 f_{IFL}$ to measure [$(f_2-8 f_{IFL})$ to $(f_2-6 f_{IFL})$] and [$(f_2-4 f_{IFL})$ to $(f_2-2 f_{IFL})$] and then to $f_0=f_2-3 f_{IFL}$ to measure [$(f_2-6 f_{IFL})$ to $(f_2-4 f_{IFL})$] and [$(f_2-2 f_{IFL})$ to $f_2$]. This results in the minimal overlap in the measurements, as shown in FIG. 27.

By careful choice of $f_{IFL}$, one can measure a given contiguous band in the fewest required number of steps, with the minimum required settling time for the detector video filter bandwidth, while simultaneously meeting noise bandwidth requirements.

Figure 28:
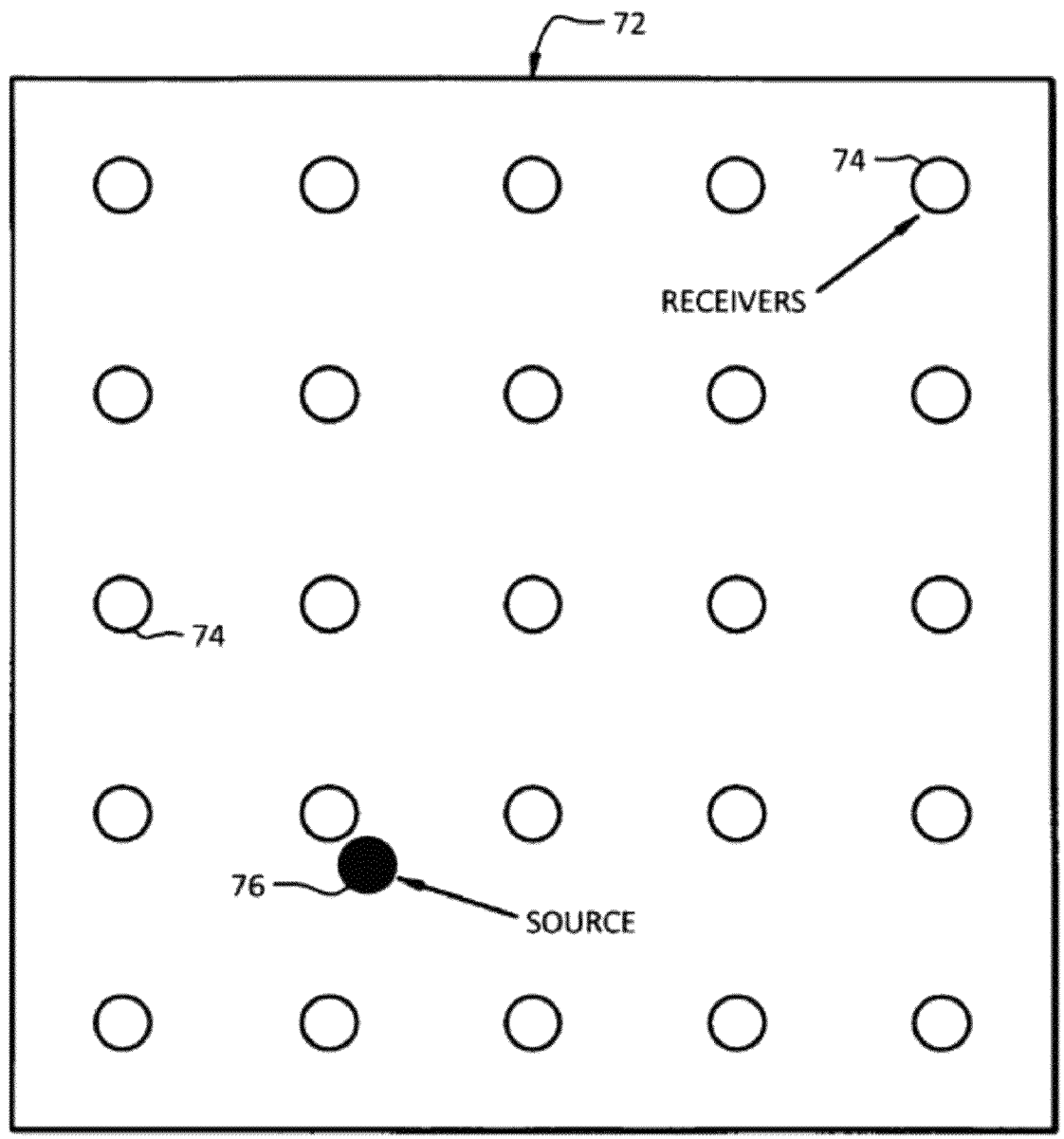
FIG. 28 is an illustration of the geographical locations of a conventional network of receivers used to measure the radio frequency (RF) signal level produced by a source at a number of known locations.

Method for Accurately Measuring Peak Signal Level of Bursty RF Source Across Non-Synchronized Array of Agile Receivers A network 72 of receivers 74 is used to measure the radio frequency (RF) signal level produced by a source 76 at a number of known locations, as illustrated in FIG. 28. The receiver array is centrally controlled by a computer (not shown) running a software application.

The peak source level should be measured at each of the receiver locations to perform location analysis or for other purposes. The system of the present invention for detecting illicit cellular telephone use employs two distinct operating modes. In the first mode, the receivers 74 independently scan a radio frequency (RF) band of interest to detect the presence of the source 76. In the second mode of operation, some or all of the receivers 74 perform high-rate measurements at a particular frequency in order to accurately and simultaneously determine the signal level at each receiver location.

Figure 29:
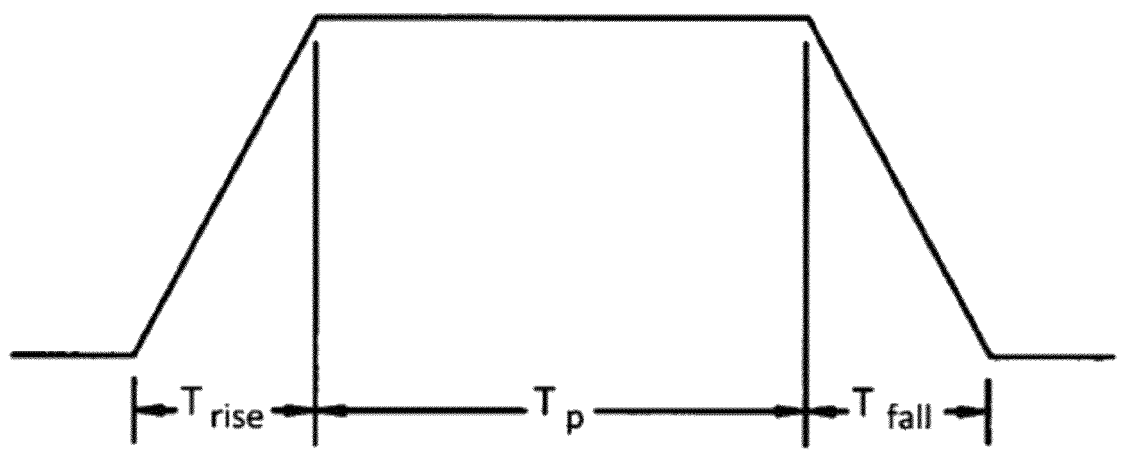
FIG. 29 is a graphical illustration of the profile of the RF pulses produced by the conventional source shown in FIG. 5.

The source 76 and the receivers 74 can be tuned anywhere within an RF band of interest of bandwidth $B_{RF}$. The source produces a bursty signal consisting of RF pulses. The RF level during each pulse increases from zero to its peak level over a rise time $T_{rise}$, maintains its peak level during the pulse interval $T_p$, and decreases from the peak level to zero during the fall time $T_{fall}$, as illustrated in FIG. 29. The occupied bandwidth $B_s$ of the source transmissions satisfies $B_s \ll B_{RF}$. Each receiver 74 has an instantaneous measurement bandwidth $B_{RX} \ll B_{RF}$. The receivers 74 must detect and measure the source 76 without a priori information regarding the source frequency $f_s$. Because the pulse only occupies a portion of the RF bandwidth, and the receiver 74 only measures a portion of the RF bandwidth, the receivers 74 must scan different frequencies in the RF band until the source 76 is detected. Each receiver measurement integrates the power received during some finite measurement interval. Because a large number of frequencies must be measured, the time between successive measurements on any given frequency is long compared to the RF pulse width.

Figure 30:
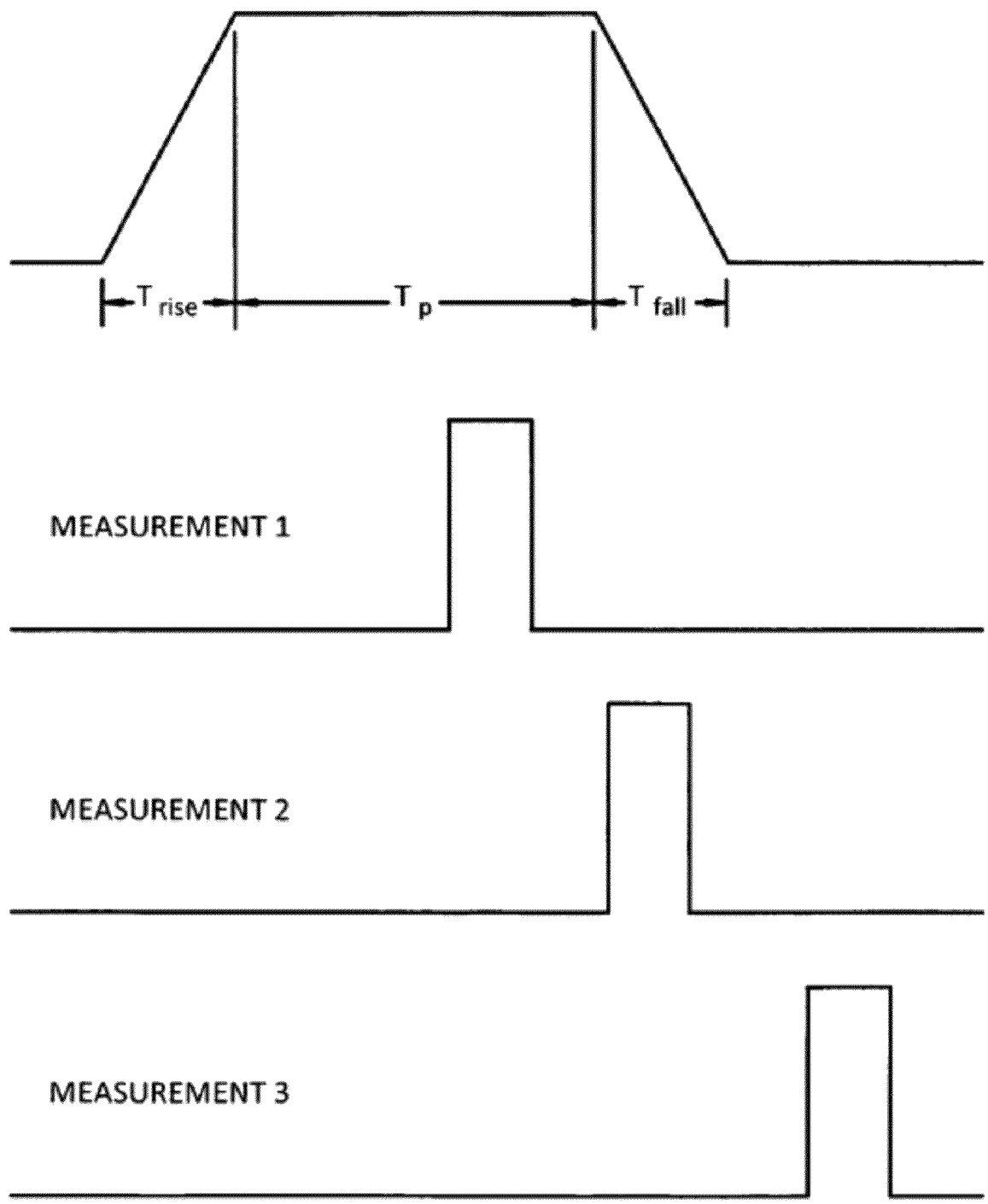
FIG. 30 is a graphical illustration of three different measurement intervals in relation to an RF pulse generated by the source shown in FIG. 5.

Because the source 76 is bursty, there is a finite probability that any receiver 74 will be monitoring the source frequency during the interval $T_p$ during which the signal is at its peak. FIG. 30 shows three different measurement intervals in relation to an RF pulse. The first measurement will record the highest level, because the source power is at a maximum throughout the measurement. The second measurement will record a lower value, because the source power is declining during the measurement. The third measurement does not coincide with any portion of the RF pulse.

By having the receivers 74 independently scan the RF band in a non-synchronized fashion, in accordance with the present invention, the probability that at least one receiver 74 detects the burst is maximized, that is, that at least a portion of the measurement interval overlaps the RF pulse. Furthermore, this avoids the possibility that a synchronized array scanning at the same rate as the pulse repetition rate of the source 76 would never detect the source 76 because the source frequency is never monitored when a burst occurs.

For accurate location information to be calculated, the system of the present invention ensures that the difference in measured signal level is due only to the propagation losses between the source 76 and the receivers 74.

Figure 31:
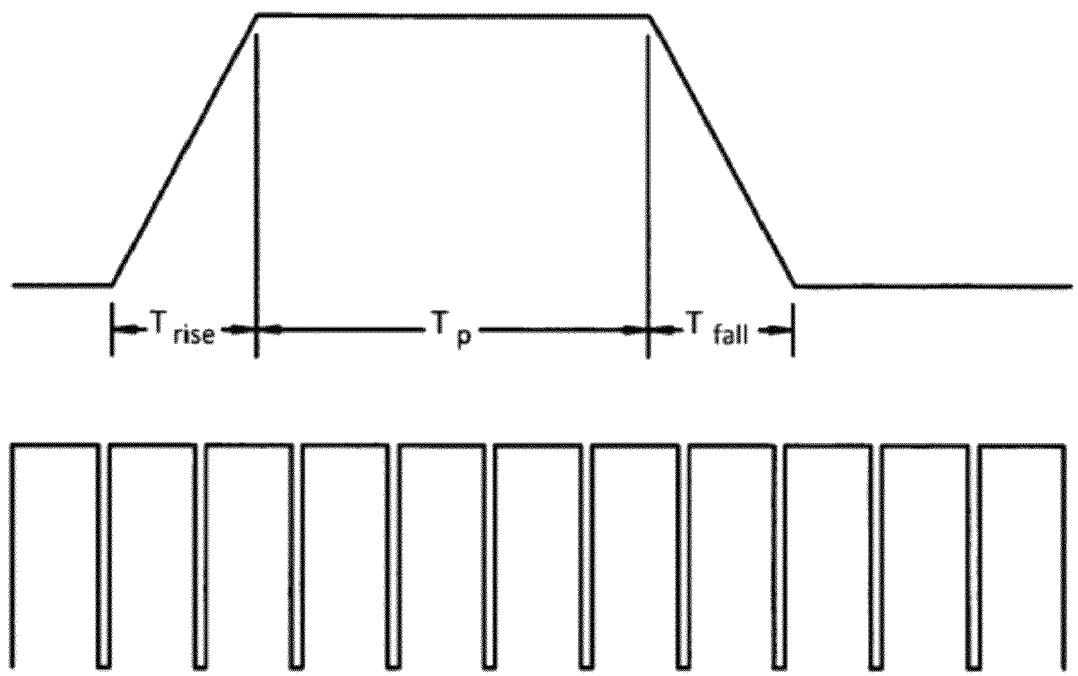
FIG. 31 is a graphical illustration of a single-frequency measurement performed in accordance with a method of the present invention for accurately measuring peak signal levels of bursty RF (radio frequency) sources across non-synchronized arrays of agile receivers.

When one or more receivers 74 detect a signal of interest, a message or messages are transmitted to the control computer (not shown). The control computer and its software determine whether one or more frequencies merit further investigation. If so, the group or a subgroup of receivers 74 is directed by the computer to tune to the frequency of interest. Because only a single frequency is being monitored, the receivers 74 can perform many back-to-back measurements. The measurement interval is short in comparison with the RF pulse width and therefore several measurements will occur within the time of maximum source power, as illustrated in FIG. 31. The receivers 74 report the peak measured signal level during a timeframe commensurate with the source pulse width and repetition rate. The receivers 74 may also report all their recorded data or the results of other processing. This technique allows a low-cost non-synchronized network of receivers 74 to accurately and simultaneously determine the peak received signal level of a bursty RF source 76 in near-real time.

Use of an Integral Variable Attenuator to Identify Potential Harmonic Distortion Effects in a Direct-Conversion Receiver Direct-conversion receivers (DCR's) 62, as illustrated in FIG. 21, offer a number of advantages over conventional heterodyne receiver architectures, including low parts count and elimination of the requirement for image-frequency rejecting filters. However, they are vulnerable to harmonic-distortion effects. Such harmonic distortion could affect the performance of a system employing such DCR's to detect illicit cellular telephone use in buildings and prisons.

In the DCR 62, the local oscillator (LO) 64 is tuned to the frequency of interest. A radio frequency (RF) signal at the frequency of interest (at 86) is amplified by amplifier 85 and enters the mixer 88. The mixer 88 multiplies the amplified RF signal (at 87) with the LO signal (at 89), producing a baseband response that enters the detector 68 after passing through lowpass filter 66. Practical mixers also produce baseband signals, at lower power levels, from any RF signals whose frequencies correspond to harmonics of the LO signal (at 89). These RF signals can be incident on the receiver, or caused by distortion in the RF chain of the receiver itself. RF signals lying at frequencies that are subharmonics of the LO 64 (i.e. ½, ⅓, etc.) can produce harmonics in the RF chain that in turn produce spurious baseband responses.

Conventional techniques to combat these issues include RF filtering 812 to attenuate signals lying outside the band of interest. For wideband receivers whose tuning range approaches or exceeds an octave, this can require multiple filter chains to cover separate bands. High-linearity amplifiers and mixers are also often required, although these are more expensive and typically consume more power than lower-performance devices.

The relationship between the power of a signal produced by harmonic distortion in a DCR to the power of the fundamental-frequency signal is well known. The harmonic product signal level varies as the fundamental signal level raised to the order of the distortion. For example, the level of the second harmonic distortion product varies as the square of the fundamental signal level. In decibel (dB) terms, the distortion signal level varies as N times the fundamental signal level, where N is the order of the distortion. For second-order distortion, the level varies as twice the fundamental signal level. FIG. 32 illustrates the change in relative levels of a signal and its distortion-produced second harmonic as the fundamental level is reduced.

Figure 33:
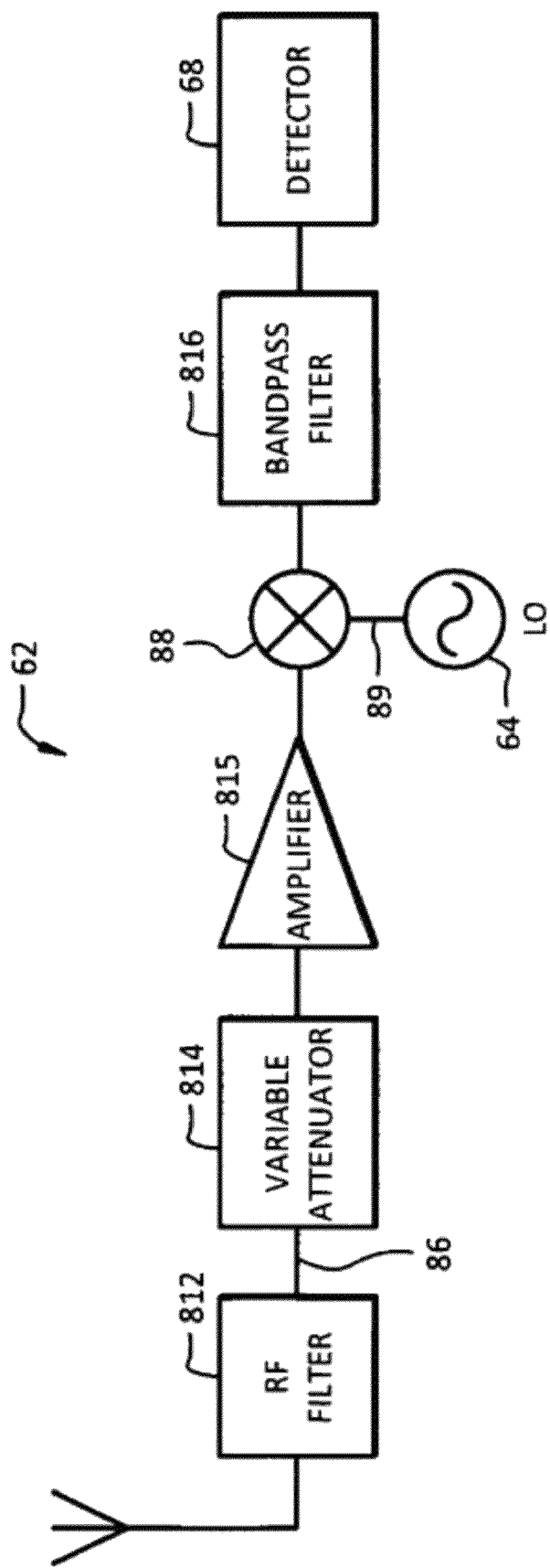
FIG. 33 is a schematic diagram of a direct-conversion receiver with an integral variable attenuator to identify potential harmonic distortion effects in the receiver formed in accordance with the present invention.

In accordance with the present invention, a variable attenuator 814 is added at or near the beginning of the RF chain, as illustrated in FIG. 33. By doing this, one can vary the level of the RF signal. If the signal entering the detector 68 is in the band of interest, i.e. the baseband signal resulted from the mixing of the fundamental RF signal with the fundamental LO signal (at 89), then the level of the baseband signal is directly proportional to that of the incoming RF signal. The variation in the detected baseband level will be the same as the change in the attenuator setting. If, on the other hand, the baseband signal is a spurious product of harmonic distortion in the receiver circuitry, the change in detected signal will be larger than the change in the attenuator setting. Thus, by comparing the change in the detected baseband signal level against the change in the attenuator setting, in accordance with the present invention, one can determine whether the baseband signal is the result of an in-band signal or is a spurious response due to harmonic distortion. As also shown in FIG. 33, a bandpass filter 816 is preferably used in place of the lowpass filter 66.

As is evident from the foregoing description, the present invention provides a system and method for detecting and locating illicit cellular telephone use within a facility. The method divides a facility into independent regions for accurate and efficient detection and location of RF (radio frequency) sources. The method and system prevents or minimizes false alarms from nearby areas where cellular telephone use is permitted. The method visually differentiates frequency bands in a cell phone detection and location system.

The method of the present invention graphically displays a historical record of locations logged by the system for detecting and locating illicit cellular telephone use. The method also automatically scales RF source location estimate uncertainty based on a measure of effective receiver spacing for a networked spatially distributed receiver array used in the system.

The method of the present invention further allows a sequence of time-discontinuous or frequency-hopping spread spectrum (FHSS) transmissions from a radio frequency (RF) source to be identified as a single event. Furthermore, the present invention provides an intermediate frequency response and frequency scanning method for minimizing measurement intervals with direct-conversion, frequency-scanning, energy-detection receivers used in the system of the present invention. The system also accurately measuring peak signal levels of bursty RF sources across non-synchronized arrays of agile receivers used in the system. Furthermore, direct-conversion receivers employed in the system use an integral variable attenuator to identify potential harmonic distortion effects in the receivers of the system.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A system for locating a mobile communication device in a region of interest, comprising:
    a plurality of radio frequency (RF) receiver devices at respective locations within the region, wherein:
    in a first operating mode, the receiver devices are configured to scan a frequency band to search for a signal of interest associated with a communication device emitting the signal of interest within the region, at least some of the receiver devices being configured to switch to a second operating mode in response to at least one of the receiver devices detecting the signal of interest at a frequency within the frequency band; and
    in the second operating mode, the at least some of the receiver devices are configured to tune to the frequency of the signal of interest detected in the first operating mode to measure signal levels at the respective locations within the region; and
    a processor in communication with the receiver devices and configured to:
    determine a location of the communication device from the signal levels measured by the at least some of the receiver devices in the second operating mode; and
    notify said determining of location of the communication device emitting the signal of interest within the region.

2. The system of claim 1, wherein, in the first operating mode, the receiver devices are configured to scan the frequency band non-synchronously and independently of each other.

3. The system of claim 1, wherein the receiver devices are configured to measure signal levels in measurement intervals that are shorter than a pulse width of the signal of interest.

4. The system of claim 1, wherein, in the second operating mode, the at least some of the receiver devices simultaneously monitor signal levels at the frequency of interest identified in the first operating mode.

5. The system of claim 1, wherein the receiver devices are configured not to demodulate the signal of interest.

6. The system of claim 1, further comprising:
    a display device configured to display the location of the communication device on a map of the region.

7. The system of claim 1, wherein each of the receiver devices comprises a direct conversion receiver.

8. The system of claim 1, wherein the frequency band comprises frequencies used by wireless communication devices to communicate with base stations.

9. The system of claim 1, wherein the processor is configured to determine the location of the communication device emitting the signal of interest as being within a region of uncertainty surrounding a receiver device whose measured signal level is highest.

10. A method for locating a mobile communication device in a region of interest, the method comprising:
    Scanning, in a first mode a frequency band with a plurality of radio frequency (RF) receivers located at respective locations in a region to search for a signal of interest emitted by a communication device within the region;
    identifying a frequency of a signal of interest detected by at least one of the receivers;
    tuning in a second mode at least some of receivers to the frequency of the detected signal of interest;
    measuring signal levels at the at least some of the receivers tuned to the frequency of the detected signal of interest;
    determining via a processor in communication with the receiver devices, a location of the communication device emitting the signal of interest from the signal levels measured at the at least some of the receivers; and
    notifying said determining of location of the communication device emitting the signal of interest within the region.

11. The method of claim 10, wherein the scanning includes the receivers scanning the frequency band non-synchronously and independently of each other.

12. The method of claim 10, wherein the signal levels are measured in measurement intervals that are shorter than a pulse width of the signal of interest.

13. The method of claim 10, wherein the at least some of the receiver devices simultaneously monitor signal levels at the frequency of the detected signal of interest.

14. The method of claim 10, wherein the signal of interest is not demodulated by the receivers.

15. The method of claim 10, further comprising:
    displaying the location of the communication device on a map of the region.

16. The method of claim 10, wherein the frequency band comprises frequencies used by wireless communication devices to communicate with base stations.

17. The method of claim 10, wherein determining the location of the communication device comprises determining that the communication device is within a region of uncertainty surrounding a receiver whose measured signal level is highest.

* * * * *

UNITED STATES PATENT AND TRADEMARK OFFICE
CERTIFICATE OF CORRECTION

PATENT NO. : 8,351,961 B2
APPLICATION NO. : 13/330231
DATED : January 8, 2013
INVENTOR(S) : Robert L. Olbers et al.

It is certified that error appears in the above-identified patent and that said Letters Patent is hereby corrected as shown below:

Column 5, line 63, replace "response frequency spec" with -- response frequency spectrum. --;

Column 6, line 46, replace "described m detail" with -- described in detail --; and Column 8, line 2, replace "(LAS) 130 notifies" with -- (IAS) 130 notifies --.

Signed and Sealed this
Second Day of April, 2013

Teresa Stanek Rea
*Acting Director of the United States Patent and Trademark Office*